(12) United States Patent
Veeningen et al.

(10) Patent No.: US 7,630,914 B2
(45) Date of Patent: *Dec. 8, 2009

(54) METHOD AND APPARATUS AND PROGRAM STORAGE DEVICE ADAPTED FOR VISUALIZATION OF QUALITATIVE AND QUANTITATIVE RISK ASSESSMENT BASED ON TECHNICAL WELLBORE DESIGN AND EARTH PROPERTIES

(75) Inventors: Daan Veeningen, Houston, TX (US); Kris Givens, Stafford, TX (US)

(73) Assignee: Schlumberger Technology Corporation, Houston, TX (US)

( * ) Notice: Subject to any disclaimer, the term of this patent is extended or adjusted under 35 U.S.C. 154(b) by 1321 days.

This patent is subject to a terminal disclaimer.

(21) Appl. No.: 10/802,613

(22) Filed: Mar. 17, 2004

(65) Prior Publication Data
US 2005/0209866 A1    Sep. 22, 2005

(51) Int. Cl.
*G06F 17/60* (2006.01)
(52) U.S. Cl. ............................. 705/7; 705/38
(58) Field of Classification Search ............ 705/7, 705/38; 703/13, 17; 367/81, 82; 340/853.1, 340/853.3, 853.6; 175/24, 39, 40
See application file for complete search history.

(56) References Cited

U.S. PATENT DOCUMENTS

| 5,611,052 | A | 3/1997 | Dykstra |
| 5,696,907 | A | 12/1997 | Tom |
| 6,109,368 | A * | 8/2000 | Goldman et al. ............... 175/39 |
| 6,223,143 | B1 * | 4/2001 | Weinstock et al. ............ 703/17 |
| 6,408,953 | B1 * | 6/2002 | Goldman et al. ............... 175/39 |
| 6,612,382 | B2 * | 9/2003 | King ........................... 175/40 |
| 7,003,439 | B2 * | 2/2006 | Aldred et al. ................. 703/10 |
| 7,006,992 | B1 * | 2/2006 | Packwood .................... 705/38 |
| 7,032,689 | B2 * | 4/2006 | Goldman et al. ............... 175/39 |
| 7,085,696 | B2 * | 8/2006 | King ........................... 703/10 |

(Continued)

FOREIGN PATENT DOCUMENTS

WO      1991013237      9/1991

OTHER PUBLICATIONS

SPE/IADC 67816 "Meeting Future Drilling Planning and Decision Support Requirements" Copyright 2001, Feb. 27-Mar. 1, 2001.

*Primary Examiner*—Albert DeCady
*Assistant Examiner*—Dave Robertson
(74) *Attorney, Agent, or Firm*—Robert P. Lord; Bryan P. Galloway

(57) ABSTRACT

A method is disclosed for determining and displaying risk information in response to a plurality of input data, the input data including a plurality of input data calculation results, comprising the steps of: comparing each calculation result of the plurality of input data calculation results of the input data with each logical expression of a plurality of logical expressions; ranking by the logical expression the calculation result; and generating a plurality of ranked individual risks in response to the ranking step, each of the plurality of ranked individual risks representing an input data calculation result that has been ranked by the logical expression as having either a high risk severity or a medium risk severity or a low risk severity; generating the risk information in response to the plurality of ranked individual risks; and displaying the risk information, the displaying step including displaying the risk information on a risk information display.

44 Claims, 47 Drawing Sheets

U.S. PATENT DOCUMENTS

| | | | |
|---|---|---|---|
| 7,243,735 B2* | 7/2007 | Koederitz et al. | 175/40 |
| 7,261,167 B2* | 8/2007 | Goldman et al. | 175/39 |
| 7,357,196 B2* | 4/2008 | Goldman et al. | 175/24 |
| 2002/0099586 A1* | 7/2002 | Bladen et al. | 705/7 |
| 2003/0125997 A1* | 7/2003 | Stoltz | 705/7 |
| 2004/0002929 A1 | 1/2004 | Kim | |
| 2005/0021360 A1* | 1/2005 | Miller et al. | 705/1 |
| 2005/0060213 A1* | 3/2005 | Lavu et al. | 705/7 |
| 2005/0192963 A1* | 9/2005 | Tschiegg et al. | 707/9 |
| 2006/0287888 A1* | 12/2006 | Averill et al. | 705/2 |

* cited by examiner

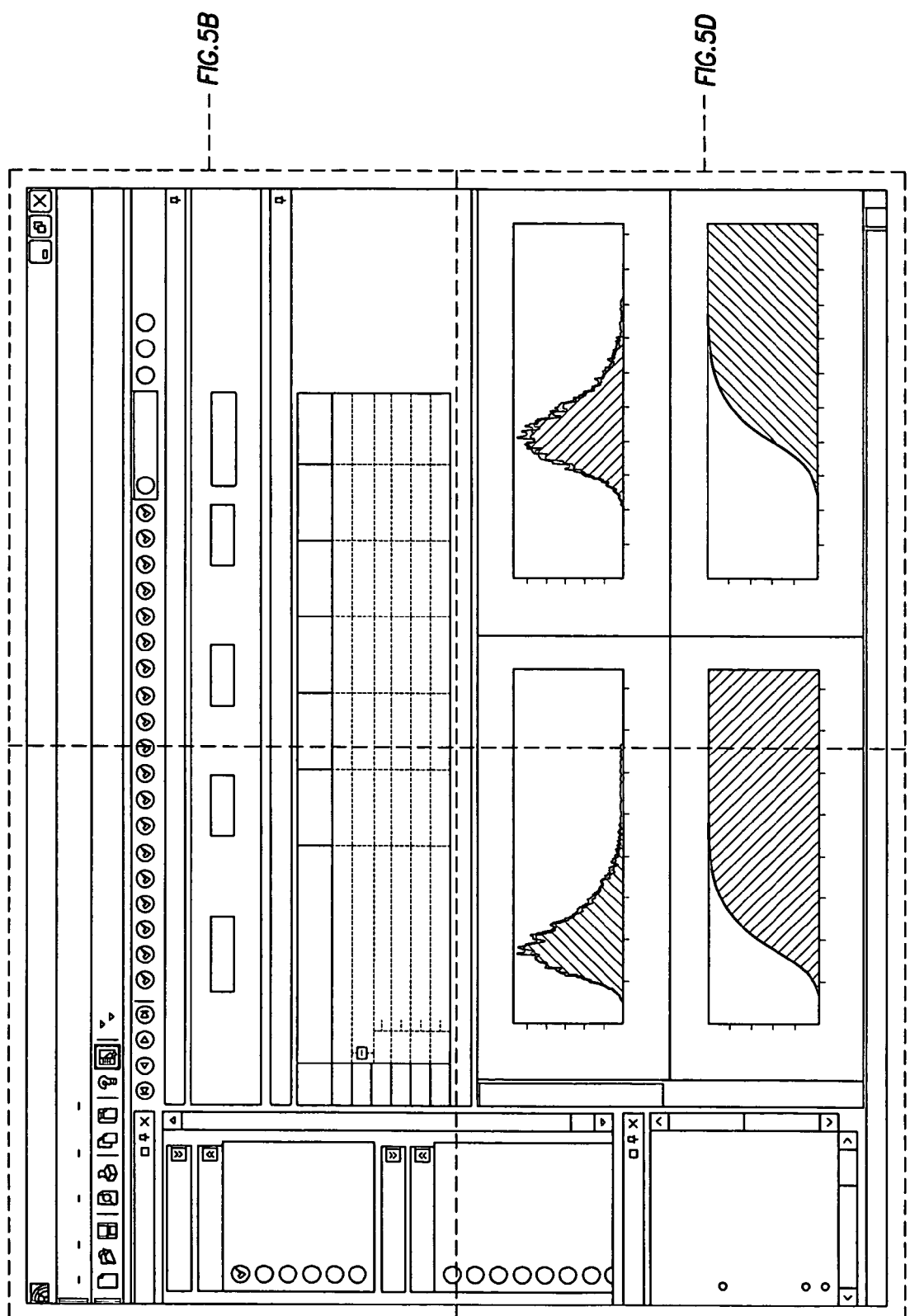

| Mid P%<br>Time | End P%<br>Time | First P%<br>Cost | Mid P%<br>Cost | End P%<br>Cost |
|---|---|---|---|---|
| day | day | K$ | K$ | K$ |
| 39.6 | 63.99 | 1,638 | 2,132 | 2,804 |
| 1.33 | 2.77 | 15 | 30 | 57 |
| 35.9 | 56.76 | 1,585 | 2,035 | 2,634 |
| 1.17 | 1.95 | 24 | 40 | 61 |
| 1.2 | 2.51 | 14 | 27 | 52 |

End P% Time: 50
End P% Time: 90

○ Monte Carlo

[Recompute]

FIG. 5B

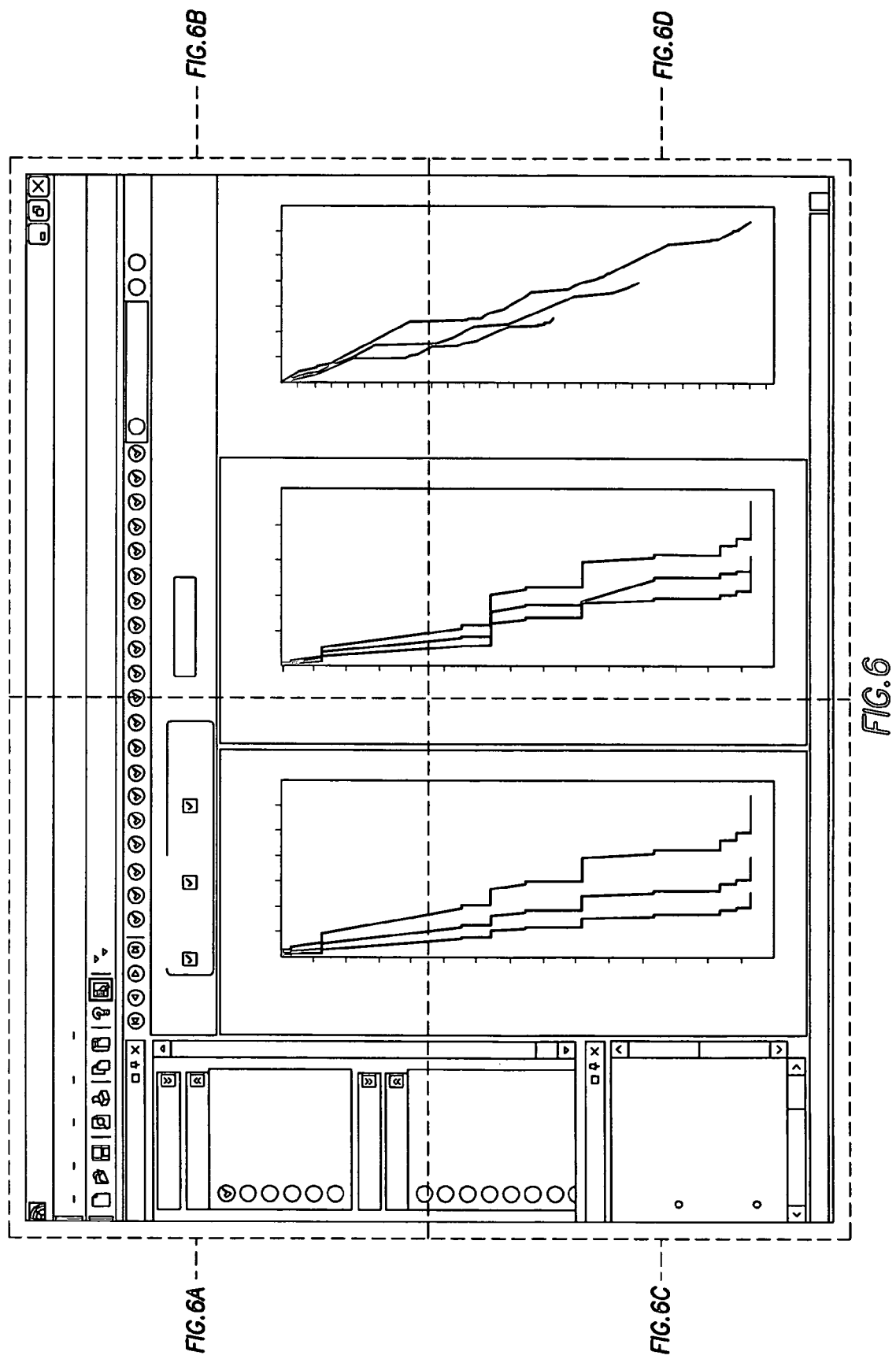

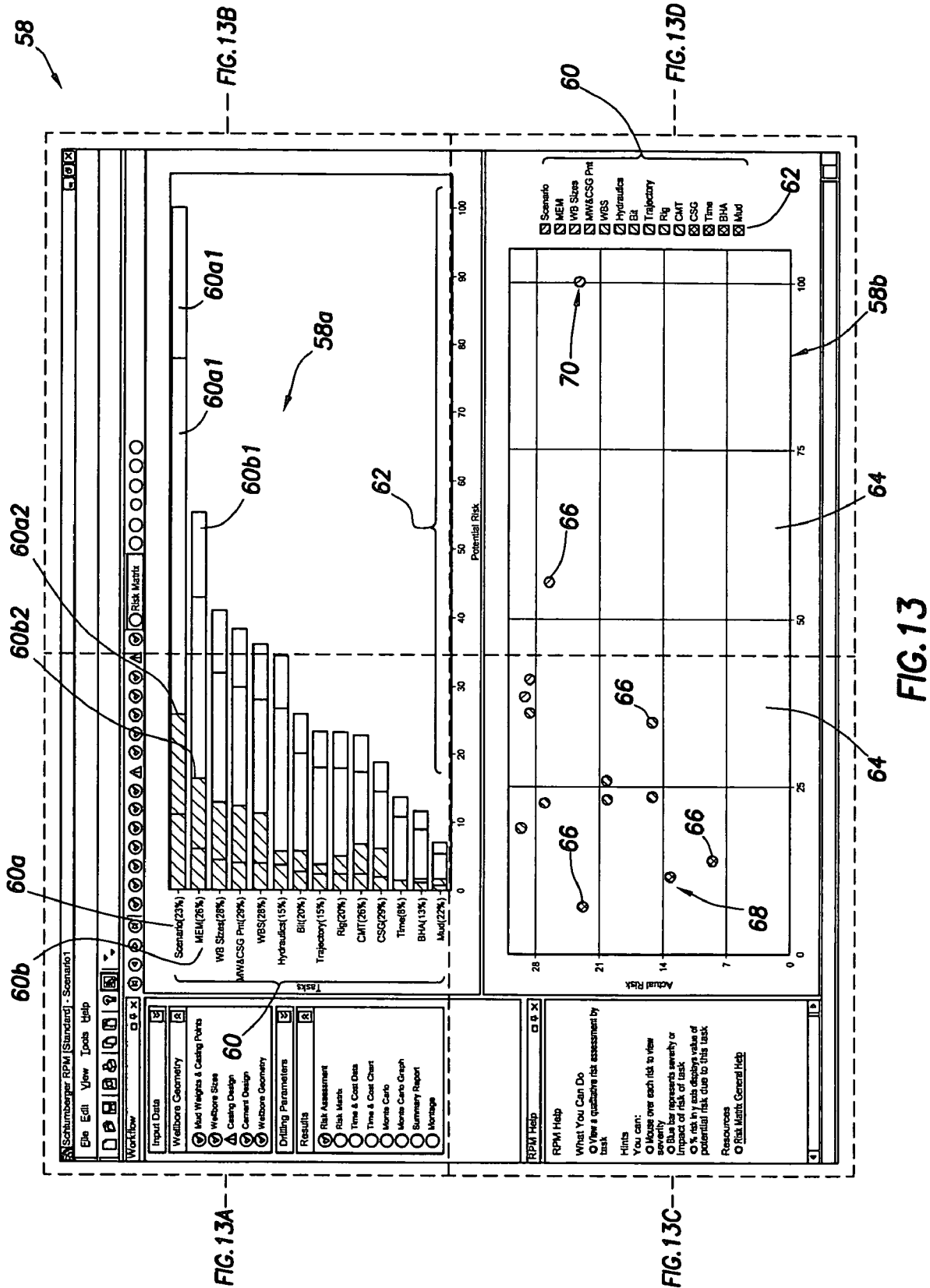

| MD | RiskIndex | Gains | Losses | Stuck | Mech. | H2S_CO2 | Hydrates | Well_WD | DLS | TORT | INC | Cutting_Hor_Disp | DDI |
|---|---|---|---|---|---|---|---|---|---|---|---|---|---|
| 184.51 | 33.58 | 42.12 | 34.16 | 28.27 | 12.11 | 10.00 | 10.00 | 10.00 | 10.00 | 10.00 | 10.00 | 10.00 | 10.00 |
| 194.36 | 33.58 | 42.12 | 34.16 | 28.27 | 12.11 | 10.00 | 10.00 | 10.00 | 10.00 | 10.00 | 10.00 | 10.00 | 10.00 |
| 204.20 | 31.81 | 42.12 | 28.34 | 24.06 | 12.11 | 10.00 | 10.00 | 10.00 | 10.00 | 10.00 | 10.00 | 10.00 | 10.00 |
| 214.04 | 31.81 | 42.12 | 28.34 | 24.06 | 12.11 | 10.00 | 10.00 | 10.00 | 10.00 | 10.00 | 10.00 | 10.00 | 10.00 |
| 223.88 | 31.81 | 42.12 | 28.34 | 24.06 | 12.11 | 10.00 | 10.00 | 10.00 | 10.00 | 10.00 | 10.00 | 10.00 | 10.00 |
| 233.73 | 28.74 | 11.85 | 38.83 | 32.43 | 18.05 | 10.00 | 10.00 | 10.00 | 10.00 | 10.00 | 10.00 | 10.00 | 10.00 |
| 243.57 | 28.74 | 11.85 | 38.83 | 32.43 | 18.05 | 10.00 | 10.00 | 10.00 | 10.00 | 10.00 | 10.00 | 10.00 | 10.00 |
| 253.41 | 28.74 | 11.85 | 38.83 | 32.43 | 18.05 | 10.00 | 10.00 | 10.00 | 10.00 | 10.00 | 10.00 | 10.00 | 10.00 |
| 263.25 | 23.56 | 11.85 | 30.68 | 26.53 | 18.05 | 10.00 | 10.00 | 10.00 | 10.00 | 10.00 | 10.00 | 10.00 | 10.00 |
| 273.10 | 23.56 | 11.85 | 30.68 | 26.53 | 18.05 | 10.00 | 10.00 | 10.00 | 10.00 | 10.00 | 10.00 | 10.00 | 10.00 |
| 282.94 | 23.56 | 11.85 | 30.68 | 26.53 | 18.05 | 10.00 | 10.00 | 10.00 | 10.00 | 10.00 | 10.00 | 10.00 | 10.00 |
| 292.78 | 18.77 | 11.85 | 23.68 | 21.48 | 18.05 | 10.00 | 10.00 | 10.00 | 10.00 | 10.00 | 10.00 | 10.00 | 10.00 |
| 302.62 | 18.77 | 11.85 | 23.68 | 21.48 | 18.05 | 10.00 | 10.00 | 10.00 | 10.00 | 10.00 | 10.00 | 10.00 | 10.00 |
| 312.47 | 18.77 | 11.85 | 23.68 | 21.48 | 18.05 | 10.00 | 10.00 | 10.00 | 10.00 | 10.00 | 10.00 | 10.00 | 10.00 |
| 322.31 | 18.77 | 11.85 | 23.68 | 21.48 | 18.05 | 10.00 | 10.00 | 10.00 | 10.00 | 10.00 | 10.00 | 10.00 | 10.00 |
| 332.15 | 18.77 | 11.85 | 23.68 | 21.48 | 18.05 | 10.00 | 10.00 | 10.00 | 10.00 | 10.00 | 10.00 | 10.00 | 10.00 |
| 341.99 | 36.81 | 35.48 | 46.12 | 33.04 | 19.05 | 10.00 | 10.00 | 10.00 | 10.00 | 10.00 | 10.00 | 10.00 | 10.00 |
| 351.84 | 36.81 | 35.48 | 46.12 | 33.04 | 19.05 | 10.00 | 10.00 | 10.00 | 10.00 | 10.00 | 10.00 | 10.00 | 10.00 |
| 361.68 | 32.71 | 35.48 | 39.13 | 27.99 | 19.05 | 10.00 | 10.00 | 10.00 | 10.00 | 10.00 | 10.00 | 10.00 | 10.00 |
| 371.52 | 32.71 | 35.48 | 39.13 | 27.99 | 19.05 | 10.00 | 10.00 | 10.00 | 10.00 | 10.00 | 10.00 | 10.00 | 10.00 |
| 381.36 | 32.71 | 35.48 | 39.13 | 27.99 | 19.05 | 10.00 | 10.00 | 10.00 | 10.00 | 10.00 | 10.00 | 10.00 | 10.00 |
| 391.21 | 32.71 | 35.48 | 39.13 | 27.99 | 19.05 | 10.00 | 10.00 | 10.00 | 10.00 | 10.00 | 10.00 | 10.00 | 10.00 |
| 401.05 | 32.71 | 35.48 | 39.13 | 27.99 | 19.05 | 10.00 | 10.00 | 10.00 | 10.00 | 10.00 | 10.00 | 10.00 | 10.00 |
| 410.89 | 32.71 | 35.48 | 39.13 | 27.99 | 19.05 | 10.00 | 10.00 | 10.00 | 10.00 | 10.00 | 10.00 | 10.00 | 10.00 |
| 420.73 | 32.71 | 35.48 | 39.13 | 27.99 | 19.05 | 10.00 | 10.00 | 10.00 | 10.00 | 10.00 | 10.00 | 10.00 | 10.00 |
| 430.58 | 32.71 | 35.48 | 39.13 | 27.99 | 19.05 | 10.00 | 10.00 | 10.00 | 10.00 | 10.00 | 10.00 | 10.00 | 10.00 |
| 440.42 | 32.71 | 35.48 | 39.13 | 27.99 | 19.05 | 10.00 | 10.00 | 10.00 | 10.00 | 10.00 | 10.00 | 10.00 | 10.00 |
| 450.26 | 30.07 | 35.48 | 33.31 | 23.78 | 19.05 | 10.00 | 10.00 | 10.00 | 10.00 | 10.00 | 10.00 | 10.00 | 10.00 |
| 460.11 | 30.07 | 35.48 | 33.31 | 23.78 | 19.05 | 10.00 | 10.00 | 10.00 | 10.00 | 10.00 | 10.00 | 10.00 | 10.00 |
| 469.95 | 30.07 | 35.48 | 33.31 | 23.78 | 19.05 | 10.00 | 10.00 | 10.00 | 10.00 | 10.00 | 10.00 | 10.00 | 10.00 |
| 479.79 | 30.07 | 35.48 | 33.31 | 23.78 | 19.05 | 10.00 | 10.00 | 10.00 | 10.00 | 10.00 | 10.00 | 10.00 | 10.00 |

FIG.14

METHOD AND APPARATUS AND PROGRAM STORAGE DEVICE ADAPTED FOR VISUALIZATION OF QUALITATIVE AND QUANTITATIVE RISK ASSESSMENT BASED ON TECHNICAL WELLBORE DESIGN AND EARTH PROPERTIES

CROSS REFERENCE TO RELATED APPLICATIONS

This application is related to pending application Ser. No. 10/802,507 filed Mar. 17, 2004; and is related to pending application serial number 10/802,545 filed Mar. 17, 2004; and it is related to pending application Ser. No. 10/802,524 filed Mar. 17, 2004; and it is related to pending application Ser. No. 10/802,622 filed Mar. 17, 2004.

BACKGROUND OF THE INVENTION

The subject matter of the present invention relates to a software system adapted to be stored in a computer system, such as a personal computer, for providing a a two-dimensional or a three-dimensional visualization of a qualitative and quantitative risk assessment based on technical wellbore design and Earth properties.

Minimizing wellbore costs and associated risks requires wellbore construction planning techniques that account for the interdependencies involved in the wellbore design. The inherent difficulty is that most design processes and systems exist as independent tools used for individual tasks by the various disciplines involved in the planning process. In an environment where increasingly difficult wells of higher value are being drilled with fewer resources, there is now, more than ever, a need for a rapid well-planning, cost, and risk assessment tool.

This specification discloses a software system representing an automated process adapted for integrating both a wellbore construction planning workflow and accounting for process interdependencies. The automated process is based on a drilling simulator, the process representing a highly interactive process which is encompassed in a software system that: (1) allows well construction practices to be tightly linked to geological and geomechanical models, (2) enables asset teams to plan realistic well trajectories by automatically generating cost estimates with a risk assessment, thereby allowing quick screening and economic evaluation of prospects, (3) enables asset teams to quantify the value of additional information by providing insight into the business impact of project uncertainties, (4) reduces the time required for drilling engineers to assess risks and create probabilistic time and cost estimates faithful to an engineered well design, (5) permits drilling engineers to immediately assess the business impact and associated risks of applying new technologies, new procedures, or different approaches to a well design. Discussion of these points illustrate the application of the workflow and verify the value, speed, and accuracy of this integrated well planning and decision-support tool.

Identifying the risks associated with drilling a well is probably the most subjective process in well planning today. This is based on a person recognizing part of a technical well design that is out of place relative to the earth properties or mechanical equipment to be used to drill the well. The identification of any risks is brought about by integrating all of the well, earth, and equipment information in the mind of a person and mentally sifting through all of the information, mapping the interdependencies, and based solely on personal experience extracting which parts of the project pose what potential risks to the overall success of that project. This is tremendously sensitive to human bias, the individual's ability to remember and integrate all of the data in their mind, and the individuals experience to enable them to recognize the conditions that trigger each drilling risk. Most people are not equipped to do this and those that do are very inconsistent unless strict process and checklists are followed. There are some drilling risk software systems in existence today, but they all require the same human process to identify and assess the likelihood of each individual risks and the consequences. They are simply a computer system for manually recording the results of the risk identification process.

The Risk Assessment sub-task associated with the 'Automatic Well Planning Software System' of the present invention is a system that will automatically assess risks associated with the technical well design decisions in relation to the earth's geology and geomechanical properties and in relation to the mechanical limitations of the equipment specified or recommended for use.

When users are lucky enough to have identified and captured drilling risks for drilling a given well, there are no prescribed standard visualization techniques that truly add value to the risk information already created. There are some techniques for locating an individual risk event at a specified measured depth or depth interval. This is usually done using some type of symbol or shape and pattern combination in a 3D space. There is no way of nicely displaying risks that overlap or are interdependent and no way of looking at generalized risk level for the well at each depth. It is also very difficult to see risk categories and individual risks individually or simultaneously in 2D or 3D. All of these problems lead to the need for improved risk visualization techniques.

SUMMARY OF THE INVENTION

One aspect of the present invention involves a method of determining and displaying risk information in response to a plurality of input data, the input data including a plurality of input data calculation results, comprising the steps of: comparing each calculation result of the plurality of input data calculation results of the input data with each logical expression of a plurality of logical expressions; ranking by the logical expression the calculation result; and generating a plurality of ranked individual risks in response to the ranking step, each of the plurality of ranked individual risks representing an input data calculation result that has been ranked by the logical expression as having either a high risk severity or a medium risk severity or a low risk severity; generating the risk information in response to the plurality of ranked individual risks; and displaying the risk information, the displaying step including displaying the risk information on a risk information display, the risk information display including a display of the plurality of ranked individual risks as a function of depth in a wellbore.

Another aspect of the present invention involves a method of determining and displaying risk information in response to a plurality of input data, the input data including a plurality of input data calculation results, comprising the steps of: comparing each calculation result of the plurality of input data calculation results of the input data with each logical expression of a plurality of logical expressions; ranking, by the logical expression, each the calculation result; and generating a plurality of ranked individual risks in response to the ranking step, each of the plurality of ranked individual risks representing an input data calculation result that has been ranked by the logical expression as having either a high risk severity or a medium risk severity or a low risk severity; generating a plurality of design tasks in response to the ranked individual risks; and displaying the risk information in response to the plurality of design tasks, the displaying step including displaying a risk information display, the risk information display including a display of each of the design tasks.

Another aspect of the present invention involves a method of determining and displaying risk information in response to a plurality of input data, the input data including a plurality of input data calculation results, comprising the steps of: comparing each calculation result of the plurality of input data calculation results of the input data with each logical expression of a plurality of logical expressions; ranking, by the logical expression, each the input data calculation result; and generating a plurality of ranked individual risks in response to the ranking step, each of the plurality of ranked individual risks representing an input data calculation result that has been ranked by the logical expression as having either a high risk severity or a medium risk severity or a low risk severity; generating the risk information in response to the plurality of ranked individual risks; and displaying the risk information, the displaying step including displaying a risk information display, the risk information display including a display of the plurality of the ranked individual risks extending along a length of a wellbore.

Another aspect of the present invention involves a program storage device readable by a machine tangibly embodying a program of instructions executable by the machine to perform method steps for determining and displaying risk information in response to a plurality of input data, the input data including a plurality of input data calculation results, the method steps comprising: comparing each calculation result of the plurality of input data calculation results of the input data with each logical expression of a plurality of logical expressions; ranking by the logical expression the calculation result; and generating a plurality of ranked individual risks in response to the ranking step, each of the plurality of ranked individual risks representing an input data calculation result that has been ranked by the logical expression as having either a high risk severity or a medium risk severity or a low risk severity; generating the risk information in response to the plurality of ranked individual risks; and displaying the risk information, the displaying step including displaying the risk information on a risk information display, the risk information display including a display of the plurality of ranked individual risks as a function of depth in a wellbore.

Another aspect of the present invention involves a program storage device readable by a machine tangibly embodying a program of instructions executable by the machine to perform method steps for determining and displaying risk information in response to a plurality of input data, the input data including a plurality of input data calculation results, the method steps comprising: comparing each calculation result of the plurality of input data calculation results of the input data with each logical expression of a plurality of logical expressions; ranking, by the logical expression, each the calculation result; and generating a plurality of ranked individual risks in response to the ranking step, each of the plurality of ranked individual risks representing an input data calculation result that has been ranked by the logical expression as having either a high risk severity or a medium risk severity or a low risk severity; generating a plurality of design tasks in response to the ranked individual risks; and displaying the risk information in response to the plurality of design tasks, the displaying step including displaying a risk information display, the risk information display including a display of each of the design tasks.

Another aspect of the present invention involves a program storage device readable by a machine tangibly embodying a program of instructions executable by the machine to perform method steps for determining and displaying risk information in response to a plurality of input data, the input data including a plurality of input data calculation results, the method steps comprising: comparing each calculation result of the plurality of input data calculation results of the input data with each logical expression of a plurality of logical expressions; ranking, by the logical expression, each the input data calculation result; and generating a plurality of ranked individual risks in response to the ranking step, each of the plurality of ranked individual risks representing an input data calculation result that has been ranked by the logical expression as having either a high risk severity or a medium risk severity or a low risk severity; generating the risk information in response to the plurality of ranked individual risks; and displaying the risk information, the displaying step including displaying a risk information display, the risk information display including a display of the plurality of the ranked individual risks extending along a length of a wellbore.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIG. 5 including FIGS. 5A, 5B, 5C, and 5D illustrate a Monte Carlo time and cost distribution;

FIG. 6 including

FIG. 13 including

FIG. 14 illustrates another example of the risk assessment output data 18b1 being recorded or displayed on the recorder or display device 18b in FIG. 9B in accordance with another aspect of the present invention, FIG. 14 illustrating an example of a data output of a risk assessment quantification per risk category as a function of depth in the wellbore;

DETAILED DESCRIPTION

Figure 1:
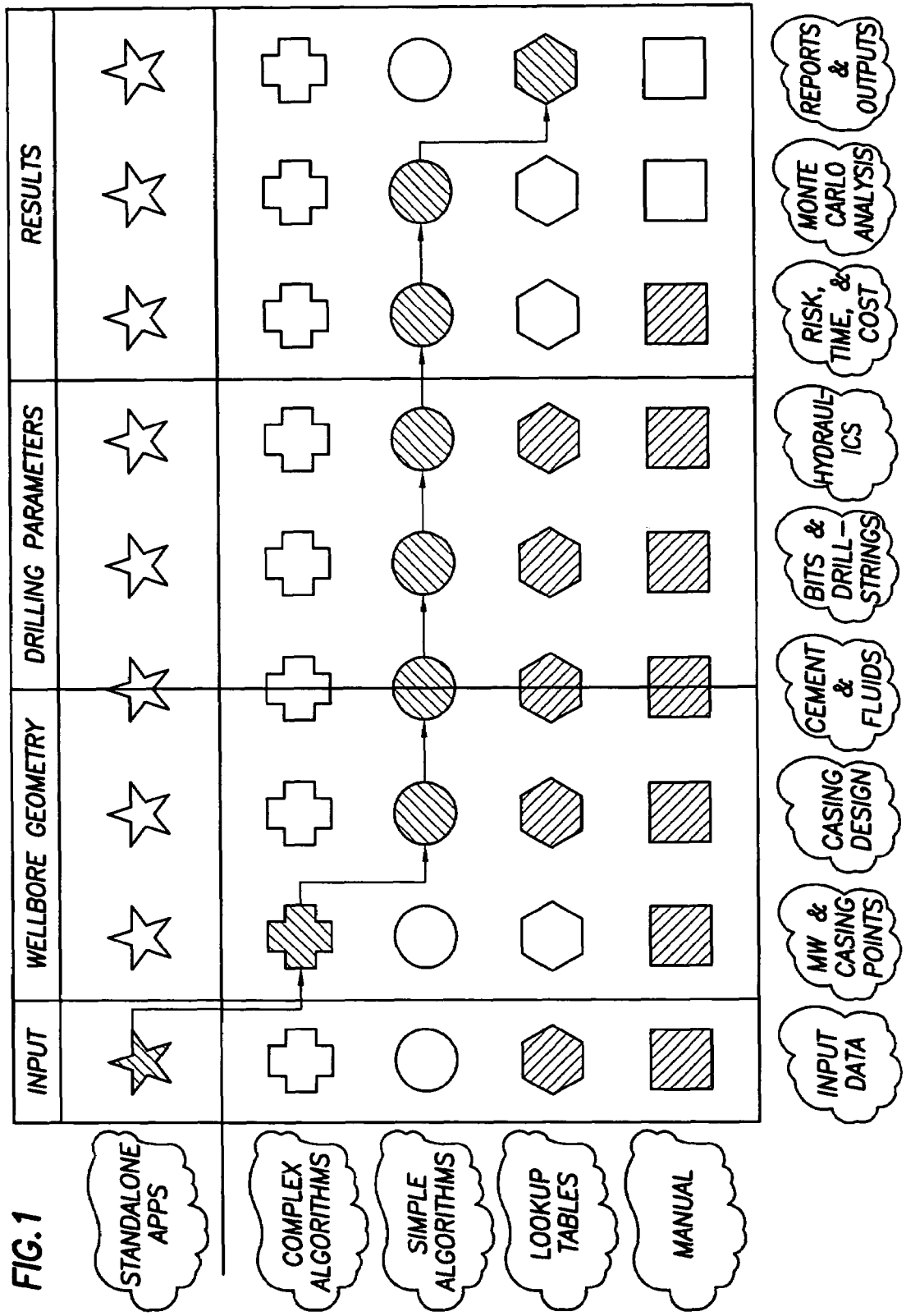
FIG. 1 illustrates a software architecture schematic indicating a modular nature to support custom workflows.

An 'Automatic Well Planning Software System' in accordance with the present invention is disclosed in this specification. The 'Automatic Well Planning Software System' is a "smart" tool for rapid creation of a detailed drilling operational plan that provides economics and risk analysis. The user inputs trajectory and earth properties parameters; the system uses this data and various catalogs to calculate and deliver an optimum well design thereby generating a plurality of outputs, such as drill string design, casing seats, mud weights, bit selection and use, hydraulics, and the other essential factors for the drilling task. System tasks are arranged in a single workflow in which the output of one task is included as input to the next. The user can modify most outputs, which permits fine-tuning of the input values for the next task. The 'Automatic Well Planning Software System' has two primary user groups: (1) Geoscientist: Works with trajectory and earth properties data; the 'Automatic Well Planning Software System' provides the necessary drilling engineering calculations; this allows the user to scope drilling candidates rapidly in terms of time, costs, and risks; and (2) Drilling engineer: Works with wellbore geometry and drilling parameter outputs to achieve optimum activity plan and risk assessment; Geoscientists typically provide the trajectory and earth properties data. The scenario, which consists of the entire process and its output, can be exported for sharing with other users for peer review or as a communication tool to facilitate project management between office and field. Variations on a scenario can be created for use in business decisions. The 'Automatic Well Planning Software System' can also be used as a training tool for geoscientists and drilling engineers.

The 'Automatic Well Planning Software System' will enable the entire well construction workflow to be run through quickly. In addition, the 'Automatic Well Planning Software System' can ultimately be updated and re-run in a time-frame that supports operational decision making. The entire replanning process must be fast enough to allow users to rapidly iterate to refine well plans through a series of what-if scenarios.

The decision support algorithms provided by the 'Automatic Well Planning Software System' disclosed in this specification would link geological and geomechanical data with the drilling process (casing points, casing design, cement, mud, bits, hydraulics, etc) to produce estimates and a breakdown of the well time, costs, and risks. This will allow interpretation variations, changes, and updates of the Earth Model to be quickly propagated through the well planning process.

The software associated with the aforementioned 'Automatic Well Planning Software System' accelerates the prospect selection, screening, ranking, and well construction workflows. The target audiences are two fold: those who generate drilling prospects, and those who plan and drill those prospects. More specifically, the target audiences include: Asset Managers, Asset Teams (Geologists, Geophysicists, Reservoir Engineers, and Production Engineers), Drilling Managers, and Drilling Engineers.

Asset Teams will use the software associated with the 'Automatic Well Planning Software System' as a scoping tool for cost estimates, and assessing mechanical feasibility, so that target selection and well placement decisions can be made more knowledgeably, and more efficiently. This process will encourage improved subsurface evaluation and provide a better appreciation of risk and target accessibility. Since the system can be configured to adhere to company or local design standards, guidelines, and operational practices, users will be confident that well plans are technically sound.

Drilling Engineers will use the software associated with the 'Automatic Well Planning Software System' disclosed in this specification for rapid scenario planning, risk identification, and well plan optimization. It will also be used for training, in planning centers, universities, and for looking at the drilling of specific wells, electronically drilling the well, scenario modeling and 'what-if' exercises, prediction and diagnosis of events, post-drilling review and knowledge transfer.

The software associated with the 'Automatic Well Planning Software System' will enable specialists and vendors to demonstrate differentiation amongst new or competing technologies. It will allow operators to quantify the risk and business impact of the application of these new technologies or procedures.

Therefore, the 'Automatic Well Planning Software System' disclosed in this specification, in accordance with the present invention, will: (1) dramatically improve the efficiency of the well planning and drilling processes by incorporating all available data and well engineering processes in a single predictive well construction model, (2) integrate predictive models and analytical solutions for wellbore stability, mud weights & casing seat selection, tubular & hole size selection, tubular design, cementing, drilling fluids, bit selection, rate of penetration, BHA design, drillstring design, hydraulics, risk identification, operations planning, and probabilistic time and cost estimation, all within the framework of a mechanical earth model, (3) easily and interactively manipulate variables and intermediate results within individual scenarios to produce sensitivity analyses. As a result, when the 'Automatic Well Planning Software System' of the present invention is utilized, the following results will be achieved: (1) more accurate results, (2) more effective use of engineering resources, (3) increased awareness, (4) reduced risks while drilling, (5) decreased well costs, and (6) a standard methodology or process for optimization through iteration in planning and execution. As a result, during the implementation of the 'Automatic Well Planning Software System' of the present invention, the emphasis was placed on architecture and usability.

In connection with the implementation of the 'Automatic Well Planning Software System', the software development effort was driven by the requirements of a flexible architecture which must permit the integration of existing algorithms and technologies with commercial-off-the-shelf (COTS) tools for data visualization. Additionally, the workflow demanded that the product be portable, lightweight and fast, and require a very small learning curve for users. Another key requirement was the ability to customize the workflow and configuration based on proposed usage, user profile and equipment availability.

The software associated with the 'Automatic Well Planning Software System' was developed using the 'Ocean' framework owned by Schlumberger Technology Corporation of Houston, Tex. This framework uses Microsoft's .NET technologies to provide a software development platform which allows for easy integration of COTS software tools with a flexible architecture that was specifically designed to support custom workflows based on existing drilling algorithms and technologies.

Referring to FIG. 1, a software architecture schematic is illustrated indicating the 'modular nature' for supporting custom workflows. FIG. 1 schematically shows the modular architecture that was developed to support custom workflows. This provides the ability to configure the application based on the desired usage. For a quick estimation of the time, cost and risk associated with the well, a workflow consisting of lookup tables and simple algorithms can be selected. For a more detailed analysis, complex algorithms can be included in the workflow.

In addition to customizing the workflow, the software associated with the 'Automatic Well Planning Software System' of the present invention was designed to use user-specified equipment catalogs for its analysis. This ensures that any results produced by the software are always based on local best practices and available equipment at the project site. From a usability perspective, application user interfaces were designed to allow the user to navigate through the workflow with ease.

Figure 2:
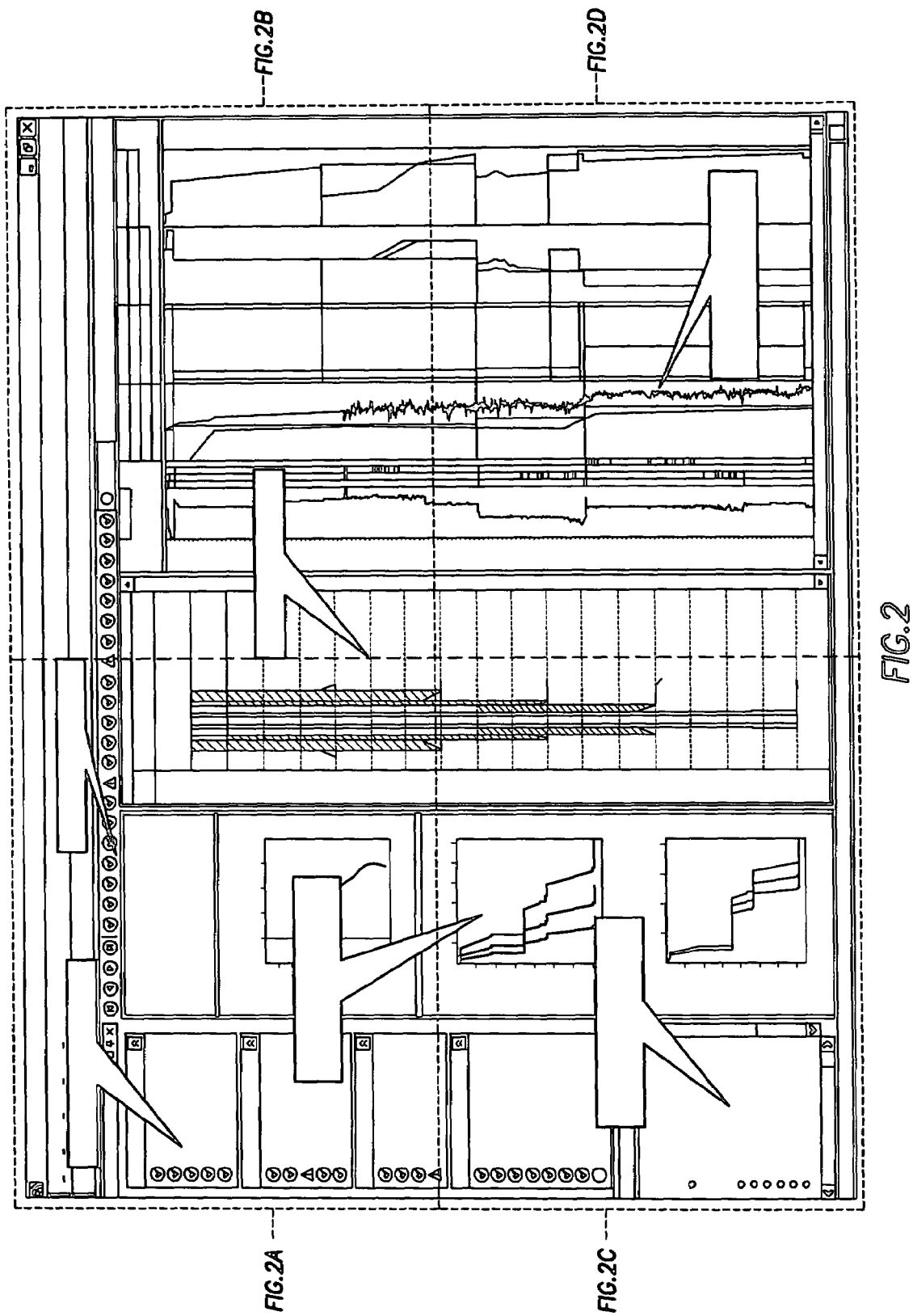
FIG. 2 including
Figure 2A:
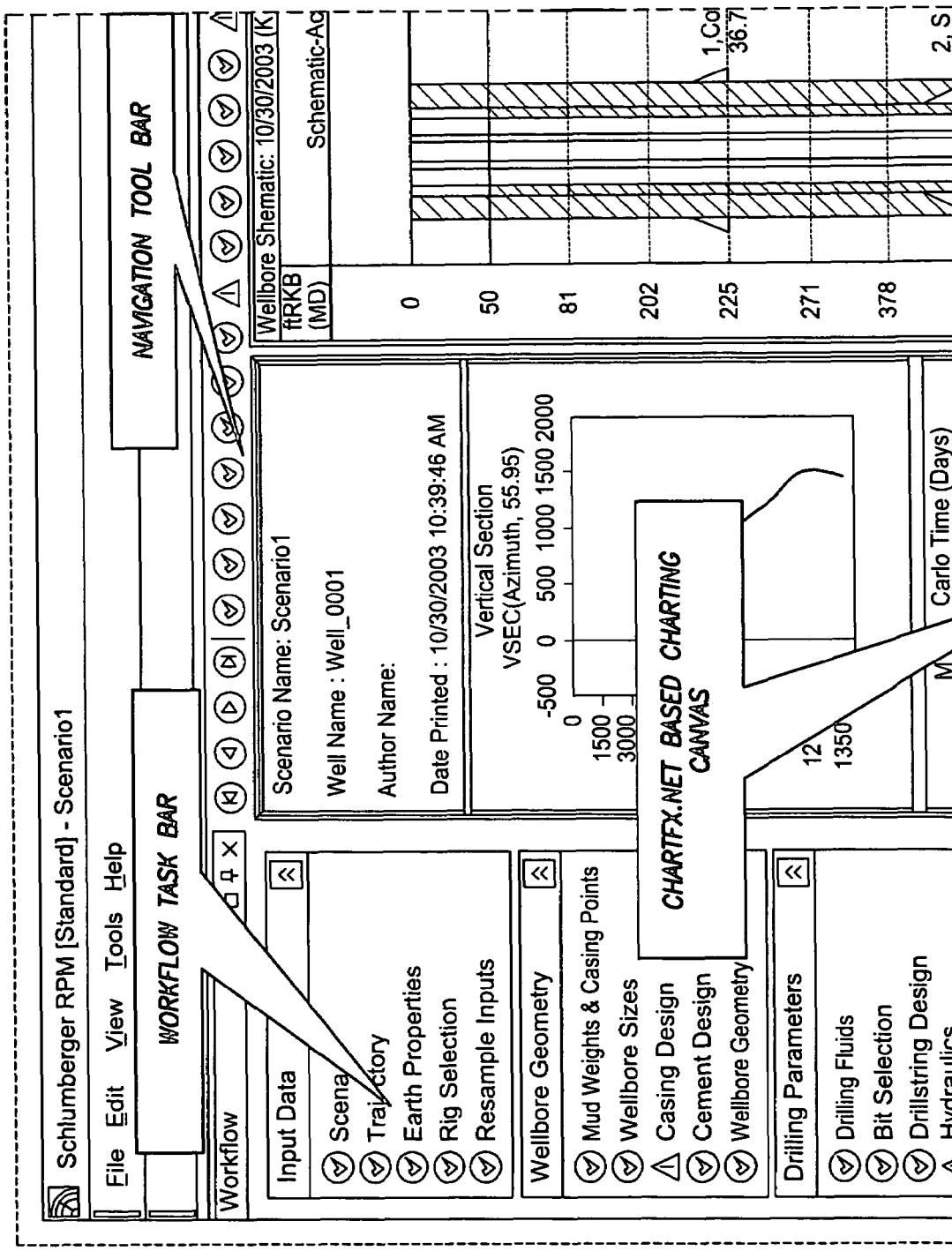
FIGS. 2A, 2B, 2C, and 2D illustrate a typical task view consisting of workflow, help and data canvases.
Figure 2B:
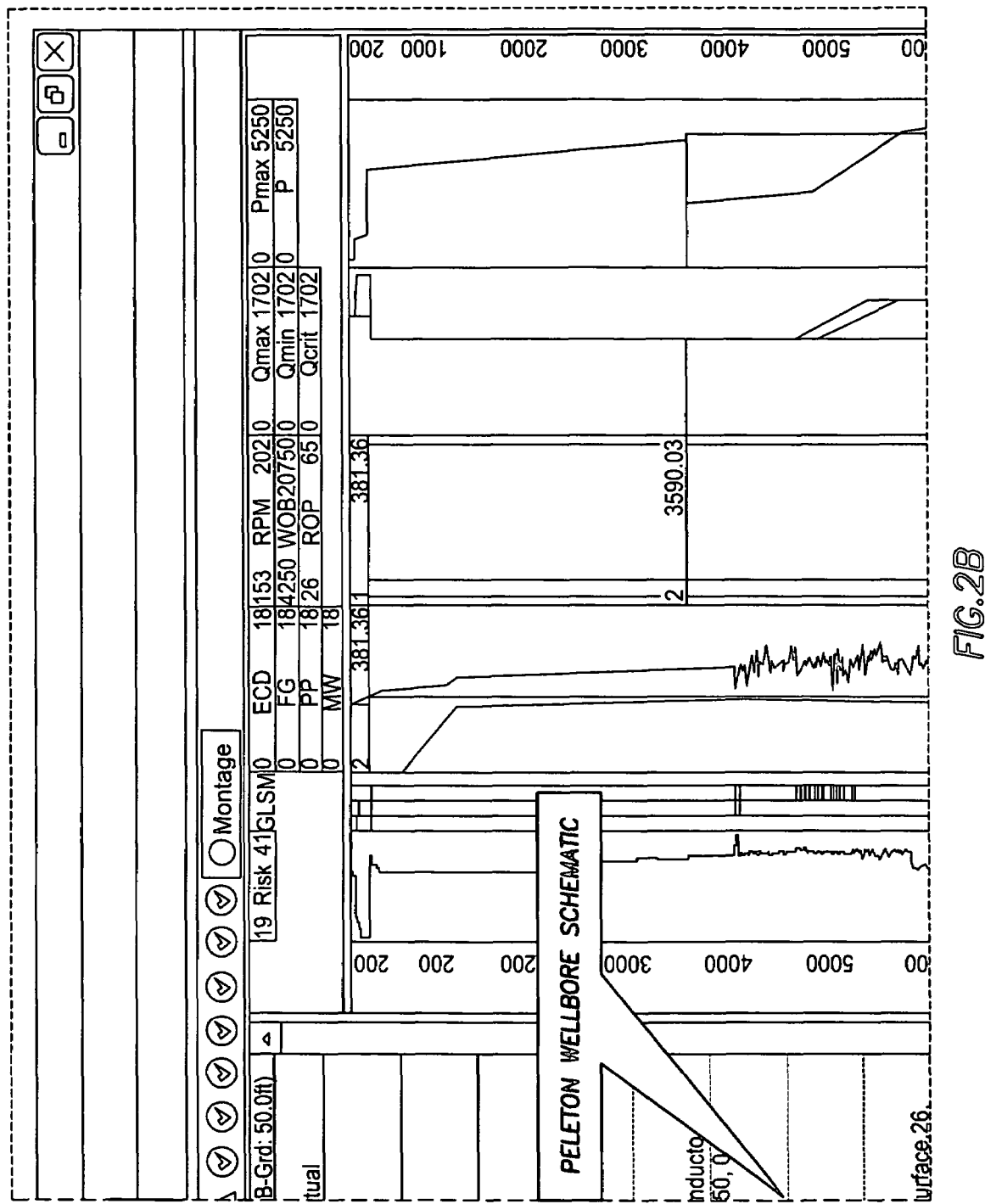
Figure 2C:
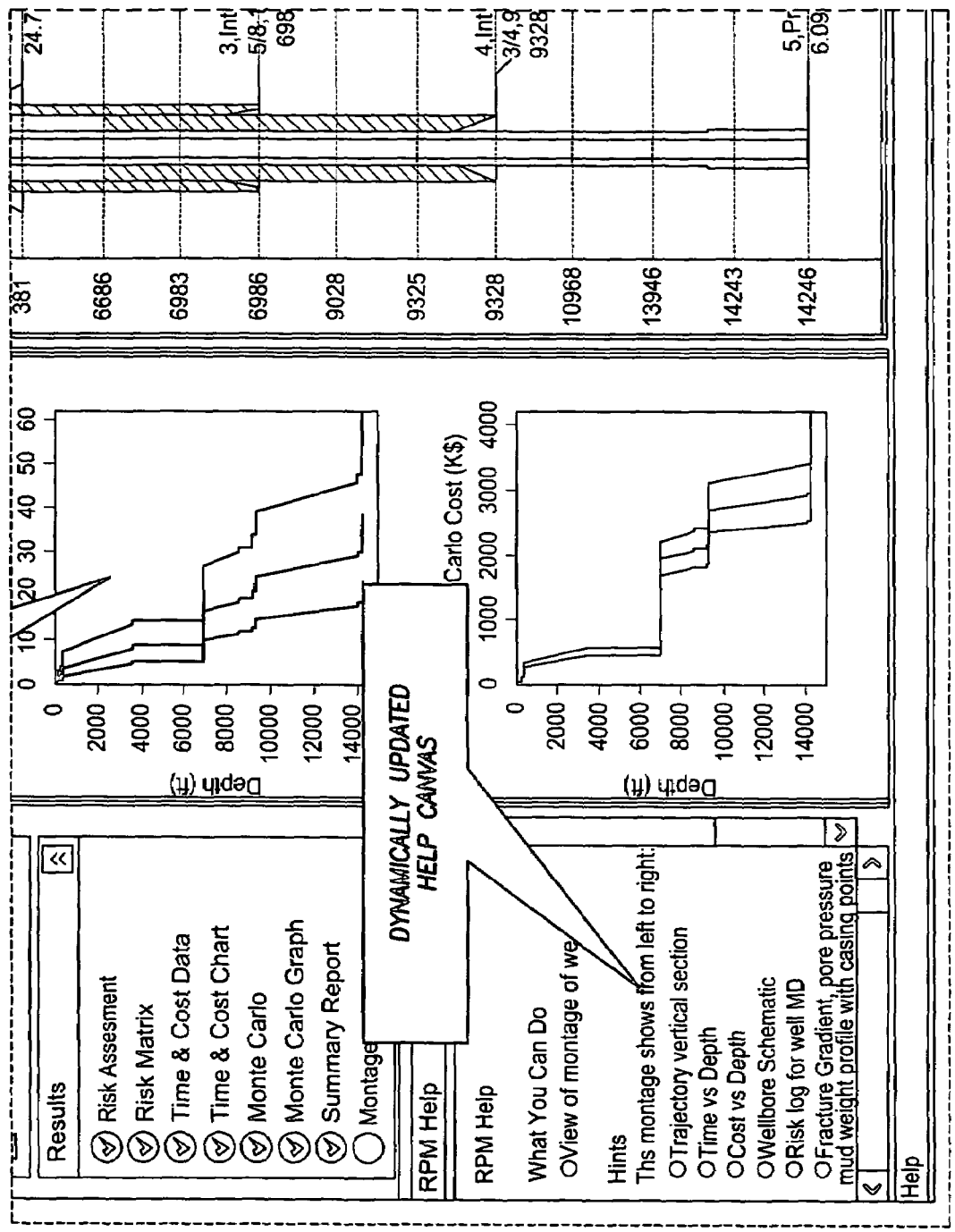
Figure 2D:
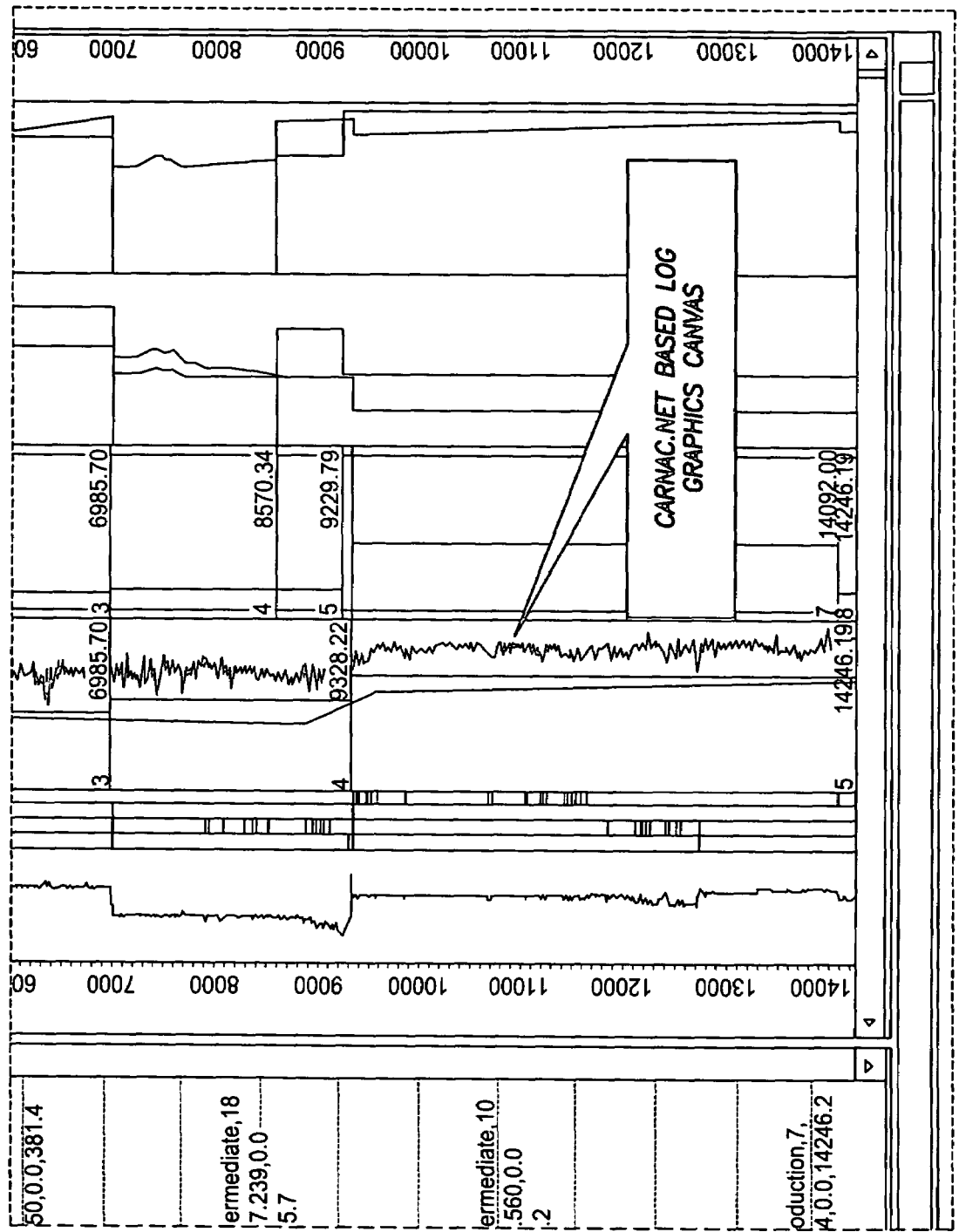

Referring to FIG. 2, a typical task view consisting of workflow, help and data canvases is illustrated. FIG. 2 shows a typical task view with its associated user canvases. A typical task view consists of a workflow task bar, a dynamically updating help canvas, and a combination of data canvases based on COTS tools like log graphics, Data Grids, Wellbore Schematic and charting tools. In any task, the user has the option to modify data through any of the canvases; the application then automatically synchronizes the data in the other canvases based on these user modifications.

The modular nature of the software architecture associated with the 'Automatic Well Planning Software System' also allows the setting-up of a non-graphical workflow, which is key to implementing advanced functionality, such as batch processing of an entire field, and sensitivity analysis based on key parameters, etc.

Basic information for a scenario, typical of well header information for the well and wellsite, is captured in the first task. The trajectory (measured depth, inclination, and azimuth) is loaded and the other directional parameters like true vertical depth and dogleg severity are calculated automatically and graphically presented to the user.

The 'Automatic Well Planning Software System' disclosed in this specification requires the loading of either geomechanical earth properties extracted from an earth model, or, at a minimum, pore pressure, fracture gradient, and unconfined compressive strength. From this input data, the 'Automatic Well Planning Software System' automatically selects the most appropriate rig and associated properties, costs, and mechanical capabilities. The rig properties include parameters like derrick rating to evaluate risks when running heavy casing strings, pump characteristics for the hydraulics, size of the BOP, which influences the sizes of the casings, and very importantly the daily rig rate and spread rate. The user can select a different rig than what the 'Automatic Well Planning Software System' proposed and can modify any of the technical specifications suggested by the software.

Other wellbore stability algorithms (which are offered by Schlumberger Technology Corporation, or Houston, Tex.) calculate the predicted shear failure and the fracture pressure as a function of depth and display these values with the pore pressure. The 'Automatic Well Planning Software System' then proposes automatically the casing seats and maximum mud weight per hole section using customizable logic and rules. The rules include safety margins to the pore pressure and fracture gradient, minimum and maximum lengths for hole sections and limits for maximum overbalance of the drilling fluid to the pore pressure before a setting an additional casing point. The 'Automatic Well Planning Software System' evaluates the casing seat selection from top-to-bottom and from bottom-to-top and determines the most economic variant. The user can change, insert, or delete casing points at any time, which will reflect in the risk, time, and cost for the well.

Figure 3:
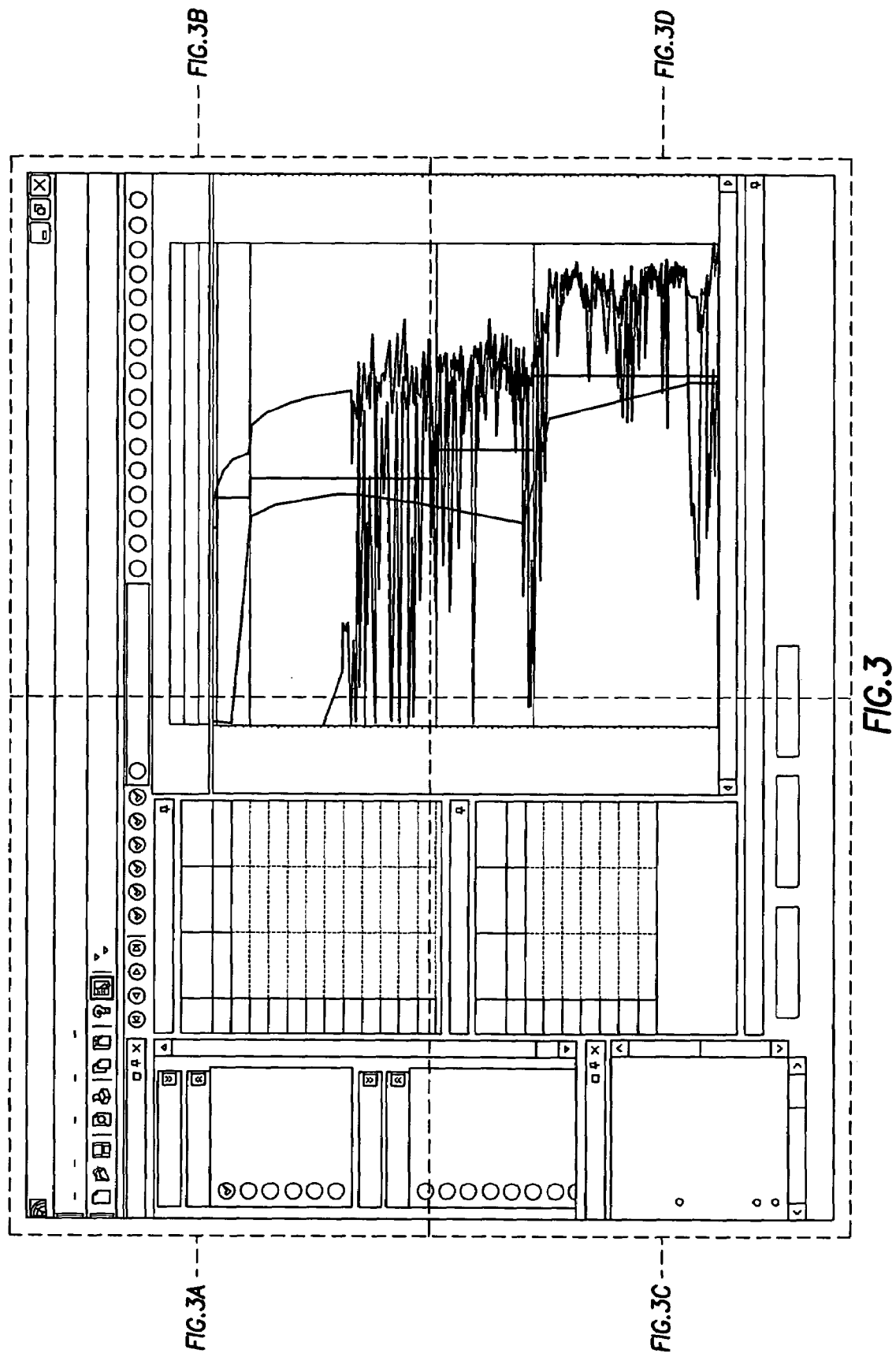
FIG. 3 including
Figure 3A:
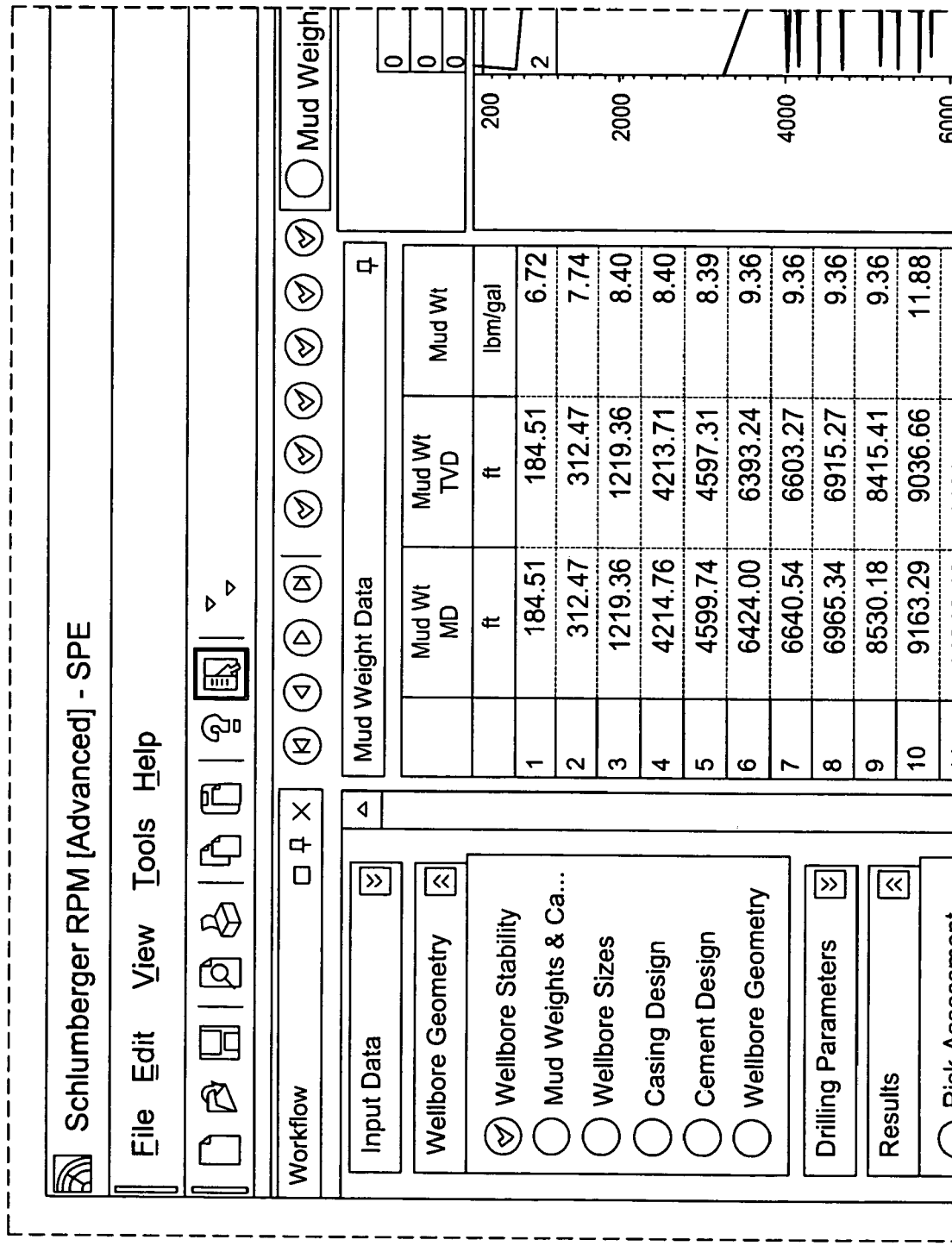
FIGS. 3A, 3B, 3C, and 3D illustrate wellbore stability, mud weights, and casing points.
Figure 3B:
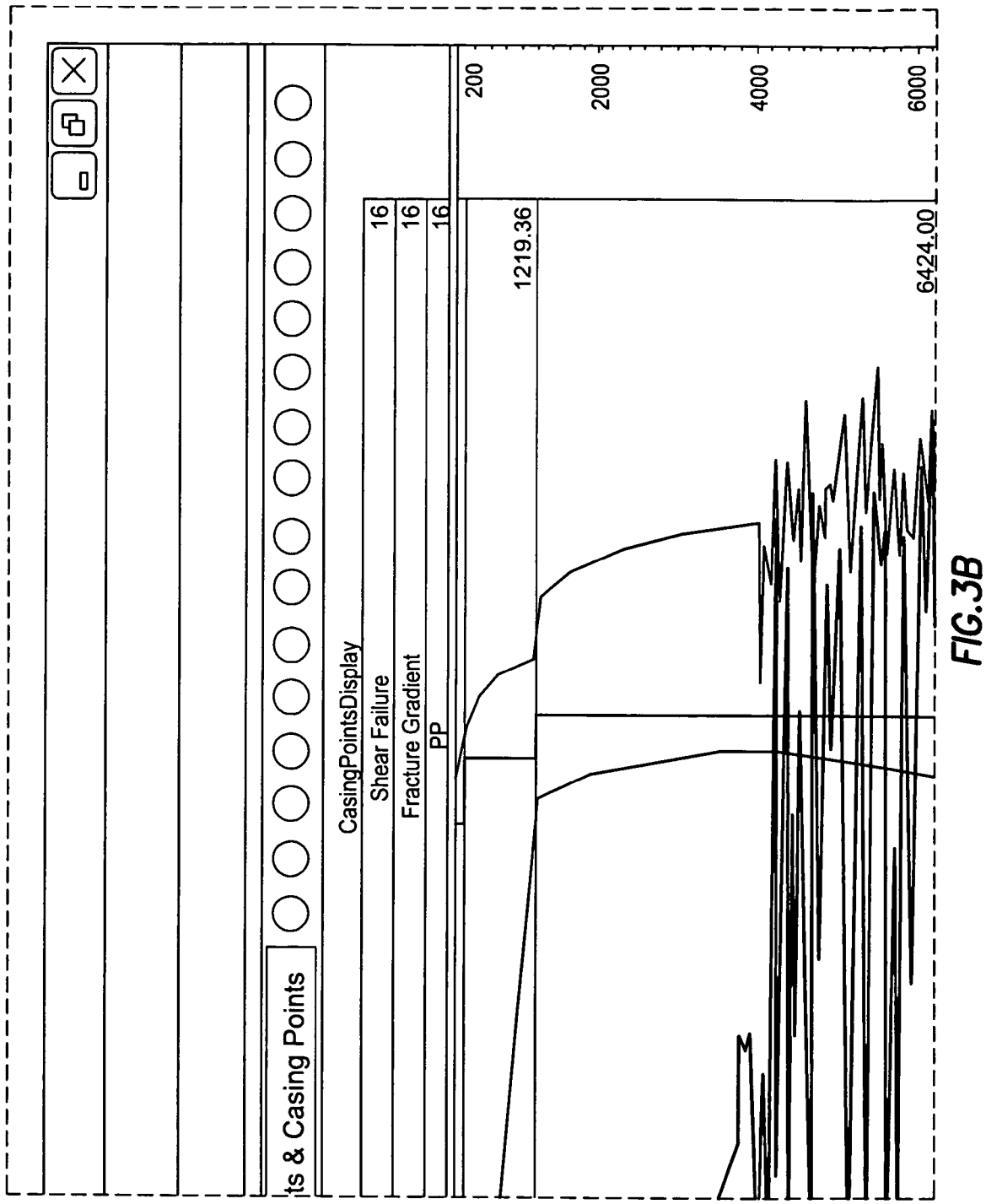
Figure 3C:
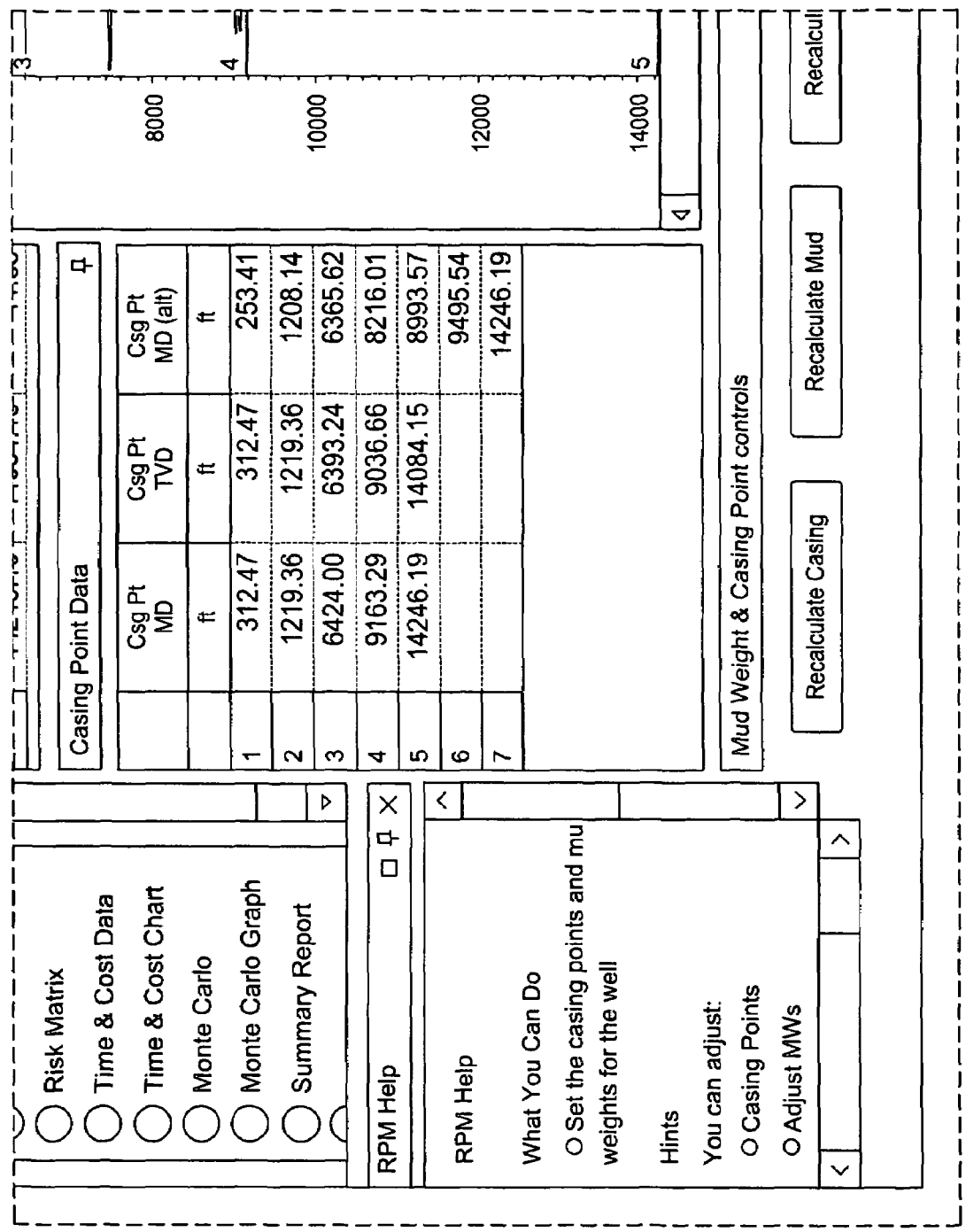
Figure 3D:
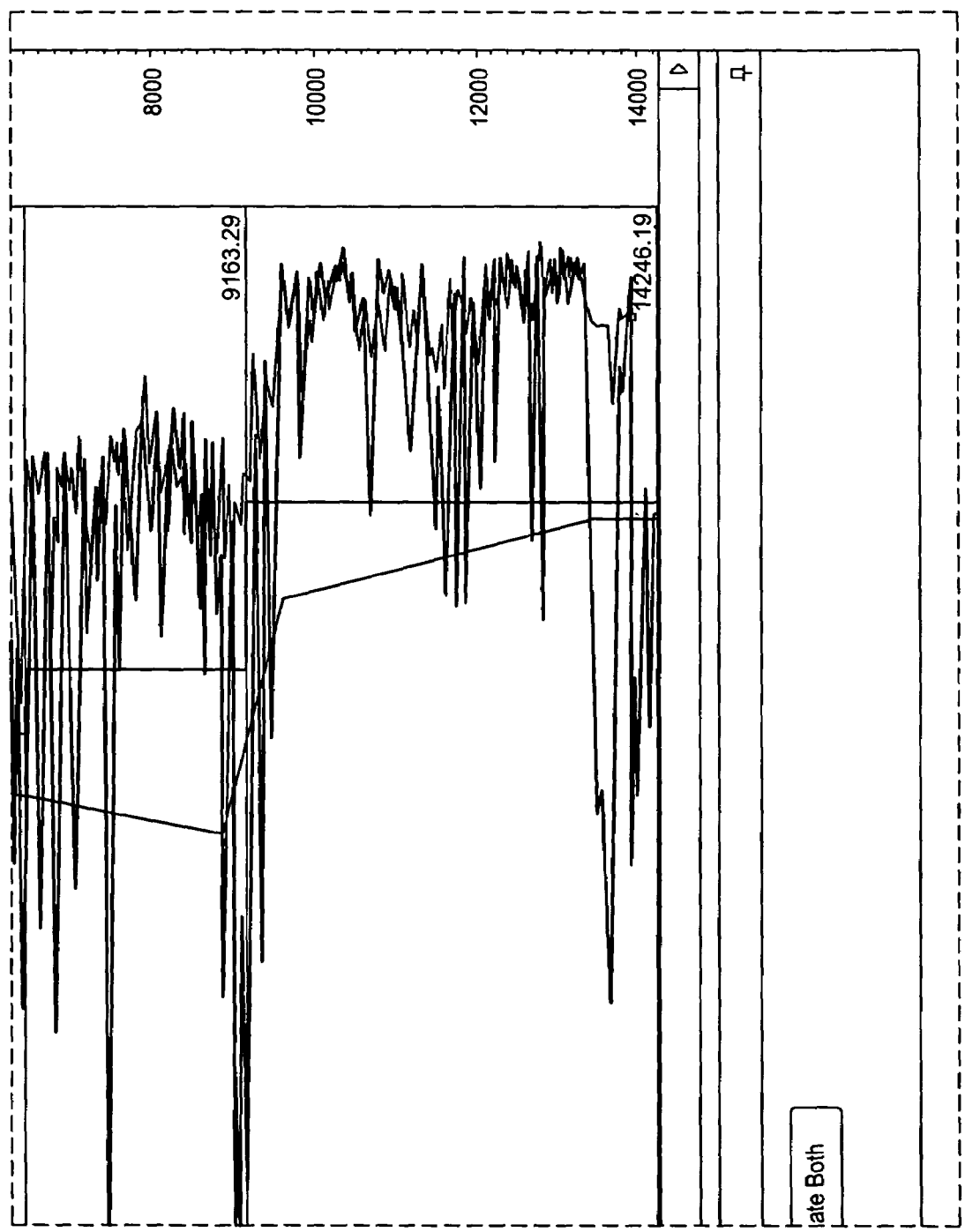

Referring to FIG. 3, a display showing wellbore stability, mud weights, and casing points is illustrated.

The wellbore sizes are driven primarily by the production tubing size. The preceding casing and hole sizes are determined using clearance factors. The wellbore sizes can be restricted by additional constraints, such as logging requirements or platform slot size. Casing weights, grades, and connection types are automatically calculated using traditional biaxial design algorithms and simple load cases for burst, collapse and tension. The most cost effective solution is chosen when multiple suitable pipes are found in the extensive tubular catalog. Non-compliance with the minimum required design factors are highlighted to the user, pointing out that a manual change of the proposed design may be in order. The 'Automatic Well Planning Software System' allows full strings to be replaced with liners, in which case, the liner overlap and hanger cost are automatically suggested while all strings are redesigned as necessary to account for changes in load cases. The cement slurries and placement are automatically proposed by the 'Automatic Well Planning Software System'. The lead and tail cement tops, volumes, and densities are suggested. The cementing hydrostatic pressures are validated against fracture pressures, while allowing the user to modify the slurry interval tops, lengths, and densities. The cost is derived from the volume of the cement job and length of time required to place the cement.

The 'Automatic Well Planning Software System' proposes the proper drilling fluid type including rheology properties that are required for hydraulic calculations. A sophisticated scoring system ranks the appropriate fluid systems, based on operating environment, discharge legislation, temperature, fluid density, wellbore stability, wellbore friction and cost. The system is proposing not more than 3 different fluid systems for a well, although the user can easily override the proposed fluid systems.

A new and novel algorithm used by the 'Automatic Well Planning Software System' selects appropriate bit types that are best suited to the anticipated rock strengths, hole sizes, and drilled intervals. For each bit candidate, the footage and bit life is determined by comparing the work required to drill the rock interval with the statistical work potential for that bit. The most economic bit is selected from all candidates by evaluating the cost per foot which takes into account the rig rate, bit cost, tripping time and drilling performance (ROP). Drilling parameters like string surface revolutions and weight on bit are proposed based on statistical or historical data.

In the 'Automatic Well Planning Software System', the bottom hole assembly (BHA) and drillstring is designed based on the required maximum weight on bit, inclination, directional trajectory and formation evaluation requirements in the hole section. The well trajectory influences the relative weight distribution between drill collars and heavy weight drill pipe. The BHA components are automatically selected based on the hole size, the internal diameter of the preceding casings, and bending stress ratios are calculated for each component size transition. Final kick tolerances for each hole section are also calculated as part of the risk analysis.

The minimum flow rate for hole cleaning is calculated using Luo's[2] and Moore's[3] criteria considering the wellbore geometry, BHA configuration, fluid density and rheology, rock density, and ROP. The bit nozzles total flow area (TFA) are sized to maximize the standpipe pressure within the liner operating pressure envelopes. Pump liner sizes are selected based on the flow requirements for hole cleaning and corresponding circulating pressures. The Power Law rheology model is used to calculate the pressure drops through the circulating system, including the equivalent circulating density (ECD).

Figure 4:
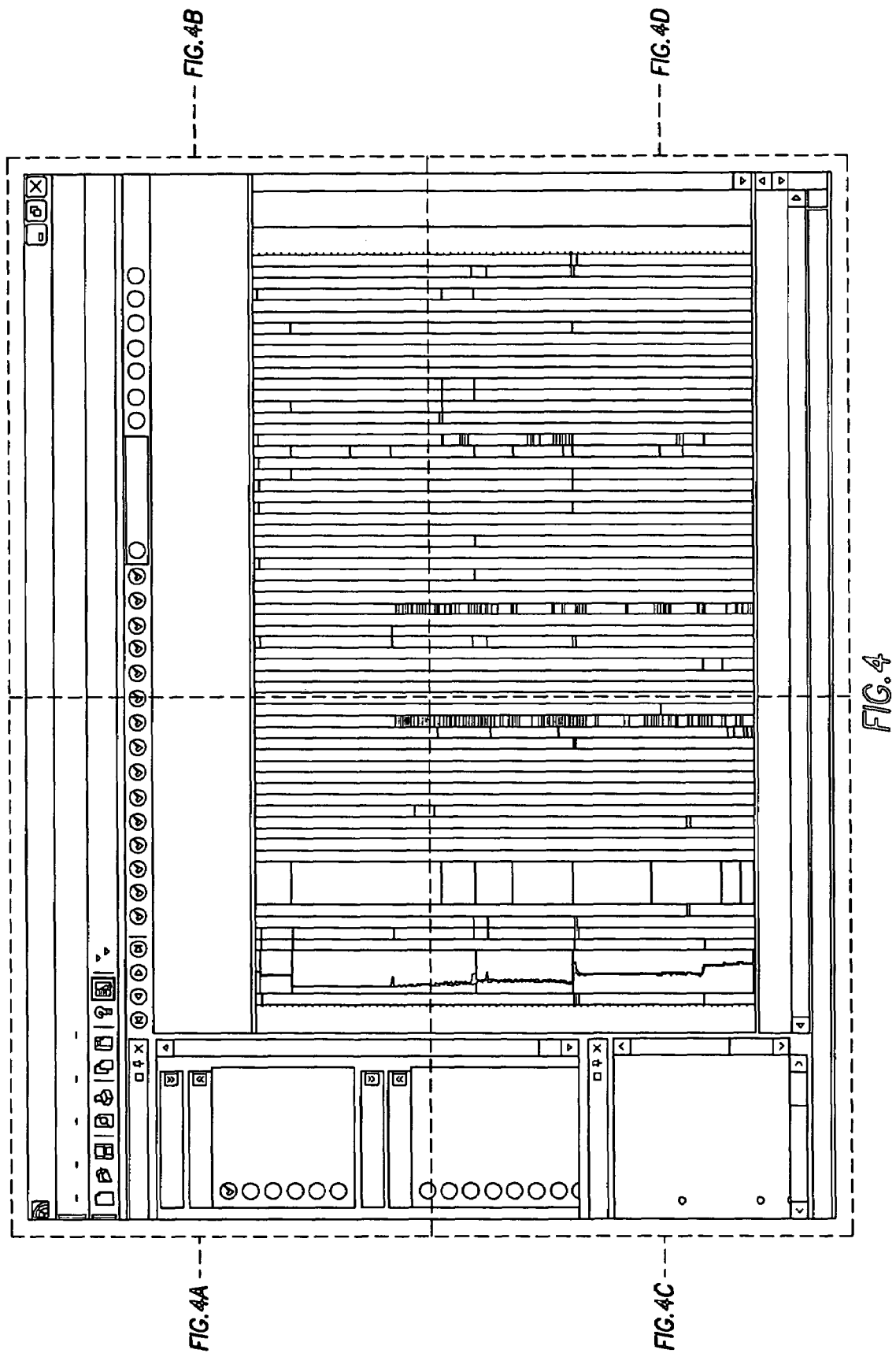
FIG. 4 including
Figure 4A:
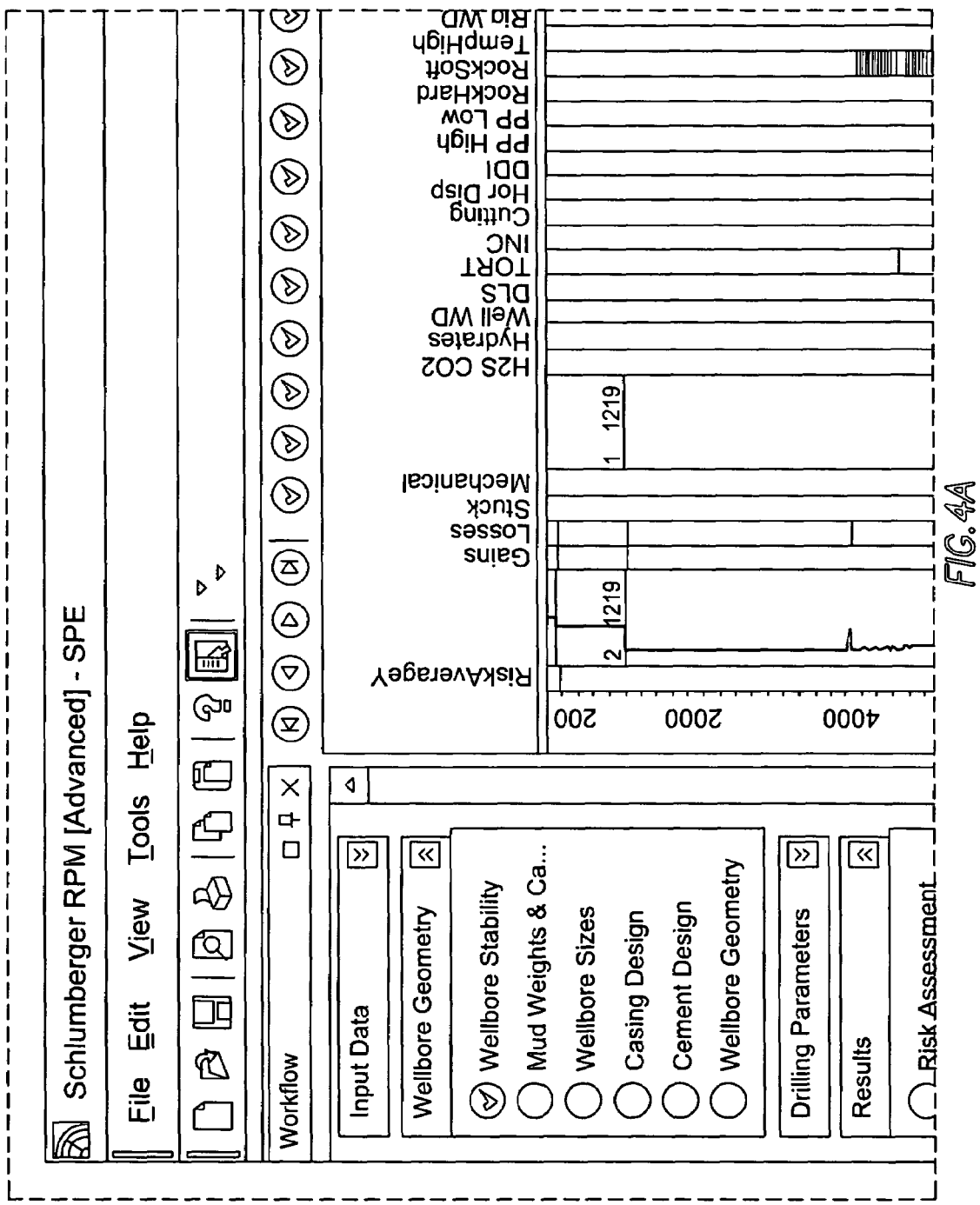
FIGS. 4A, 4B, 4C, and 4D illustrate risk assessment.
Figure 4B:
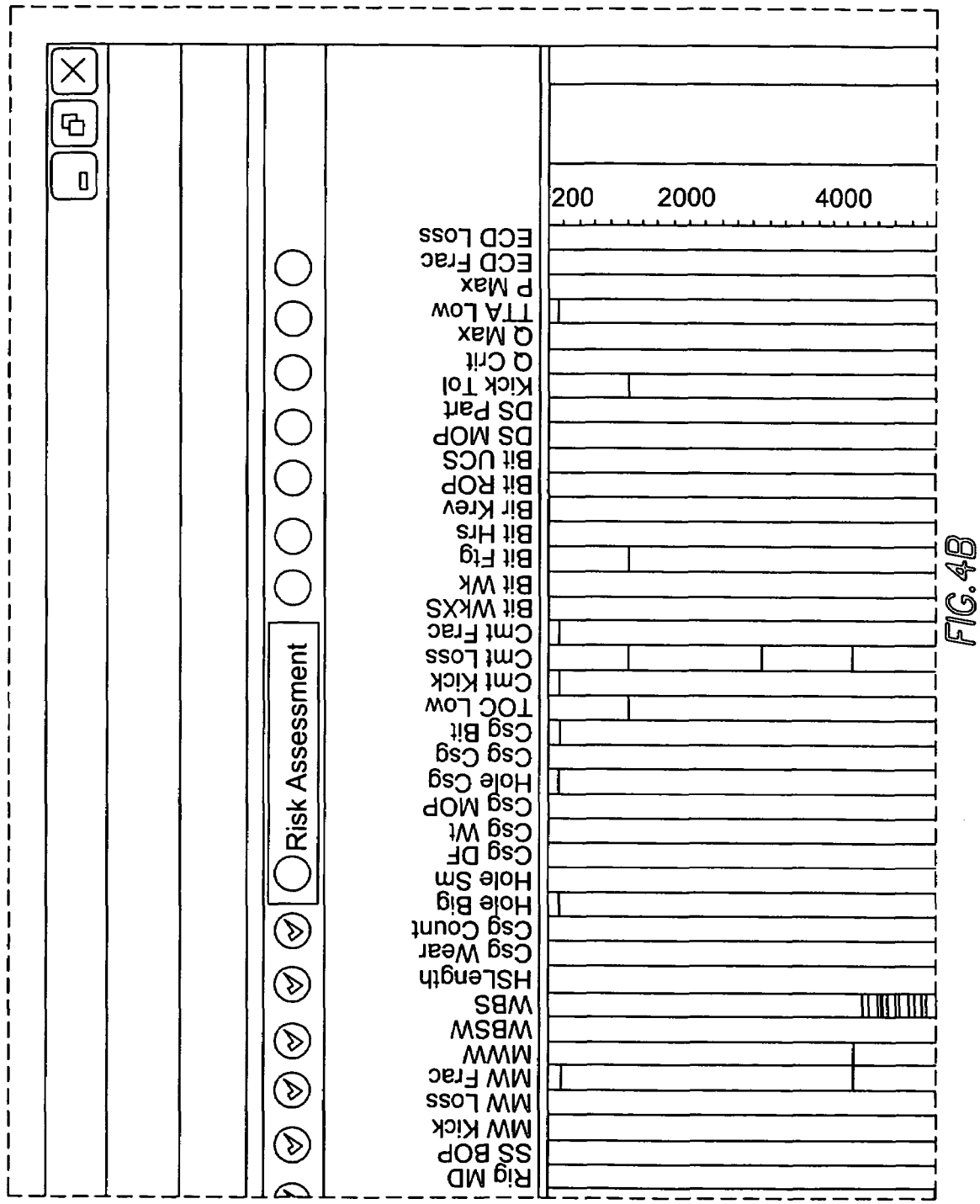
Figure 4C:
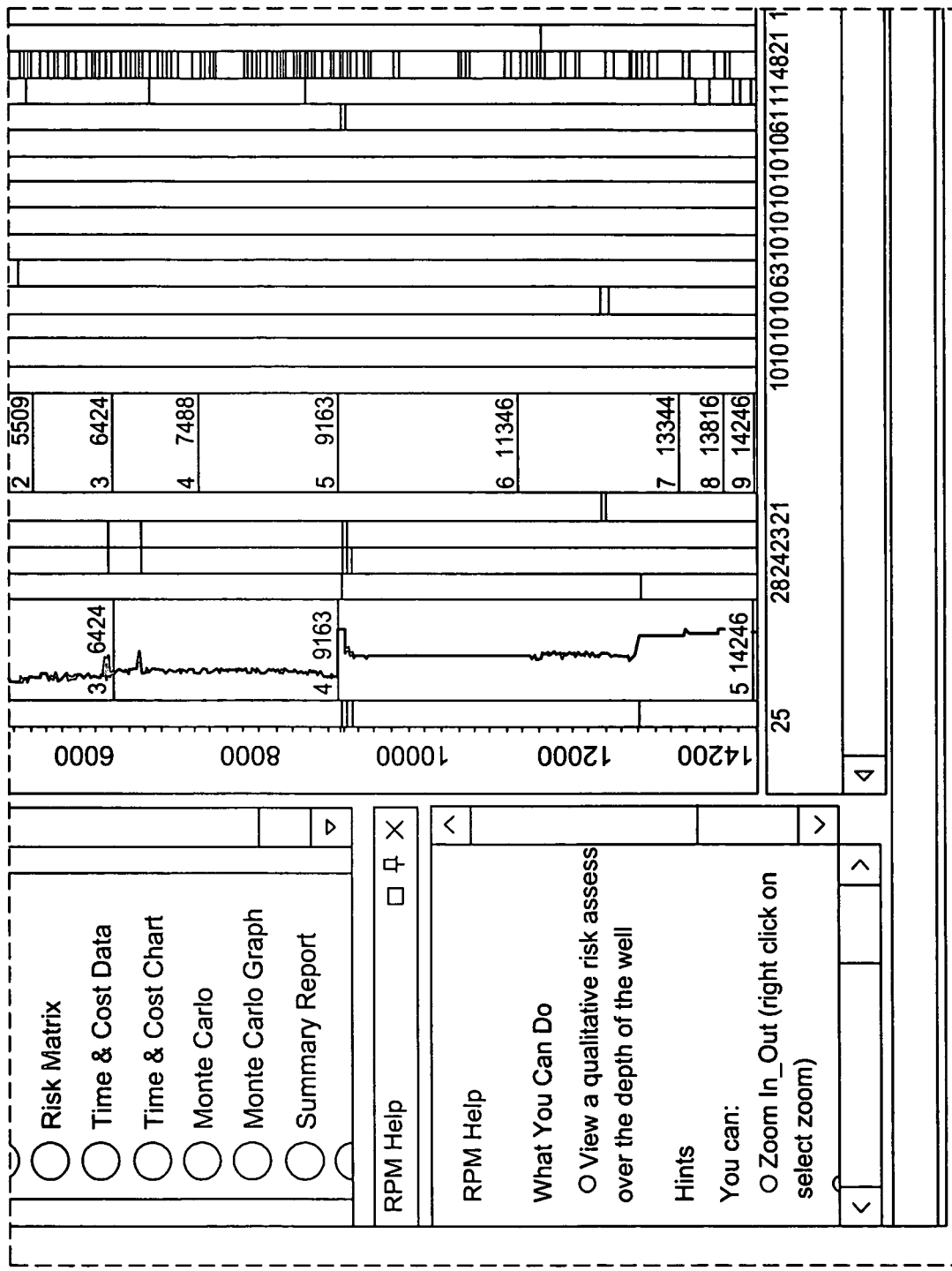
Figure 4D:
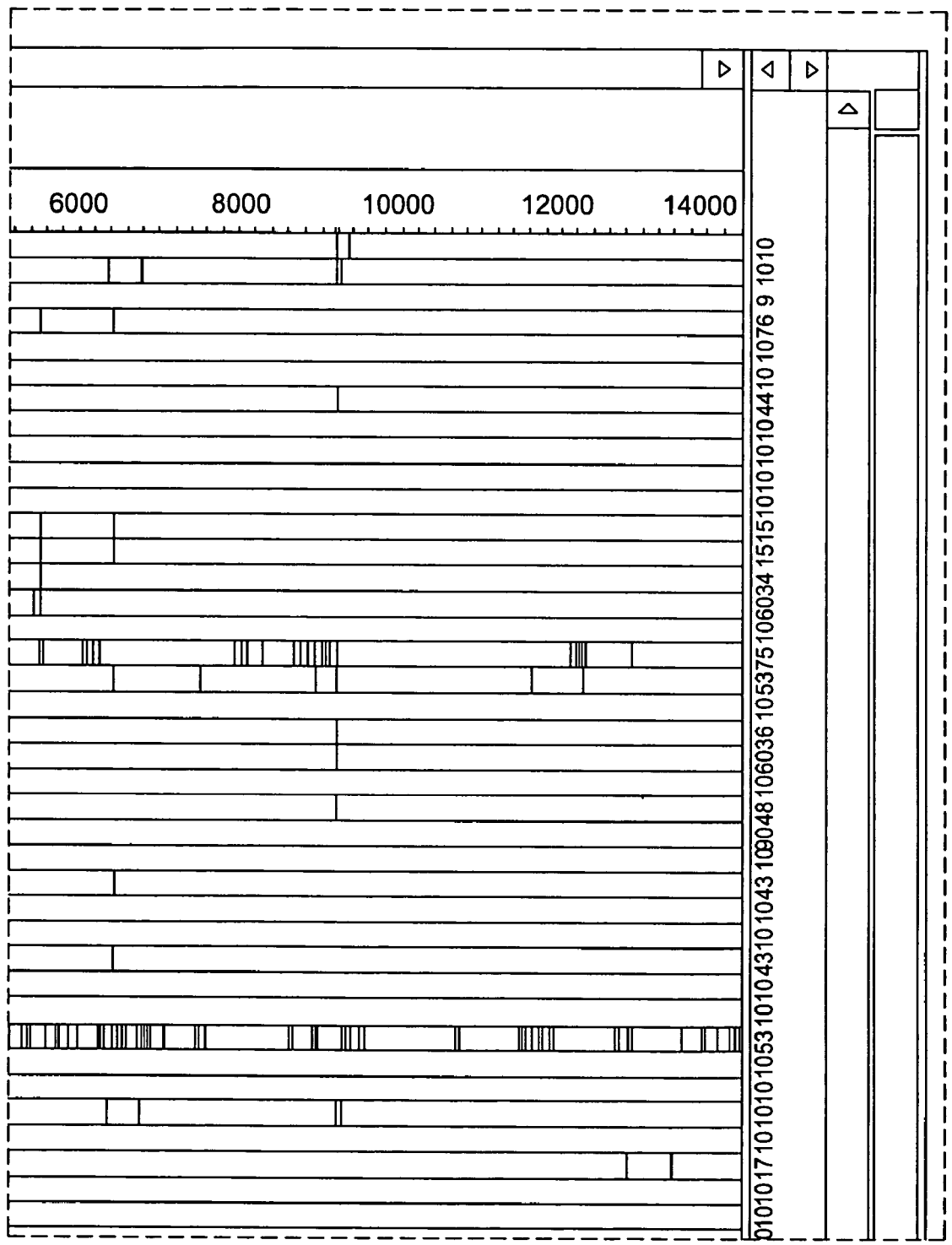

Referring to FIG. 4, a display showing 'Risk Assessment' is illustrated.

In FIG. 4, in the 'Automatic Well Planning Software System', drilling event 'risks' are quantified in a total of 54 risk categories of which the user can customize the risk thresholds. The risk categories are plotted as a function of depth and color coded to aid a quick visual interpretation of potential trouble spots. Further risk assessment is achieved by grouping these categories in the following categories: 'gains', 'losses', 'stuck pipe', and 'mechanical problems'. The total risk log curve can be displayed along the trajectory to correlate drilling risks with geological markers. Additional risk analysis views display the "actual risk" as a portion of the "potential risk" for each design task.

In the 'Automatic Well Planning Software System', a detailed operational activity plan is automatically assembled from customizable templates. The duration for each activity is calculated based on the engineered results of the previous tasks and Non-Productive Time (NPT) can be included. The activity plan specifies a range (minimum, average, and maximum) of time and cost for each activity and lists the operations sequentially as a function of depth and hole section. This information is graphically presented in the time vs depth and cost vs depth graphs.

Figure 5A:
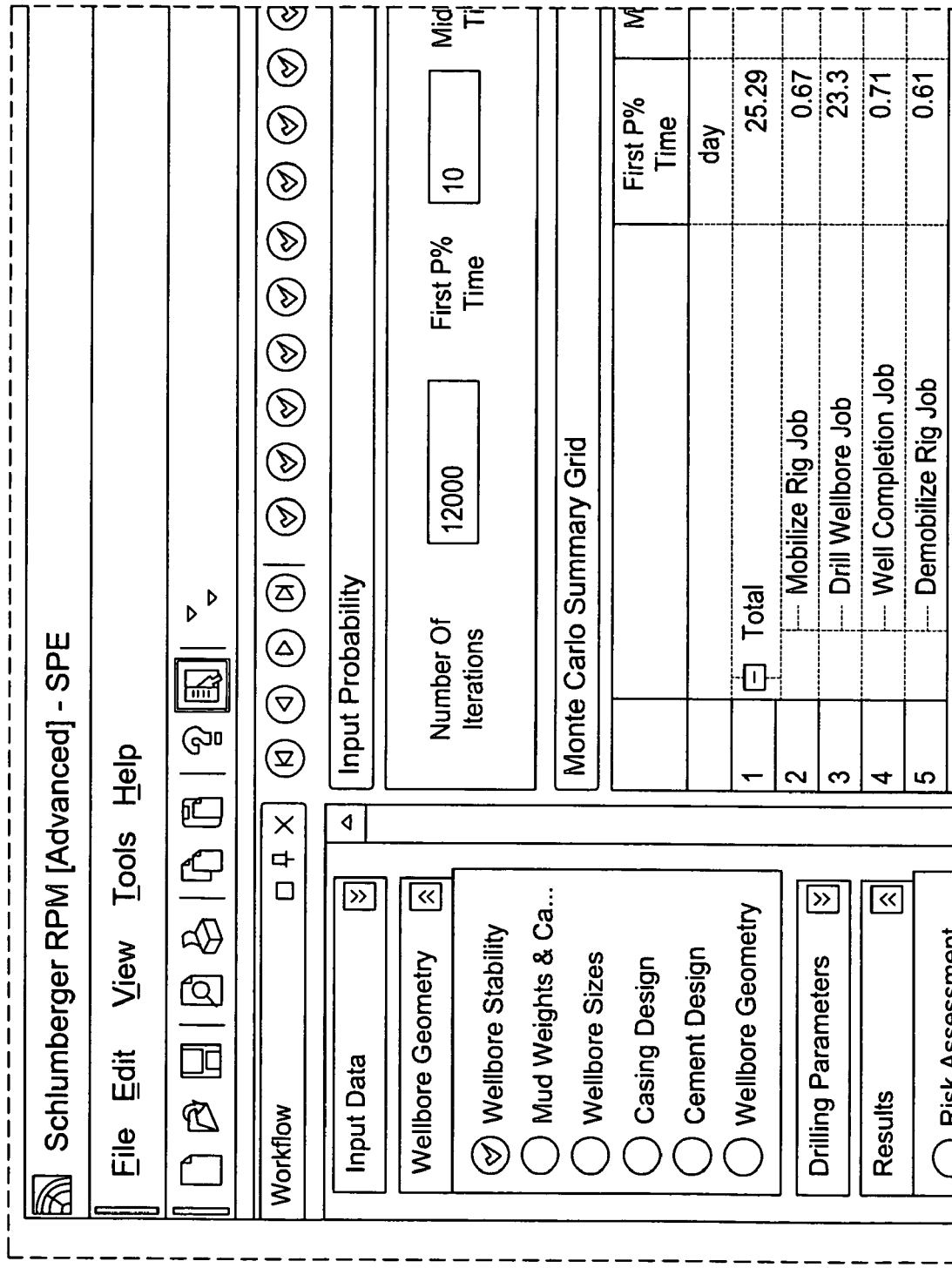
Figure 5C:
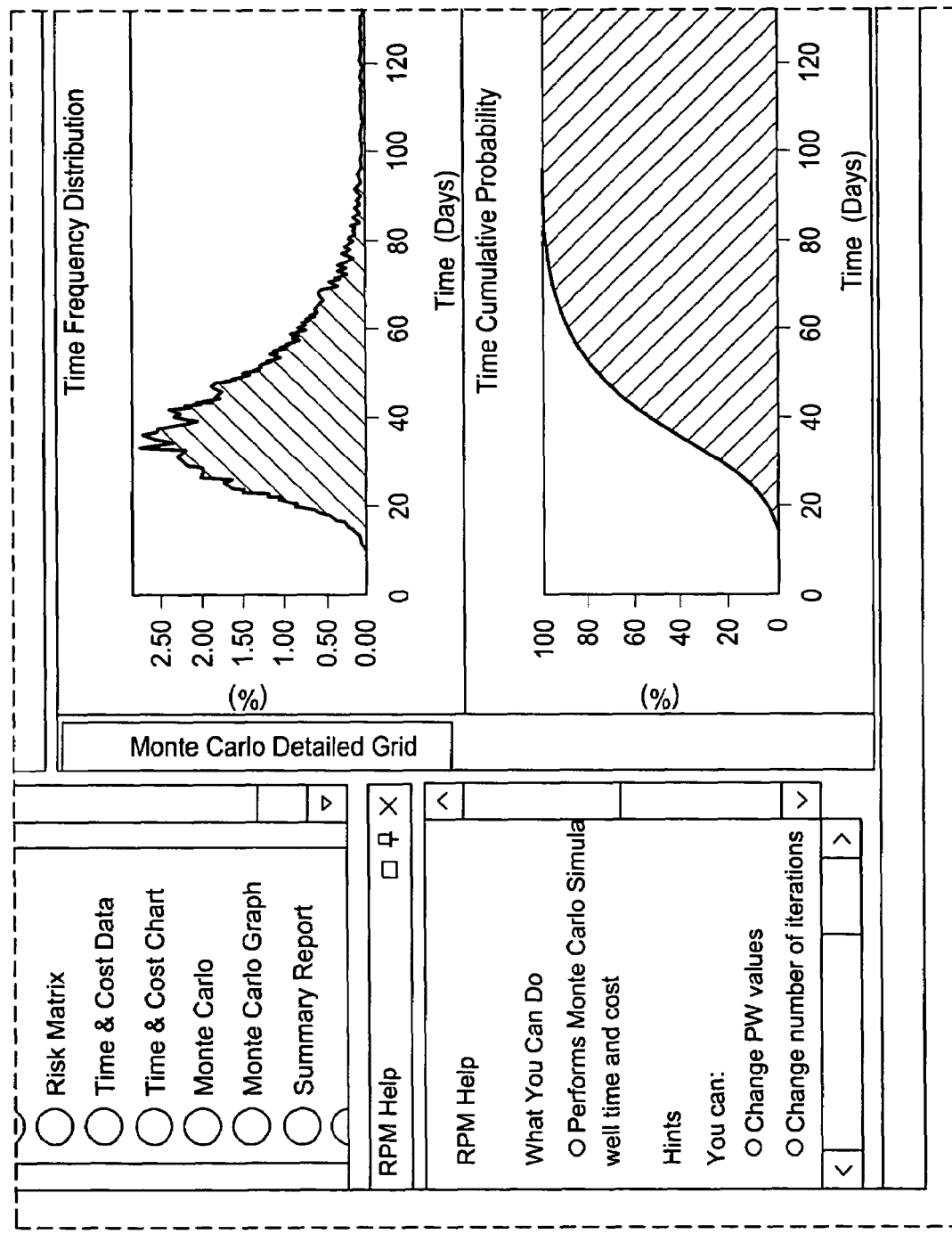
Figure 5D:
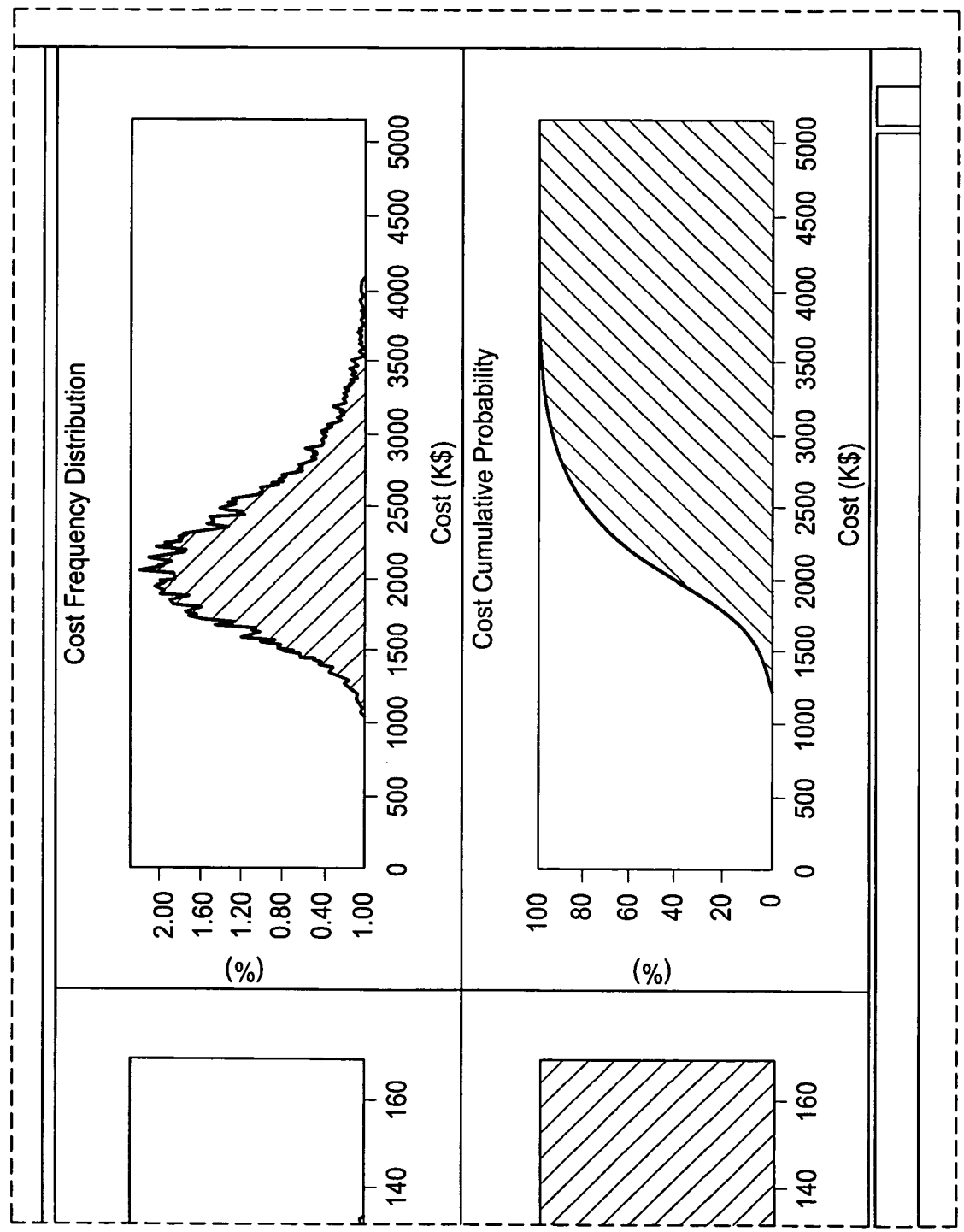
Figure 6A:
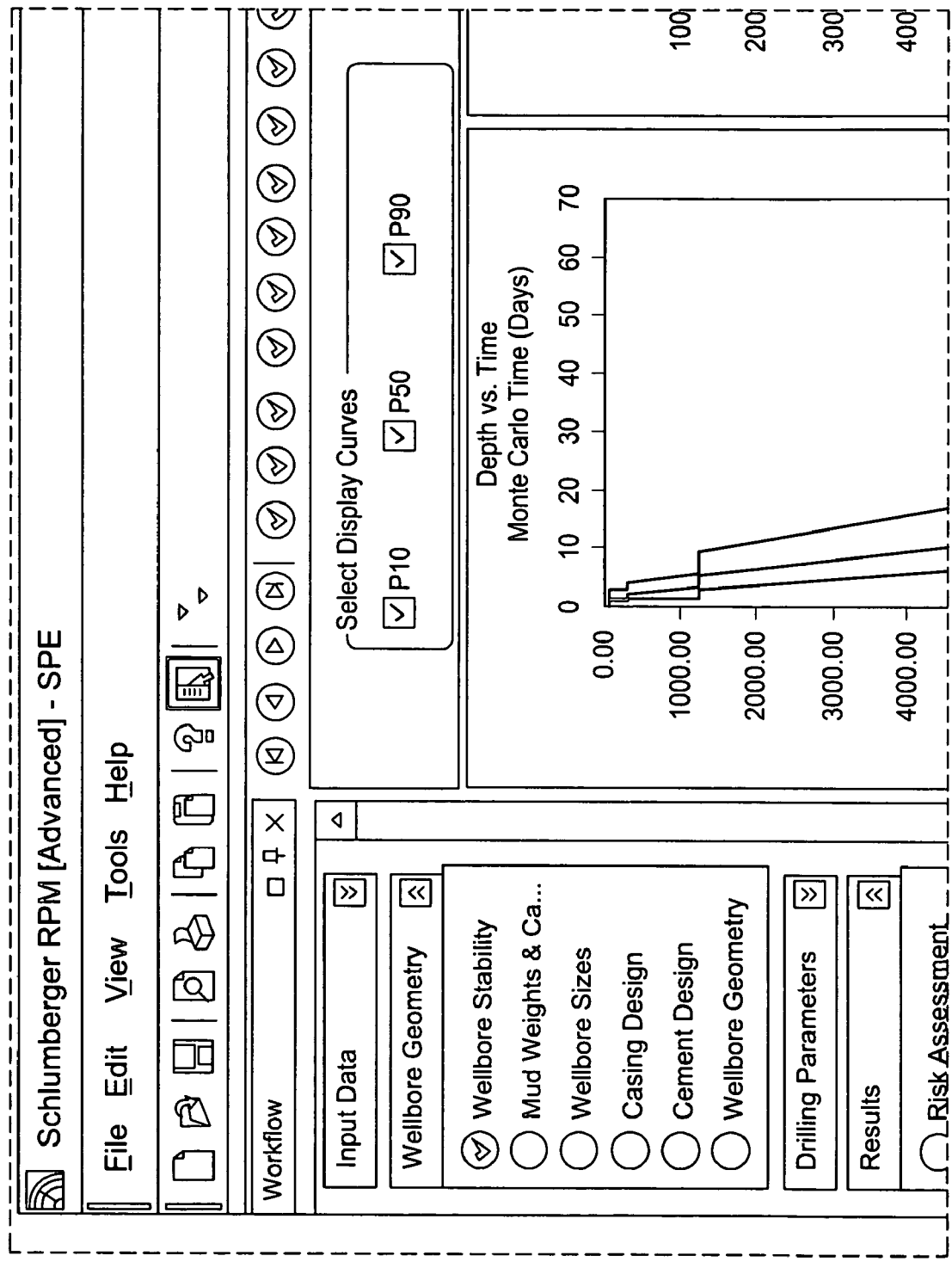
FIGS. 6A, 6B, 6C, and 6D illustrate a probabilistic time and cost vs. depth.
Figure 6B:
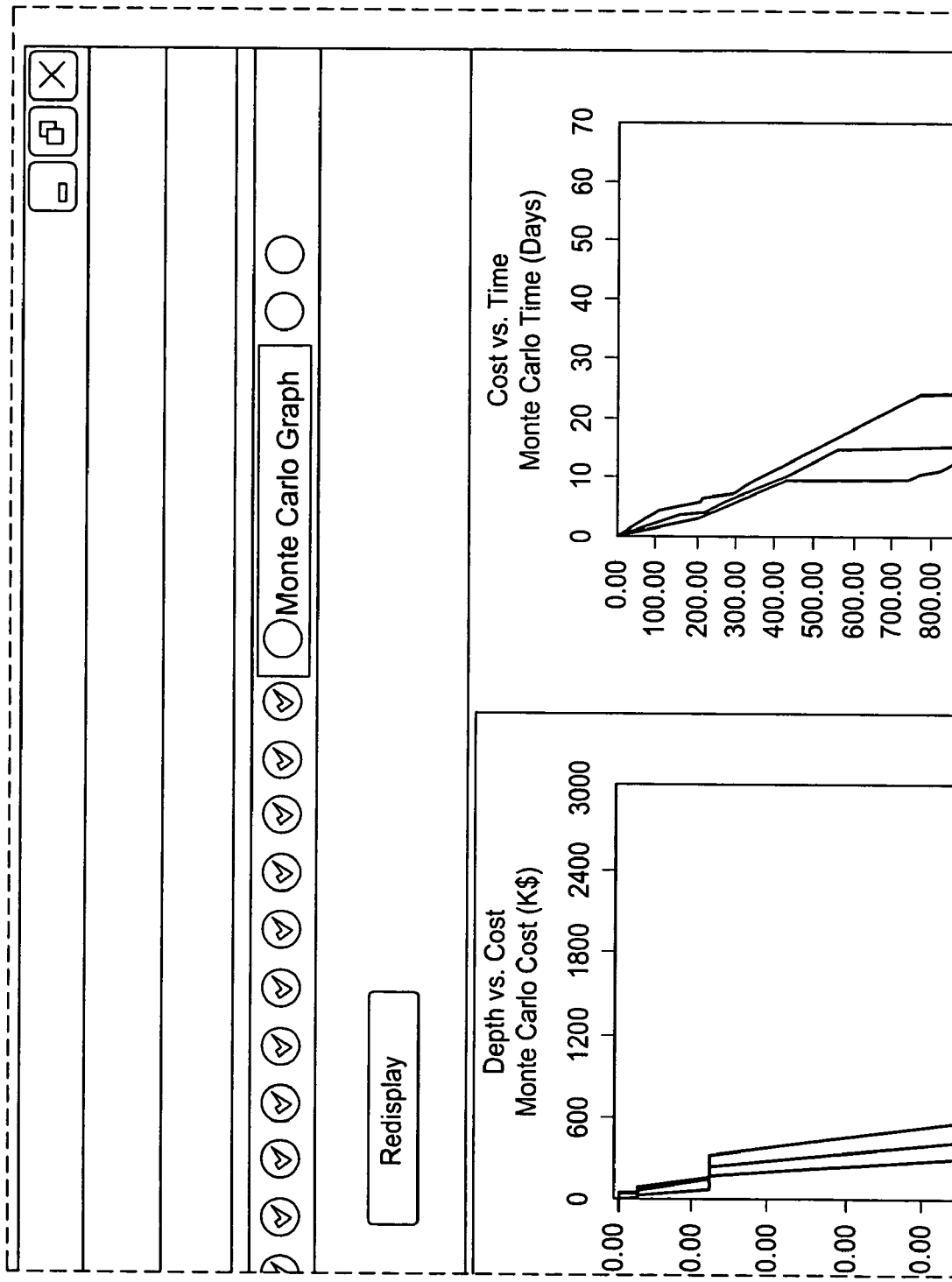
Figure 6C:
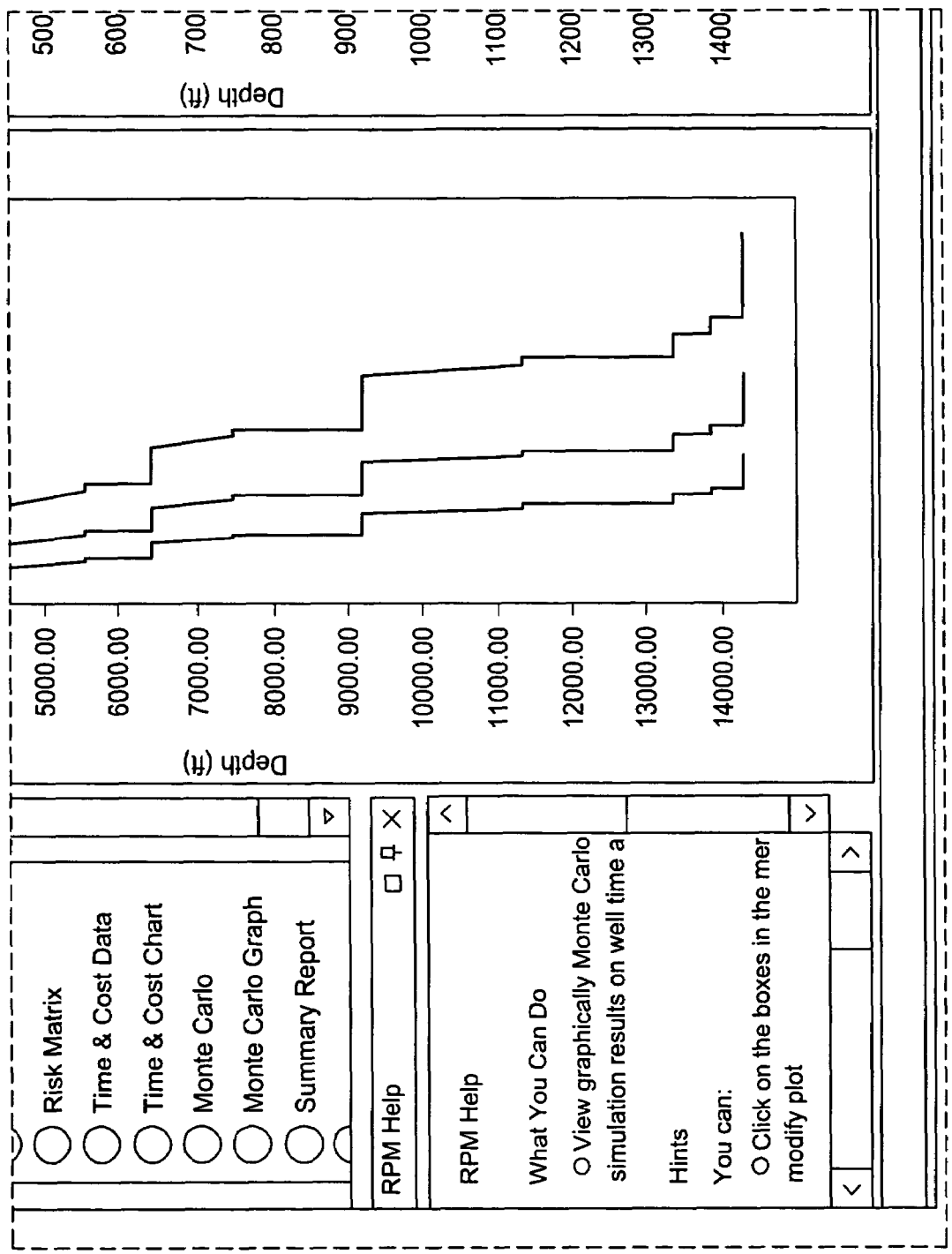
Figure 6D:
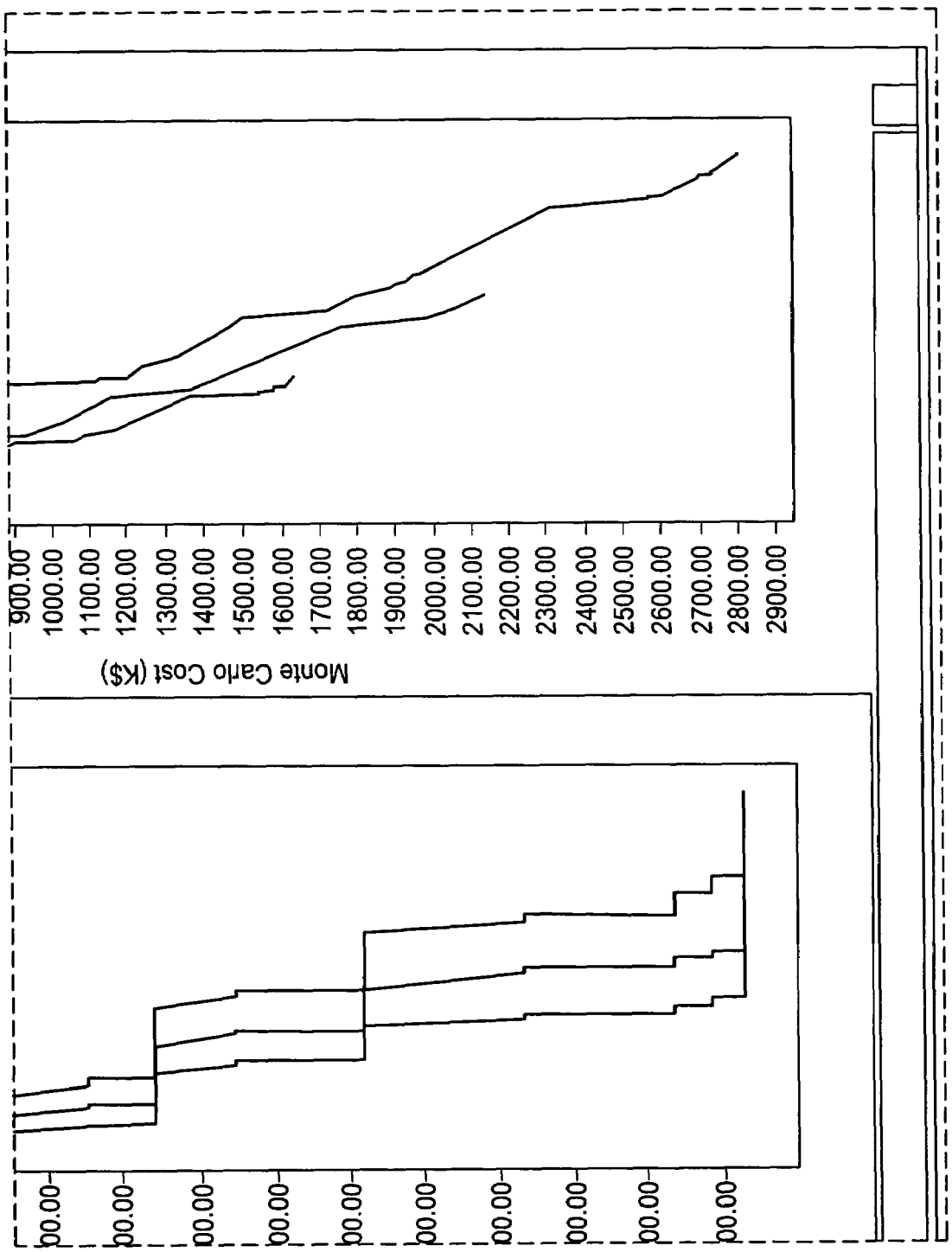

Referring to FIG. 5, a display showing Monte Carlo time and cost distributions is illustrated. In FIG. 5, the 'Automatic Well Planning Software System' uses Monte Carlo simulation to reconcile all of the range of time and cost data to produce probabilistic time and cost distributions.

Referring to FIG. 6, a display showing Probabilistic time and cost vs. depth is illustrated. In FIG. 6, this probabilistic analysis, used by the 'Automatic Well Planning Software System' of the present invention, allows quantifying the P10, P50 and P90 probabilities for time and cost.

Figure 7:
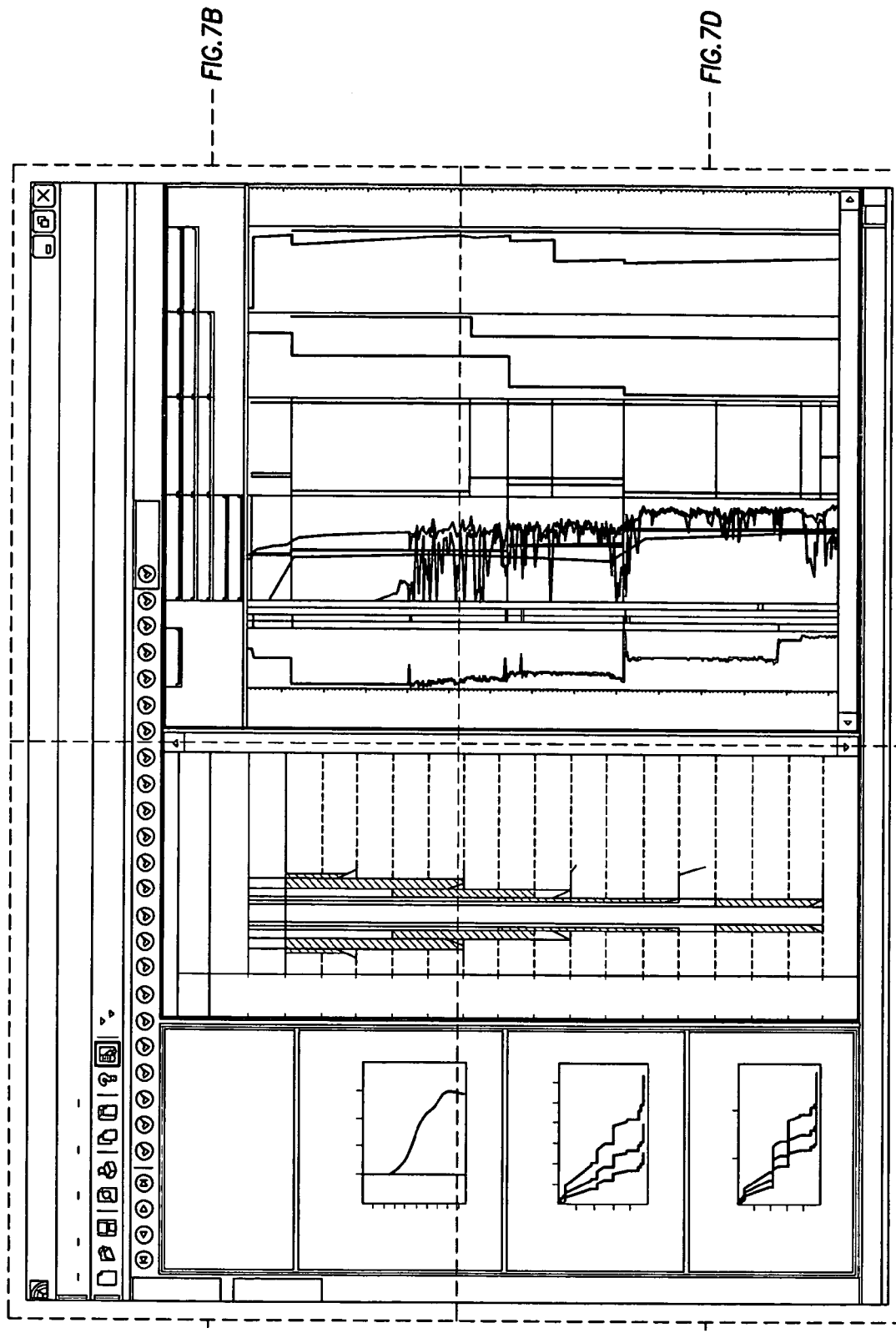
FIG. 7 including
Figure 7A:
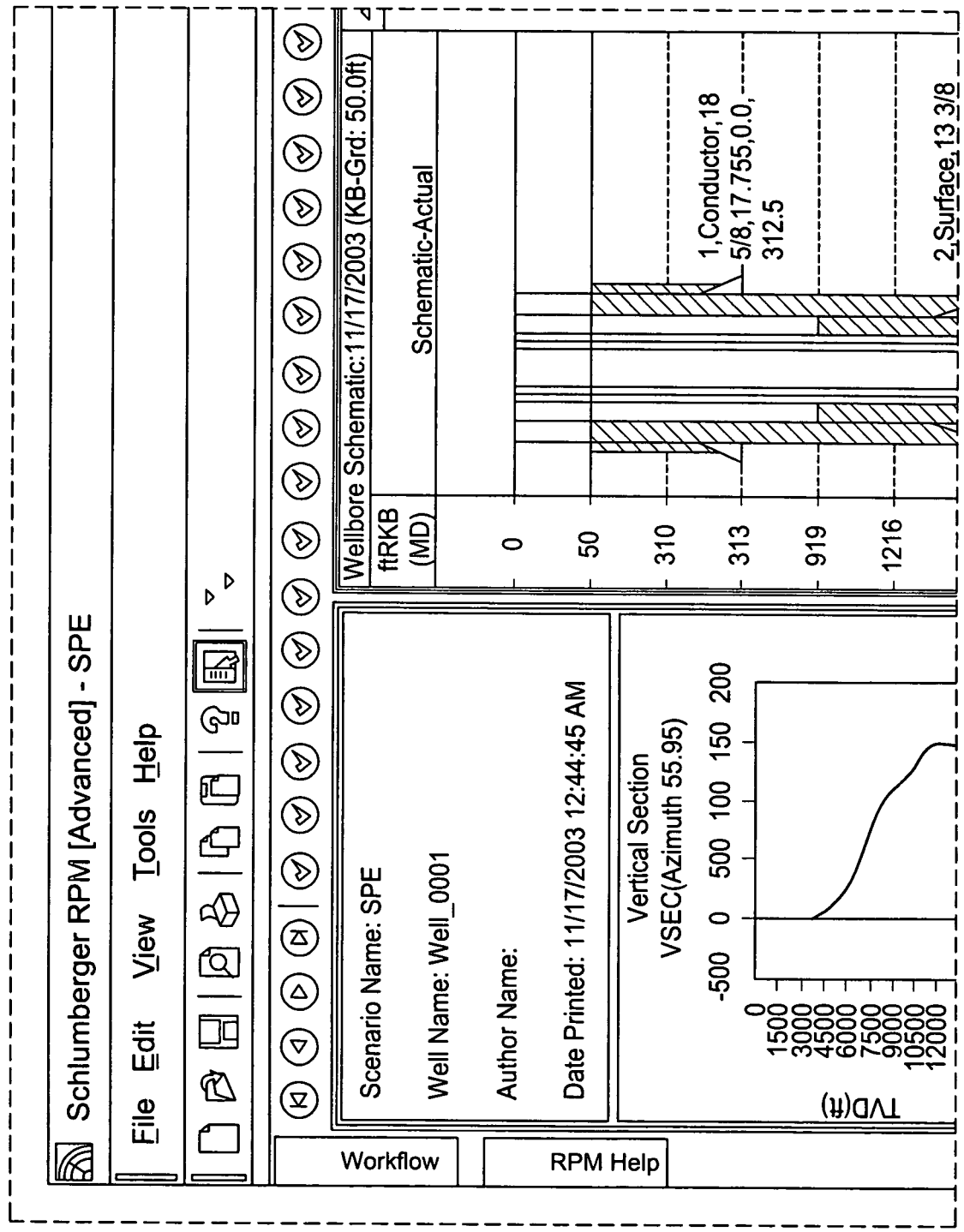
FIGS. 7A, 7B, 7C, and 7D illustrate a summary montage.
Figure 7B:
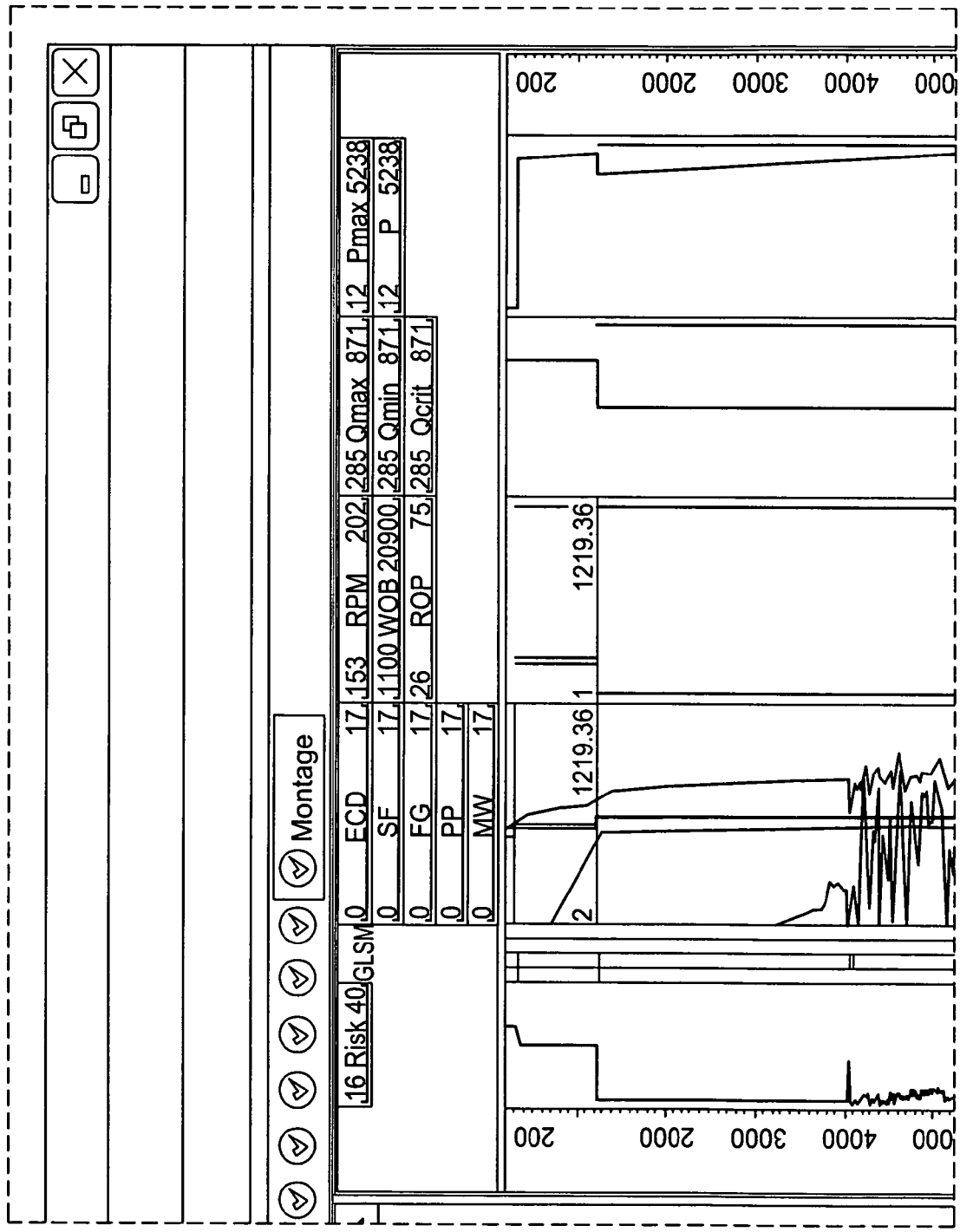
Figure 7C:
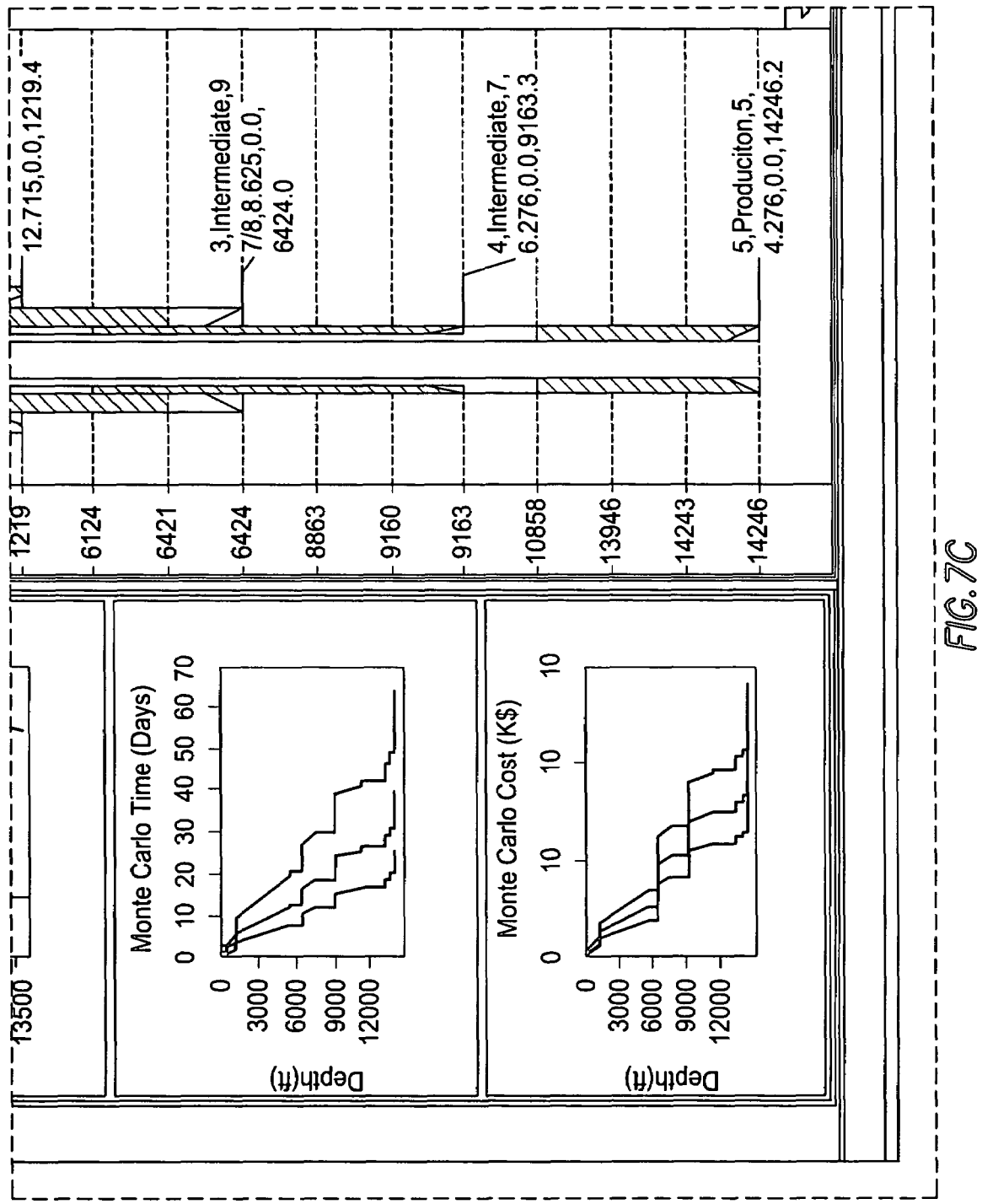
Figure 7D:
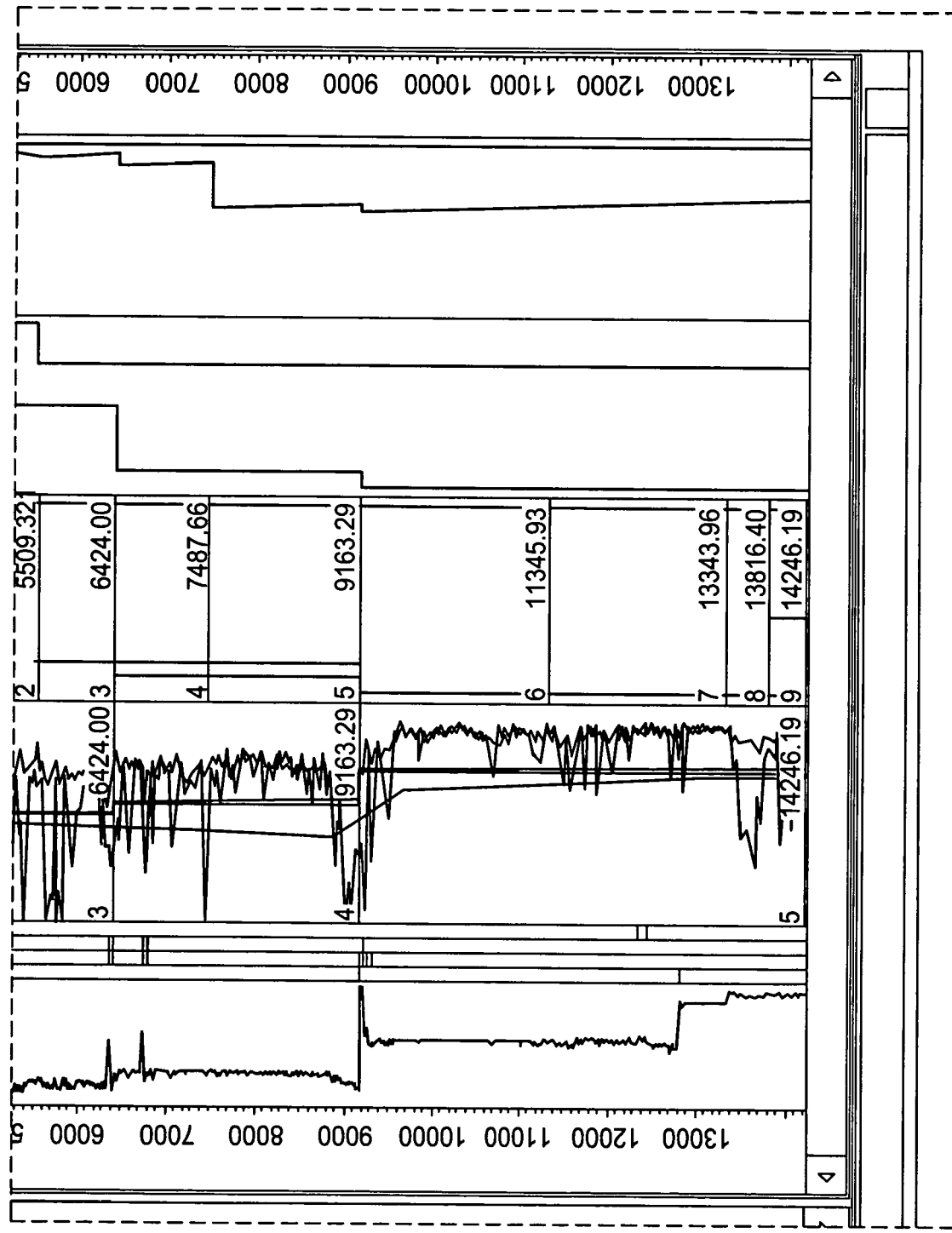

Referring to FIG. 7, a display showing a summary montage is illustrated. In FIG. 7, a comprehensive summary report and a montage display, utilized by the 'Automatic Well Planning Software System', can be printed or plotted in large scale and are also available as a standard result output.

Using its expert system and logic, the 'Automatic Well Planning Software System' disclosed in this specification automatically proposes sound technical solutions and provides a smooth path through the well planning workflow. Graphical interaction with the results of each task allows the user to efficiently fine-tune the results. In just minutes, asset teams, geoscientists, and drilling engineers can evaluate drilling projects and economics using probabilistic cost estimates based on solid engineering fundamentals instead of traditional, less rigorous estimation methods. The testing program combined with feedback received from other users of the program during the development of the software package made it possible to draw the following conclusions: (1) The 'Automatic Well Planning Software System' can be installed and used by inexperienced users with a minimum amount of training and by referencing the documentation provided, (2) The need for good earth property data enhances the link to geological and geomechanical models and encourages improved subsurface interpretation; it can also be used to quanitfy the value of acquiring additional information to reduce uncertainty, (3) With a minimum amount of input data, the 'Automatic Well Planning Software System' can create reasonable probabilistic time and cost estimates faithful to an engineered well design; based on the field test results, if the number of casing points and rig rates are accurate, the results will be within 20% of a fully engineered well design and AFE, (4) With additional customization and localization, predicted results compare to within 10% of a fully engineered well design AFE, (5) Once the 'Automatic Well Planning Software System' has been localized, the ability to quickly run new scenarios and assess the business impact and associated risks of applying new technologies, procedures or approaches to well designs is readily possible, (6) The speed of the 'Automatic Well Planning Software System' allows quick iteration and refinement of well plans and creation of different 'what if' scenarios for sensitivity analysis, (7) The 'Automatic Well Planning Software System' provides consistent and transparent well cost estimates to a process that has historically been arbitrary, inconsistent, and opaque; streamlining the workflow and eliminating human bias provides drilling staff the confidence to delegate and empower non-drilling staff to do their own scoping estimates, (8) The 'Automatic Well Planning Software System' provides unique understanding of drilling risk and uncertainty enabling more realistic economic modeling and improved decision making, (9) The risk assessment accurately identifies the type and location of risk in the wellbore enabling drilling engineers to focus their detailed engineering efforts most effectively, (10) It was possible to integrate and automate the well construction planning workflow based on an earth model and produce technically sound usable results, (11) The project was able to extensively use COTS technology to accelerate development of the software, and (12) The well engineering workflow interdependencies were able to be mapped and managed by the software.

The following nomenclature was used in this specification:

RT=Real-Time, usually used in the context of real-time data (while drilling).

G&G=Geological and Geophysical

SEM=Shared Earth Model

MEM=Mechanical Earth Model

NPT=Non Productive Time, when operations are not planned, or due to operational difficulties, the progress of the well has be delayed, also often referred to as Trouble Time.

NOT=Non Optimum Time, when operations take longer than they should for various reasons.
WOB=Weight on bit
ROP=Rate of penetration
RPM=Revolutions per minute
BHA=Bottom hole assembly
SMR=Software Modification Request
BOD=Basis of Design, document specifying the requirements for a well to be drilled.
AFE=Authorization for Expenditure

REFERENCES (1) Booth, J., Bradford, I. D. R., Cook, J. M., Dowell, J. D., Ritchie, G., Tuddenham, I.: 'Meeting Future Drilling Planning and Decision Support Requirements: A New Drilling Simulator', IADC/SPE 67816 presented at the 2001 IADC/SPE Drilling Conference, Amsterdam, The Netherlands, 27 February-1 March.
(2) Luo, Y., Bern, P. A. and Chambers, B. D.: 'Flow-Rate Predictions for Cleaning Deviated Wells', paper IADC/SPE 23884 presented at the 1992 LIDC/SPE Drilling Conference, New Orleans, La., February 18-21.
(3) Moore and Chien theory is published in 'Applied Drilling Engineering', Bourgoyne, A. T., Jr, et al., SPE Textbook Series Vol 2.

A functional specification associated with the overall 'Automatic Well Planning Software System' of the present invention (termed a 'use case') will be set forth in the following paragraphs. This functional specification relates to the overall 'Automatic Well Planning Software System'.

The following defines information that pertains to this particular 'use case'. Each piece of information is important in understanding the purpose behind the 'use Case'.
Goal In Context: Describe the full workflow for the low level user
Scope: N/A
Level: Low Level
Pre-Condition: Geological targets pre-defined
Success End Condition: Probability based time estimate with cost and risk
Failed End Condition: Failure in calculations due to assumptions or if distribution of results is too large
Primary Actor: Well Engineer
Trigger Event: N/A Main Success Scenario—This Scenario describes the steps that are taken from trigger event to goal completion when everything works without failure. It also describes any required cleanup that is done after the goal has been reached. The steps are listed below:
1. User opens program, and system prompts user whether to open an old file or create a new one. User creates new model and system prompts user for well information (well name, field, country, coordinates). System prompts user to insert earth model. Window with different options appears and user selects data level. Secondary window appears where file is loaded or data inserted manually. System displays 3D view of earth model with key horizons, targets, anti-targets, markers, seismic, etc.
2. System prompts user for a well trajectory. The user either loads from a file or creates one in Caviar for Swordfish. System generates 3D view of trajectory in the earth model and 2D views, both plan and vertical section. User prompted to verify trajectory and modify if needed via direct interaction with 3D window.
3. The system will extract mechanical earth properties (PP, FG, WBS, lithology, density, strength, min/max horizontal stress, etc.) for every point along the trajectory and store it. These properties will either come from a populated mechanical earth model, from interpreted logs applied to this trajectory, or manually entered.
4. The system will prompt the user for the rig constraints. Rig specification options will be offered and the user will choose either the type of rig and basic configurations or insert data manually for a specific drilling unit.
5. The system will prompt the user to enter pore pressure data, if applicable, otherwise taken from the mechanical earth model previously inserted and a MW window will be generated using PP, FG, and WBS curves. The MW window will be displayed and allow interactive modifications
6. The system will automatically divide the well into hole/casing sections based on kick tolerance and trajectory sections and then propose a mud weight schedule. These will be displayed on the MW window and allow the user to interactively modify their values. The casing points can also be interactively modified on the 2D and 3D trajectory displays
7. The system will prompt the user for casing size constraints (tubing size, surface slot size, evaluation requirements), and based on the number of sections generate the appropriate hole size—casing size combinations. The hole/casing circle chart will be used, again allowing for interaction from the user to modify the hole/casing size progression.
8. The system will successively calculate casing grades, weights/wall thickness and connections based on the sizes selected and the depths. User will be able to interact and define availability of types of casing.
9. The system will generate a basic cementing program, with simple slurry designs and corresponding volumes.
10. The system will display the wellbore schematic based on the calculations previously performed and this interface will be fully interactive, allowing the user to click and drag hole & casing sizes, top & bottom setting depths, and recalculating based on these selections. System will flag user if the selection is not feasible.
11. The system will generate the appropriate mud types, corresponding rheology, and composition based on the lithology, previous calculations, and the users selection.
12. The system will successively split the well sections into bit runs, and based on the rock properties will select drilling bits for each section with ROP and drilling parameters.
13. The system will generate a basic BHA configuration, based on the bit section runs, trajectory and rock properties.

Items 14, 15, and 16 represent one task: Hydraulics.
14. The system will run a hole cleaning calculation, based on trajectory, wellbore geometry, BHA composition and MW characteristics.
15. The system will do an initial hydraulics/ECD calculation using statistical ROP data. This data will be either selected or user defined by the system based on smart table lookup.
16. Using the data generated on the first hydraulics calculation, the system will perform an ROP simulation based on drilling bit characteristics and rock properties.
17. The system will run a successive hydraulics/ECD calculation using the ROP simulation data. System will flag user if parameters are not feasible.
18. The system will calculate the drilling parameters and display them on a multi display panel. This display will be exportable, portable, and printable.
19. The system will generate an activity planning sequence using default activity sequences for similar hole sections and end conditions. This sequence will be fully modifiable by the user, permitting modification in sequence order and duration of the event. This sequence will be in the same standard as the Well Operations or Drilling Reporting software and will be interchangeable with the Well Operations or Drilling Reporting software. The durations of activities will be populated from tables containing default "best practice" data or from historical data (DIMS, Snapper . . . ).

20. The system will generate time vs. depth curve based on the activity planning details. The system will create a best, mean, and worst set of time curves using combinations of default and historical data. These curves will be exportable to other documents and printable.

21. The system will prompt the user to select probability points such as P10, P50, P90 and then run a Monte Carlo simulation to generate a probability distribution curve for the scenario highlighting the user selected reference points and corresponding values of time. The system will provide this as frequency data or cumulative probability curves. These curves will be again exportable and printable.

22. The system will generate a cost plan using default cost templates that are pre-configured by users and can be modified at this point. Many of the costs will reference durations of the entire well, hole sections, or specific activities to calculate the applied cost. The system will generate P10, P50, and P90 cost vs. depth curves.

23. The system will generate a summary of the well plan, in word format, along with the main display graphs. The user will select all that should be exported via a check box interface. The system will generate a large one-page summary of the whole process. This document will be as per a standard Well Operations Program template.

Figure 8:
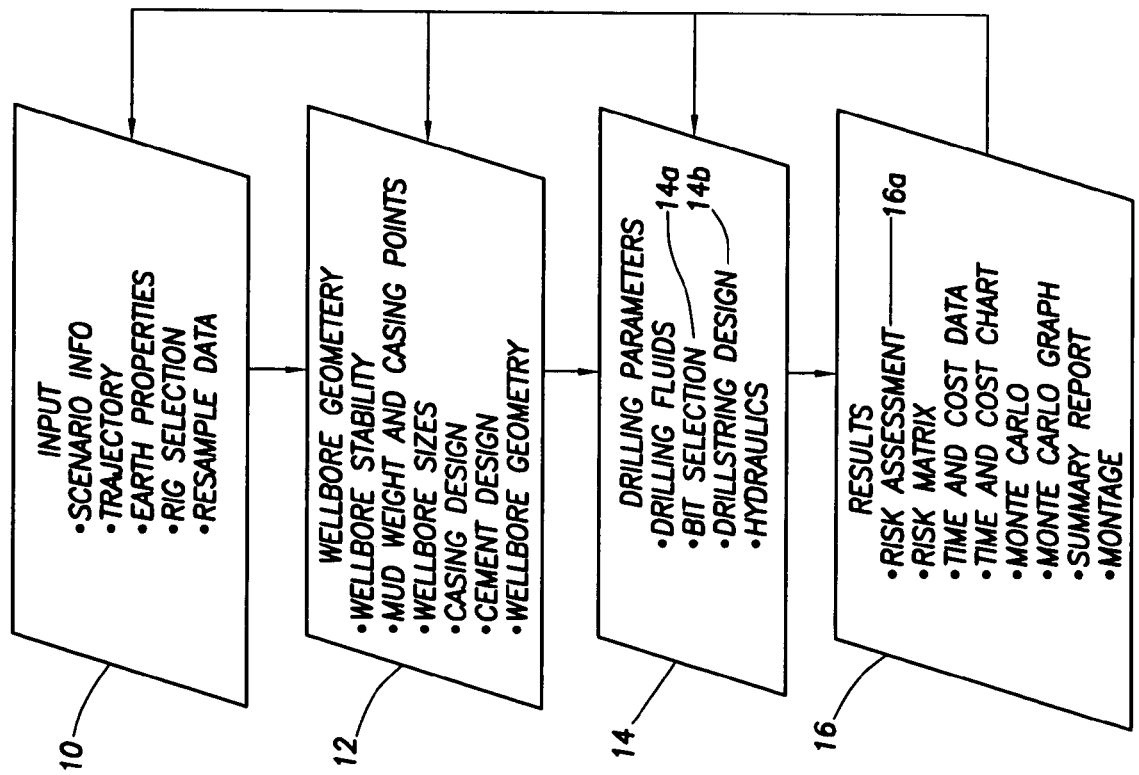
FIG. 8 illustrates a workflow in an 'Automatic Well Planning Software System' of the present invention.

Referring to FIG. 8, as can be seen on the left side of the displays illustrated in FIGS. 2 through 6, the 'Automatic Well Planning Software System' of the present invention includes a plurality of tasks. Each of those tasks are illustrated in FIG. 8. In FIG. 8, those plurality of tasks are divided into four groups: (1) Input task 10, where input data is provided, (2) Wellbore Geometry task 12 and Drilling Parameters task 14, where calculations are performed, and (3) a Results task 16, where a set of results are calculated and presented to a user. The Input task 10 includes the following sub-tasks: (1) scenario information, (2) trajectory, (3) Earth properties, (4) Rig selection, (5) Resample Data. The Wellbore Geometry task 12 includes the following sub-tasks: (1) Wellbore stability, (2) Mud weights and casing points, (3) Wellbore sizes, (4) Casing design, (5) Cement design, (6) Wellbore geometry. The Drilling Parameters task 14 includes the following sub-tasks: (1) Drilling fluids, (2) Bit selection, (3) Drillstring design, (4) Hydraulics. The Results task 16 includes the following sub-tasks: (1) Risk Assessment 16a, (2) Risk Matrix, (3) Time and cost data, (4) Time and cost chart, (5) Monte Carlo, (6) Monte Carlo graph, (7) Summary report, and (8) montage.

Recalling that the Results task 16 of FIG. 8 includes a 'Risk Assessment' sub-task 16a, the 'Risk Assessment' sub-task 16a will be discussed in detail in the following paragraphs with reference to FIGS. 9A, 9B, and 10.

Automatic Well Planning Software System—Risk Assessment sub-task 16a-Software

Identifying the risks associated with drilling a well is probably the most subjective process in well planning today. This is based on a person recognizing part of a technical well design that is out of place relative to the earth properties or mechanical equipment to be used to drill the well. The identification of any risks is brought about by integrating all of the well, earth, and equipment information in the mind of a person and mentally sifting through all of the information, mapping the interdependencies, and based solely on personal experience extracting which parts of the project pose what potential risks to the overall success of that project. This is tremendously sensitive to human bias, the individual's ability to remember and integrate all of the data in their mind, and the individuals experience to enable them to recognize the conditions that trigger each drilling risk. Most people are not equipped to do this and those that do are very inconsistent unless strict process and checklists are followed. There are some drilling risk software systems in existence today, but they all require the same human process to identify and assess the likelihood of each individual risks and the consequences. They are simply a computer system for manually recording the results of the risk identification process.

The Risk Assessment sub-task 16a associated with the 'Automatic Well Planning Software System' of the present invention is a system that will automatically assess risks associated with the technical well design decisions in relation to the earth's geology and geomechanical properties and in relation to the mechanical limitations of the equipment specified or recommended for use.

Risks are calculated in four ways: (1) by 'Individual Risk Parameters', (2) by 'Risk Categories', (3) by 'Total Risk', and (4) the calculation of 'Qualitative Risk Indices' for each.

Individual Risk Parameters are calculated along the measured depth of the well and color coded into high, medium, or low risk for display to the user. Each risk will identify to the user: an explanation of exactly what is the risk violation, and the value and the task in the workflow controlling the risk. These risks are calculated consistently and transparently allowing users to see and understand all of the known risks and how they are identified. These risks also tell the users which aspects of the well justify further engineering effort to investigate in more detail.

Group/category risks are calculated by incorporating all of the individual risks in specific combinations. Each individual risk is a member of one or more Risk Categories. Four principal Risk Categories are defined as follows: (1) Gains, (2) Losses, (3) Stuck, and (4) Mechanical; since these four Rick Categories are the most common and costly groups of troublesome events in drilling worldwide.

The Total Risk for a scenario is calculated based on the cumulative results of all of the group/category risks along both the risk and depth axes.

Risk indexing—Each individual risk parameter is used to produce an individual risk index which is a relative indicator of the likelihood that a particular risk will occur. This is purely qualitative, but allows for comparison of the relative likelihood of one risk to another—this is especially indicative when looked at from a percentage change. Each Risk Category is used to produce a category risk index also indicating the likelihood of occurrence and useful for identifying the most likely types of trouble events to expect. Finally, a single risk index is produced for the scenario that is specifically useful for comparing the relative risk of one scenario to another.

The 'Automatic Well Planning Software System' of the present invention is capable of delivering a comprehensive technical risk assessment, and it can do this automatically. Lacking an integrated model of the technical well design to relate design decisions to associated risks, the 'Automatic Well Planning Software System' can attribute the risks to specific design decisions and it can direct users to the appropriate place to modify a design choice in efforts to modify the risk profile of the well.

Figure 9A:
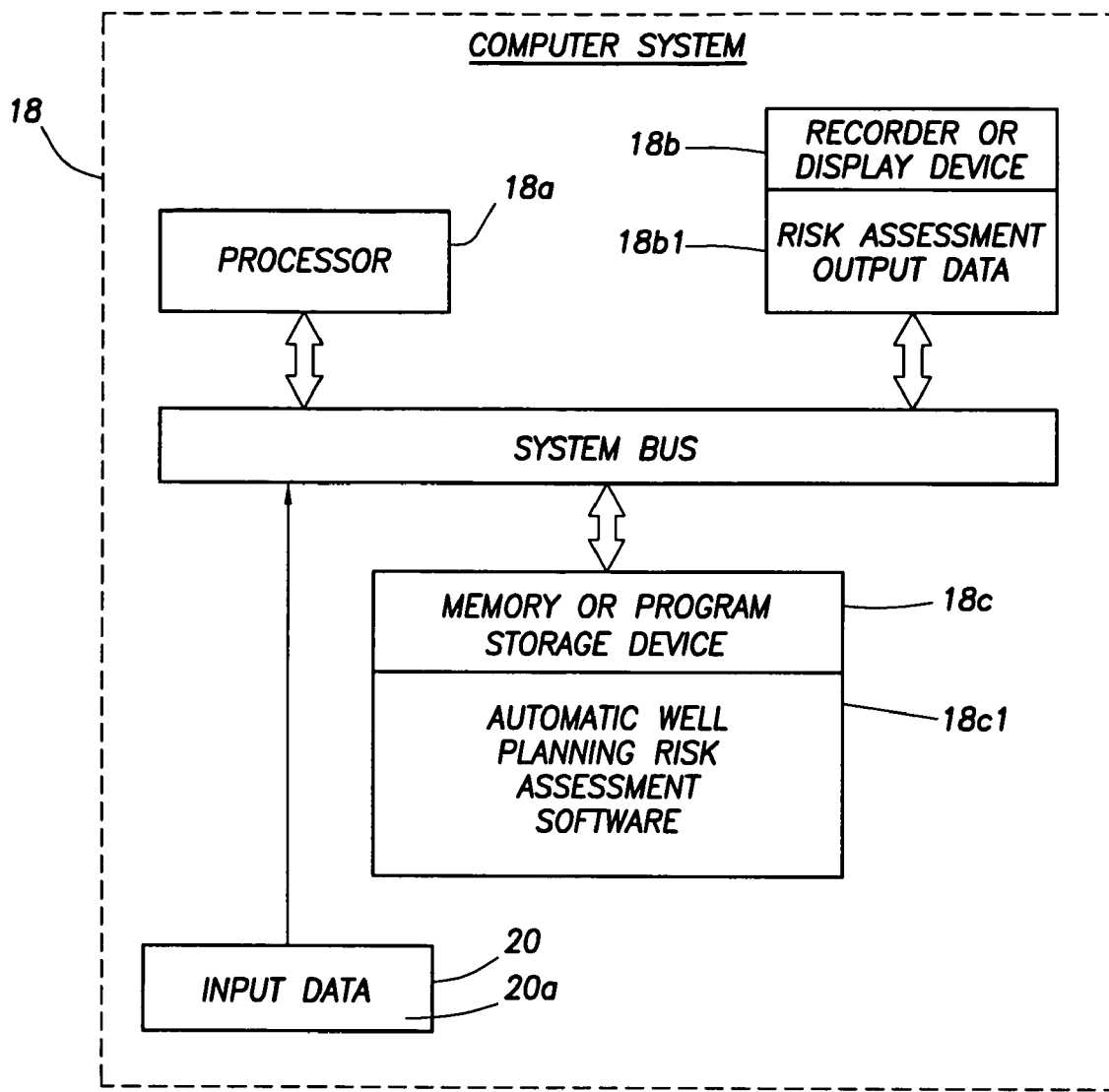
FIG. 9A illustrates a computer system storing an Automatic Well Planning Risk Assessment Software of the present invention.

Referring to FIG. 9A, a Computer System 18 is illustrated. The Computer System 18 includes a Processor 18a connected to a system bus, a Recorder or Display Device 18b connected to the system bus, and a Memory or Program Storage Device 18c connected to the system bus. The Recorder or Display Device 18b is adapted to display 'Risk Assessment Output Data' 18b1. The Memory or Program Storage Device 18c is adapted to store an 'Automatic Well Planning Risk Assessment Software' 18c1. The 'Automatic Well Planning Risk Assessment Software' 18c1 is originally stored on another 'program storage device', such as a hard disk; however, the hard disk was inserted into the Computer System 18 and the 'Automatic Well Planning Risk Assessment Software' 18c1 was loaded from the hard disk into the Memory or Program Storage Device 18c of the Computer System 18 of FIG. 9A. In addition, a Storage Medium 20 containing a plurality of 'Input Data' 20a is adapted to be connected to the system bus of the Computer System 18, the 'Input Data' 20a being accessible to the Processor 18a of the Computer System 18 when the Storage Medium 20 is connected to the system bus of the Computer System 18. In operation, the Processor 18a of the Computer System 18 will execute the Automatic Well Planning Risk Assessment Software 18c1 stored in the Memory or Program Storage Device 18c of the Computer System 18 while, simultaneously, using the 'Input Data' 20a stored in the Storage Medium 20 during that execution. When the Processor 18a completes the execution of the Automatic Well Planning Risk Assessment Software 18c1 stored in the Memory or Program Storage Device 18c (while using the 'Input Data' 20a), the Recorder or Display Device 18b will record or display the 'Risk Assessment Output Data' 18b1, as shown in FIG. 9A. For example the 'Risk Assessment Output Data' 18b1 can be displayed on a display screen of the Computer System 18, or the 'Risk Assessment Output Data' 18b1 can be recorded on a printout which is generated by the Computer System 18. The Computer System 18 of FIG. 9A may be a personal computer (PC). The Memory or Program Storage Device 18c is a computer readable medium or a program storage device which is readable by a machine, such as the processor 18a. The processor 18a may be, for example, a microprocessor, microcontroller, or a mainframe or workstation processor. The Memory or Program Storage Device 18c, which stores the 'Automatic Well Planning Risk Assessment Software' 18c1, may be, for example, a hard disk, ROM, CD-ROM, DRAM, or other RAM, flash memory, magnetic storage, optical storage, registers, or other volatile and/or non-volatile memory.

Figure 9B:
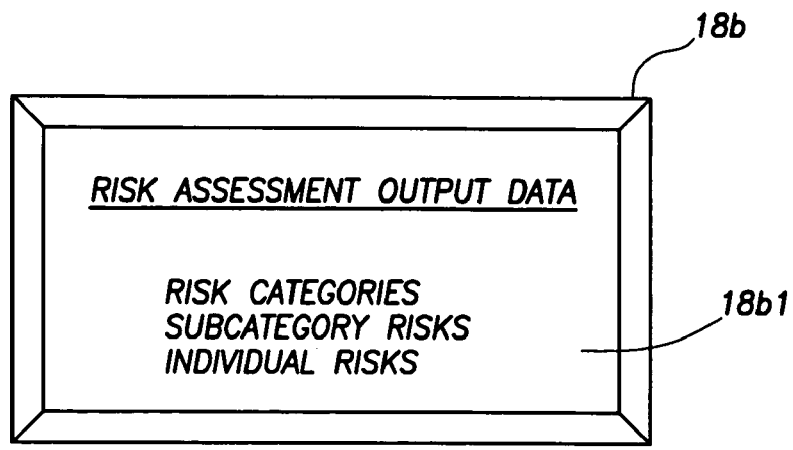
FIG. 9B illustrates a display as shown on a Recorder or Display device of the Computer System of FIG. 9A.

Referring to FIG. 9B, a larger view of the Recorder or Display Device 18b of FIG. 9A is illustrated. In FIG. 9B, the 'Risk Assessment Output Data' 18b1 includes:
(1) a plurality or Risk Categories, (2) a plurality of Subcategory Risks (each of which have been ranked as either a High Risk or a Medium Risk or a Low Risk), and (3) a plurality of Individual Risks (each of which have been ranked as either a High Risk or a Medium Risk or a Low Risk). The Recorder or Display Device 18b of FIG. 9B will display or record the 'Risk Assessment Output Data' 18b1 including the Risk Categories, the Subcategory Risks, and the Individual Risks.

Figure 10:
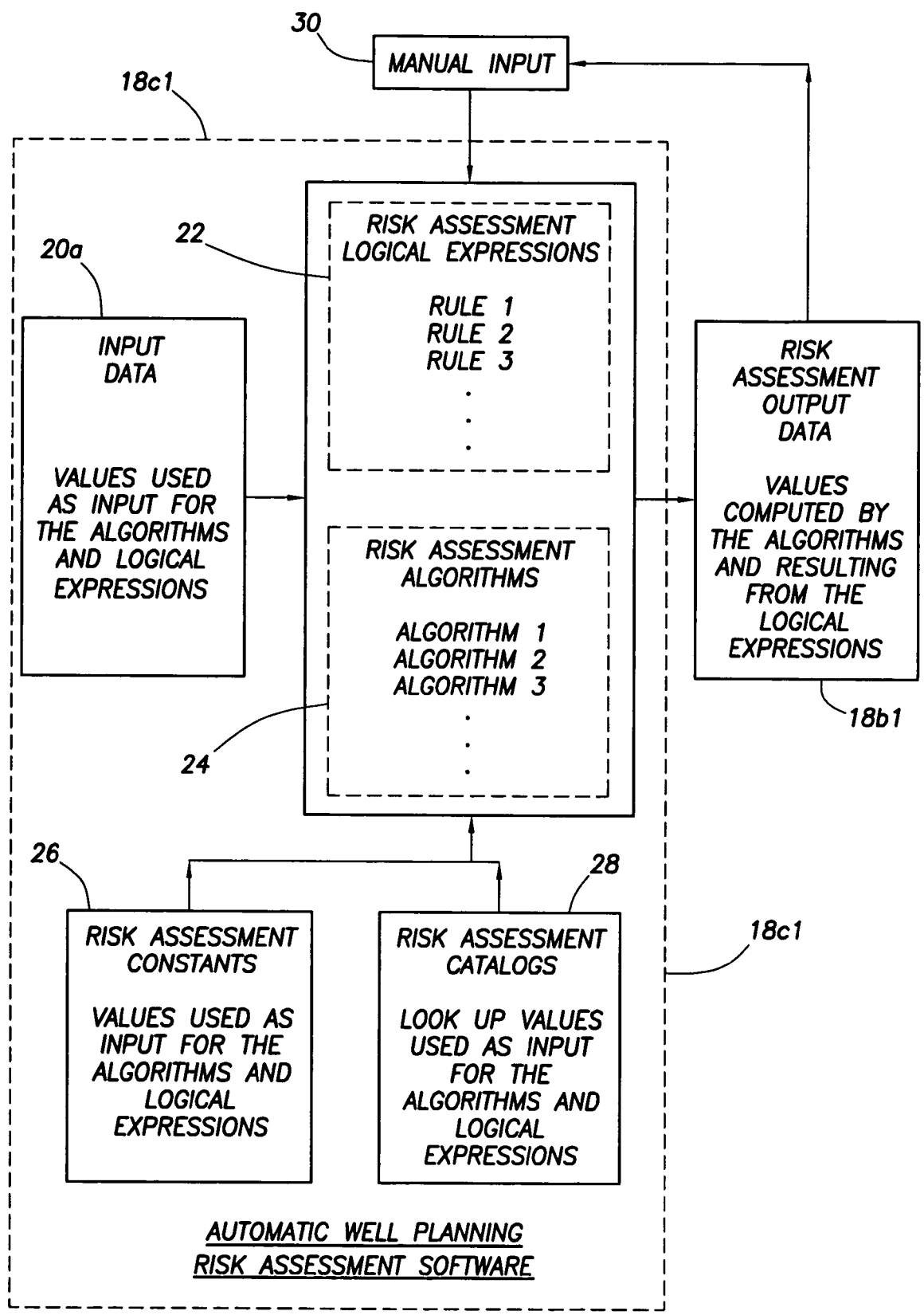
FIG. 10 illustrates a detailed construction of the Automatic Well Planning Risk Assessment Software stored in the Computer System of FIG. 9A.

Referring to FIG. 10, a detailed construction of the 'Automatic Well Planning Risk Assessment Software' 18c1 of FIG. 9A is illustrated. In FIG. 10, the 'Automatic Well Planning Risk Assessment Software' 18c1 includes a first block which stores the Input Data 20a, a second block 22 which stores a plurality of Risk Assessment Logical Expressions 22; a third block 24 which stores a plurality of Risk Assessment Algorithms 24, a fourth block 26 which stores a plurality of Risk Assessment Constants 26, and a fifth block 28 which stores a plurality of Risk Assessment Catalogs 28. The Risk Assessment Constants 26 include values which are used as input for the Risk Assessment Algorithms 24 and the Risk Assessment Logical Expressions 22. The Risk Assessment Catalogs 28 include look-up values which are used as input by the Risk Assessment Algorithms 24 and the Risk Assessment Logical Expressions 22. The 'Input Data' 20a includes values which are used as input for the Risk Assessment Algorithms 24 and the Risk Assessment Logical Expressions 22. The 'Risk Assessment Output Data' 18b1 includes values which are computed by the Risk Assessment Algorithms 24 and which result from the Risk Assessment Logical Expressions 22. In operation, referring to FIGS. 9 and 10, the Processor 18a of the Computer System 18 of FIG. 9A executes the Automatic Well Planning Risk Assessment Software 18c1 by executing the Risk Assessment Logical Expressions 22 and the Risk Assessment Algorithms 24 of the Risk Assessment Software 18c1 while, simultaneously, using the 'Input Data' 20a, the Risk Assessment Constants 26, and the values stored in the Risk Assessment Catalogs 28 as 'input data' for the Risk Assessment Logical Expressions 22 and the Risk Assessment Algorithms 24 during that execution. When that execution by the Processor 18a of the Risk Assessment Logical Expressions 22 and the Risk Assessment Algorithms 24 (while using the 'Input Data' 20a, Constants 26, and Catalogs 28) is completed, the 'Risk Assessment Output Data' 18b1 will be generated as a 'result'. That 'Risk Assessment Output Data' 18b1 is recorded or displayed on the Recorder or Display Device 18b of the Computer System 18 of FIG. 9A. In addition, that 'Risk Assessment Output Data' 18b1 can be manually input, by an operator, to the Risk Assessment Logical Expressions block 22 and the Risk Assessment Algorithms block 24 via a 'Manual Input' block 30 shown in FIG. 10.

Input Data 20a

The following paragraphs will set forth the 'Input Data' 20a which is used by the 'Risk Assessment Logical Expressions' 22 and the 'Risk Assessment Algorithms' 24. Values of the Input Data 20a that are used as input for the Risk Assessment Algorithms 24 and the Risk Assessment Logical Expressions 22 are as follows:
(1) Casing Point Depth
(2) Measured Depth
(3) True Vertical Depth
(4) Mud Weight
(5) Measured Depth
(6) ROP
(7) Pore Pressure
(8) Static Temperature
(9) Pump Rate
(10) Dog Leg Severity
(11) ECD
(12) Inclination
(13) Hole Size
(14) Casing Size
(15) Easting-westing
(16) Northing-Southing
(17) Water Depth
(18) Maximum Water Depth
(19) Maximum well Depth
(20) Kick Tolerance
(21) Drill Collar 1 Weight
(22) Drill Collar 2 Weight
(23) Drill Pipe Weight
(24) Heavy Weight Weight
(25) Drill Pipe Tensile Rating

(26) Upper Wellbore Stability Limit
(27) Lower Wellbore Stability Limit
(28) Unconfined Compressive Strength
(29) Bit Size
(30) Mechanical drilling energy (UCS integrated over distance drilled by the bit)
(31) Ratio of footage drilled compared to statistical footage
(32) Cumulative UCS
(33) Cumulative Excess UCS
(34) Cumulative UCS Ratio
(35) Average UCS of rock in section
(36) Bit Average UCS of rock in section
(37) Statistical Bit Hours
(38) Statistical Drilled Footage for the bit
(39) RPM
(40) On Bottom Hours
(41) Calculated Total Bit Revolutions
(42) Time to Trip
(43) Critical Flow Rate
(44) Maximum Flow Rate in hole section
(45) Minimum Flow Rate in hole section
(46) Flow Rate
(47) Total Nozzle Flow Area of bit
(48) Top Of Cement
(49) Top of Tail slurry
(50) Length of Lead slurry
(51) Length of Tail slurry
(52) Cement Density Of Lead
(53) Cement Density Of Tail slurry
(54) Casing Weight per foot
(55) Casing Burst Pressure
(56) Casing Collapse Pressure
(57) Casing Type Name
(58) Hydrostatic Pressure of Cement column
(59) Start Depth
(60) End Depth
(61) Conductor
(62) Hole Section Begin Depth
(63) Openhole Or Cased hole completion
(64) Casing Internal Diameter
(65) Casing Outer Diameter
(66) Mud Type
(67) Pore Pressure without Safety Margin
(68) Tubular Burst Design Factor
(69) Casing Collapse Pressure Design Factor
(70) Tubular Tension Design Factor
(71) Derrick Load Rating
(72) Drawworks Rating
(73) Motion Compensator Rating
(74) Tubular Tension rating
(75) Statistical Bit ROP
(76) Statistical Bit RPM
(77) Well Type
(78) Maximum Pressure
(79) Maximum Liner Pressure Rating
(80) Circulating Pressure
(81) Maximum UCS of bit
(82) Air Gap
(83) Casing Point Depth
(84) Presence of H2S
(85) Presence of CO2
(86) Offshore Well
(87) Flow Rate Maximum Limit Risk Assessment Constants 26

The following paragraphs will set forth the 'Risk Assessment Constants' 26 which are used by the 'Risk Assessment Logical Expressions' 22 and the 'Risk Assessment Algorithms' 24. Values of the Constants 26 that are used as input data for Risk Assessment Algorithms 24 and the Risk Assessment Logical Expressions 22 are as follows:
(1) Maximum Mud Weight Overbalance to Pore Pressure
(2) Minimum Required Collapse Design Factor
(3) Minimum Required Tension Design Factor
(4) Minimum Required Burst Design Factor
(5) Rock density
(6) Seawater density Risk Assessment Catalogs 28

The following paragraphs will set forth the 'Risk Assessment Catalogs' 28 which are used by the 'Risk Assessment Logical Expressions' 22 and the 'Risk Assessment Algorithms' 24. Values of the Catalogs 28 that are used as input data for Risk Assessment Algorithms 24 and the Risk Assessment Logical Expressions 22 include the following:
(1) Risk Matrix Catalog
(2) Risk Calculation Catalog
(3) Drillstring component catalog
(4) Drill Bit Catalog
(5) Clearance Factor Catalog
(6) Drill Collar Catalog
(7) Drill Pipes Catalog
(8) Minimum and maximum flow rate catalog
(9) Pump catalog
(10) Rig Catalog
(11) Constants and variables Settings catalog
(12) Tubular Catalog Risk Assessment Output Data 18b1

The following paragraphs will set forth the 'Risk Assessment Output Data' 18b1 which are generated by the 'Risk Assessment Algorithms' 24. The 'Risk Assessment Output Data' 18b1, which is generated by the 'Risk Assessment Algorithms' 24, includes the following types of output data: (1) Risk Categories, (2) Subcategory Risks, and (3) Individual Risks. The 'Risk Categories', 'Subcategory Risks', and 'Individual Risks' included within the 'Risk Assessment Output Data' 18b1 comprise the following:

The following 'Risk Categories' are calculated:
(1) Individual Risk
(2) Average Individual Risk
(3) Subcategory Risk
(4) Average Subcategory Risk
(5) Total risk
(6) Average total risk
(7) Potential risk for each design task
(8) Actual risk for each design task The following 'Subcategory Risks' are calculated
(1) Gains risks
(2) Losses risks
(3) Stuck Pipe risks
(4) Mechanical risks The following 'Individual Risks' are calculated
(1) H2S and CO2,
(2) Hydrates,
(3) Well water depth,
(4) Tortuosity,
(5) Dogleg severity,
(6) Directional Drilling Index,
(7) Inclination,
(8) Horizontal displacement,
(9) Casing Wear,
(10) High pore pressure,
(11) Low pore pressure,
(12) Hard rock,

(13) Soft Rock,
(14) High temperature,
(15) Water-depth to rig rating,
(16) Well depth to rig rating,
(17) mud weight to kick,
(18) mud weight to losses,
(19) mud weight to fracture,
(20) mud weight window,
(21) Wellbore stability window,
(22) wellbore stability,
(23) Hole section length,
(24) Casing design factor,
(25) Hole to casing clearance,
(26) casing to casing clearance,
(27) casing to bit clearance,
(28) casing linear weight,
(29) Casing maximum overpull,
(30) Low top of cement,
(31) Cement to kick,
(32) cement to losses,
(33) cement to fracture,
(34) Bit excess work,
(35) Bit work,
(36) Bit footage,
(37) bit hours,
(38) Bit revolutions,
(39) Bit ROP,
(40) Drillstring maximum overputt,
(41) Bit compressive strength,
(42) Kick tolerance,
(43) Critical flow rate,
(44) Maximum flow rate,
(45) Small nozzle area,
(46) Standpipe pressure,
(47) ECD to fracture,
(48) ECD to losses,
(49) Subsea BOP,
(50) Large Hole,
(51) Small Hole,
(52) Number of casing strings,
(53) Drillstring parting,
(54) Cuttings.

Risk Assessment Logical Expressions 22

The following paragraphs will set forth the 'Risk Assessment Logical Expressions' 22. The 'Risk Assessment Logical Expressions' 22 will: (1) receive the 'Input Data 20a' including a 'plurality of Input Data calculation results' that has been generated by the 'Input Data 20a'; (2) determine whether each of the 'plurality of Input Data calculation results' represent a high risk, a medium risk, or a low risk; and (3) generate a 'plurality of Risk Values' (also known as a 'plurality of Individual Risks), in response thereto, each of the plurality of Risk Values/plurality of Individual Risks representing a 'an Input Data calculation result' that has been 'ranked' as either a 'high risk', a 'medium risk', or a 'low risk'.

The Risk Assessment Logical Expressions 22 include the following:
Task: Scenario
Description: H2S and CO2 present for scenario indicated by user (per well)
Short Name: H2S_CO2
Data Name: H2S
Calculation: H2S and CO2 check boxes checked yes
Calculation Name: CalculateH2S_CO2
High: Both selected
Medium: Either one selected
Low: Neither selected
Unit: unitless
Task: Scenario
Description: Hydrate development (per well)
Short Name: Hydrates
Data Name: Water Depth
Calculation: =Water Depth
Calculation Name: CalculateHydrates
High: >=3000
Medium: >=2000
Low: <2000
Unit: fit
Task: Scenario
Description: Hydrate development (per well)
Short Name: Well_WD
Data Name: Water Depth
Calculation: =WaterDepth
Calculation Name: CalculateHydrates
High: >=5000
Medium: >=1000
Low: <1000
Unit: ft
Task: Trajectory
Description: Dogleg severity (per depth)
Short Name: DLS
Data Name: Dog Leg Severity
Calculation: NA
Calculation Name: CalculateRisk
High: >=6
Medium: >=4
Low: <4
Unit: deg/100 ft
Task: Trajectory
Description: Tortuosity (per depth)
Short Name: TORT
Data Name: Dog Leg Severity
Calculation: Summation of DLS
Calculation Name: CalculateTort
High: >=90
Medium: >=60
Low: <60
Unit: deg
Task: Trajectory
Description: Inclination (per depth)
Short Name: INC
Data Name: Inclination
Calculation: NA
Calculation Name: CalculateRisk
High: >=65
Medium: >=40
Low: <40
Unit: deg
Task: Trajectory
Description: Well inclinations with difficult cuttings transport conditions (per depth)
Short Name: Cutting
Data Name: Inclination
Calculation: NA
Calculation Name: CalculateCutting
High: >=45
Medium: >65
Low: <45
Unit: deg
Task: Trajectory
Description: Horizontal to vertical ratio (per depth)
Short Name: Hor_Disp
Data Name: Inclination Calculation: =Horizontal Displacement/True Vertical Depth
Calculation Name: CalculateHor Disp
High: >=1.0
Medium: >=0.5
Low: <0.5
Unit: Ratio
Task: Trajectory
Description: Directional Drillability Index (per depth) Fake Threshold
Short Name: DDI
Data Name: Inclination
Calculation: =Calculate DDI using Resample data
Calculation Name: CalculateDDI
High: >6.8
Medium: >=6.0
Low: <6.0
Unit: unitless
Task: EarthModel
Description: High or supernormal Pore Pressure (per depth)
Short Name: PP_High
Data Name: Pore Pressure without Safety Margin
Calculation: =PP
Calculation Name: CalculateRisk
High: >=16
Medium: >=12
Low: <12
Unit: ppg
Task: EarthModel
Description: Depleted or subnormal Pore Pressure (per depth)
Short Name: PP_Low
Data Name: Pore Pressure without Safety Margin
Calculation: =Pore Pressure without Safety Margin
Calculation Name: CalculateRisk
High: <=8.33
Medium: <=8.65
Low: >8.65
Unit: ppg
Task: EarthModel
Description: Superhard rock (per depth)
Short Name: RockHard
Data Name: Unconfined Compressive Strength
Calculation: =Unconfined Compressive Strength
Calculation Name: CalculateRisk
High: >=25
Medium: >=16
Low: <16
Unit: kpsi
Task: EarthModel
Description: Gumbo (per depth)
Short Name: RockSoft
Data Name: Unconfined Compressive Strength
Calculation: =Unconfined Compressive Strength
Calculation Name: CalculateRisk
High: <=2
Medium: <=4
Low: >4
Unit: kpsi
Task: EarthModel
Description: High Geothermal Temperature (per depth)
Short Name: TempHigh
Data Name: StaticTemperature
Calculation: =Temp
Calculation Name: CalculateRisk
High: >=280
Medium: >=220
Low: <220

Unit: degF
Task: RigConstraint
Description: Water depth as a ratio to the maximum water depth rating of the rig (per depth)
Short Name: Rig_WD
Data Name:
Calculation: =WD, Rig WD rating
Calculation Name: CalculateRig_WD
High: >=0.75
Medium: >=0.5
Low: <0.5
Unit: Ratio
Task: RigConstraint
Description: Total measured depth as a ratio to the maximum depth rating of the rig (per depth)
Short Name: Rig_MD
Data Name:
Calculation: =MD/Rig MD rating
Calculation Name: CalculateRig_MD
High: >=0.75
Medium: >=0.5
Low: <0.5
Unit: Ratio
Task: RigConstraint
"Description: Subsea BOP or wellhead (per well), not quite sure how to compute it"
Short Name: SS_BOP
Data Name: Water Depth
Calculation: =
Calculation Name: CalculateHydrates
High: >=3000
Medium: >=1000
Low: <1000
Unit: ft
Task: MudWindow
Description: Kick potential where Mud Weight is too low relative to Pore Pressure (per depth)
Short Name: MW_Kick
Data Name:
Calculation: =Mud Weight−Pore Pressure
Calculation Name: CalculateMW_Kick
High: <=0.3
Medium: <=0.5
Low: >0.5
Unit: ppg
Task: MudWindow
Description: Loss potential where Hydrostatic Pressure is too high relative to Pore Pressure (per depth)
Short Name: MW_Loss
Data Name:
Calculation: =Hydrostatic Pressure−Pore Pressure
Calculation Name: CalculateMW_Loss
"PreCondition: =Mud Type (HP-WBM, ND-WBM, D-WBM)"
High: >=2500
Medium: >=2000
Low: <2000
Unit: psi
Task: MudWindow
Description: Loss potential where Hydrostatic Pressure is too high relative to Pore Pressure (per depth)
Short Name: MW_Loss
Data Name:
Calculation: =Hydrostatic Pressure−Pore Pressure
Calculation Method: CalculateMW_Loss
"PreCondition: =Mud Type (OBM, MOBM, SOBM)"
High: >=2000

Medium: >=1500
Low: <1500
Unit: psi
Task: MudWindow
Description: Loss potential where Mud Weight is too high relative to Fracture Gradient (per depth)
Short Name: MW_Frac
Data Name:
Calculation: =Upper Bound−Mud Weight
Calculation Method: CalculateMW_Frac
High: <=0.2
Medium: <=0.5
Low: >0.5
Unit: ppg
Task: MudWindow
Description: Narrow mud weight window (per depth)
Short Name: MWW
Data Name:
Calculation: =Upper Wellbore Stability Limit−Pore Pressure without Safety Margin
Calculation Method: CalculateMWW
High: <=0.5
Medium: <=1.0
Low: >1.0
Unit: ppg
Task: MudWindow
Description: Narrow wellbore stability window (per depth)
Short Name: WBSW
Data Name:
Calculation: =Upper Bound−Lower Bound
Calculation Method: CalculateWBSW
"PreCondition: =Mud Type (OBM, MOBM, SOBM)"
High: <=0.3
Medium: <=0.6
Low: >0.6
Unit: ppg
Task: MudWindow
Description: Narrow wellbore stability window (per depth)
Short Name: WBSW
Data Name:
Calculation: =Upper Bound−Lower Bound
Calculation Method: CalculateWBSW
"PreCondition: =Mud Type (HP-WBM, ND-WBM, D-WBM)"
High: <=0.4
Medium: <=0.8
Low: >0.8
Unit: ppg
Task: MudWindow
Description: Wellbore Stability (per depth)
Short Name: WBS
Data Name: Pore Pressure without Safety Margin
Calculation: =Pore Pressure without Safety Margin
Calculation Method: CalculateWBS
High: LB>=MW>=PP
Medium: MW>=LB>=PP
Low: MW>=PP>=LB
Unit: unitless
Task: MudWindow
Description: Hole section length (per hole section)
Short Name: HSLength
Data Name:
Calculation: =HoleEnd−HoleStart
Calculation Method: CalculateHSLength
High: >=8000
Medium: >=7001
Low: <7001
Unit: ft
Task: MudWindow
Description: Dogleg severity at Casing points for casing wear (per hole section)
Short Name: Csg_Wear
Data Name: Dog Leg Severity
Calculation: =Hole diameter
Calculation Method: CalculateCsg_Wear
High: >=4
Medium: >=3
Low: <3
Unit: deg/100 ft
Task: MudWindow
Description: Number of Casing strings (per hole section)
Short Name: Csg_Count
Data Name: Casing Point Depth
Calculation: =Number of Casing strings
Calculation Method: CalculateCsg_Count
High: >=6
Medium: >=4
Low: <4
Unit: unitless
Task: WellboreSizes
Description: Large Hole size (per hole section)
Short Name: Hole_Big
Data Name: Hole Size
Calculation: =Hole diameter
Calculation Method: CalculateHoleSectionRisk
High: >=24
Medium: >=18.625
Low: <18.625
Unit: in
Task: WellboreSizes
Description: Small Hole size (per hole section)
Short Name: Hole_Sm
Data Name: Hole Size
Calculation: =Hole diameter
Calculation Method: CalculateHole_Sm
PreCondition: Onshore
High: <=4.75
Medium: <=6.5
Low: >6.5
Unit: in
Task: WellboreSizes
Description: Small Hole size (per hole section)
Short Name: Hole_Sm
Data Name: Hole Size
Calculation: =Hole diameter
Calculation Method: CalculateHole_Sm
PreCondition: Offshore
High: <=6.5
Medium: <=7.875
Low: >7.875
Unit: in
Task: TubularDesign
"Description: Casing Design Factors for Burst, Collapse, & Tension (per hole section), DFb,c,t<=1.0 for High, DFb,c,t<=1.1 for Medium, DFb,c,t>1.1 for Low"
Short Name: Csg_DF
Data Name:
Calculation: =DF/Design Factor
Calculation Method: CalculateCsg_DF
High: <=1.0
Medium: <=1.1
Low: >1.1
Unit: unitless
Task: TubularDesign Description: Casing string weight relative to rig lifting capabilities (per casing string)
Short Name: Csg_Wt
Data Name:
Calculation: =CasingWeight/RigMinRating
Calculation Method: CalculateCsg_Wt
High: >=0.95
Medium: <0.95
Low: <0.8
Unit: Ratio
Task: TubularDesign
Description: Casing string allowable Margin of Overpull (per casing string)
Short Name: Csg_MOP
Data Name:
Calculation: =Tubular Tension rating-CasingWeight
Calculation Method: CalculateCsg_MOP
High: <=50
Medium: <=100
Low: >100
Unit: klbs
Task: WellboreSizes
Description: Clearance between hole size and casing max OD (per hole section)
Short Name: Hole_Csg
Data Name:
Calculation: =Area of hole size Area of casing size (max OD)
Calculation Method: CalculateHole_Csg
High: <=1.1
Medium: <=1.25
Low: >1.25
Unit: Ratio
Task: WellboreSizes
Description:
Short Name: Csg_Csg
Data Name:
Calculation: =CainsgID/NextMaxCasingSize
Calculation Method: CalculateCsg_Csg
High: <=1.05
Medium: <=1.1
Low: >1.1
Unit: Ratio
Task: WellboreSizes
Description: Clearance between casing inside diameter and subsequent bit size (per bit run)
Short Name: Csg_Bit
Data Name:
Calculation: =CainsgID/NextBit Size
Calculation Method: CalculateCsg_Bit
High: <=1.05
Medium: <=1.1
Low: >1.1
Unit: Ratio
Task: CementDesign
Description: Cement height relative to design guidelines for each string type (per hole section)
Short Name: TOC_Low
Data Name:
Calculation: =CasingBottomDepth-TopDepthOfCement
Calculation Method: CalculateTOC_Low
High: <=0.75
Medium: <=1.0
Low: >1.0
Unit: Ratio
Task: CementDesign
Description: Kick potential where Hydrostatic Pressure is too low relative to Pore Pressure (per depth)
Short Name: Cmt_Kick
Data Name:
Calculation: =(Cementing Hydrostatic Pressure-Pore Pressure)/TVD
Calculation Method: CalculateCmt_Kick
High: <=0.3
Medium: <=0.5
Low: >0.5
Unit: ppg
Task: CementDesign
Description: Loss potential where Hydrostatic Pressure is too high relative to Pore Pressure (per depth)
Short Name: Cmt_Loss
Data Name:
Calculation: =Cementing Hydrostatic Pressure-Pore Pressure
Calculation Method: CalculateCmt_Loss
High: >=2500
Medium: >=2000
Low: <2000
Unit: psi
Task: CementDesign
Description: Loss potential where Hydrostatic Pressure is too high relative to Fracture Gradient (per depth)
Short Name: Cmt_Frac
Data Name:
Calculation: =(UpperBound-Cementing Hydrostatic Pressure)/TVD
Calculation Method: CalculateCmt_Frac
High: <=0.2
Medium: <=0.5
Low: >0.5
Unit: ppg
Task: BitsSelection
Description: Excess bit work as a ratio to the Cumulative Mechanical drilling energy (UCS integrated over distance drilled by the bit)
Short Name: Bit_WkxS
Data Name: CumExcessCumulative UCSRatio
Calculation: =CumExcess/Cumulative UCS
Calculation Method: CalculateBitSectionRisk
High: >=0.2
Medium: >=0.1
Low: <0.1
Unit: Ratio
Task: BitsSelection
Description: Cumulative bit work as a ratio to the bit catalog average Mechanical drilling energy (UCS integrated over distance drilled by the bit)
Short Name: Bit_Wk
Data Name:
Calculation: =Cumulative UCS/Mechanical drilling energy (UCS integrated over distance drilled by the bit)
Calculation Method: CalculateBit_Wk
High: >=1.5
Medium: >=1.25
Low: <1.25
Unit: Ratio
Task: BitsSelection
Description: Cumulative bit footage as a ratio to the bit catalog average footage (drilled length) (per depth)
Short Name: Bit_Ftg
Data Name: Ratio of footage drilled compared to statistical footage
Calculation: =Ratio of footage drilled compared to statistical footage
Calculation Method: CalculateBitSectionRisk High: >=2
Medium: >=1.5
Low: <1.5
Unit: Ratio
Task: BitsSelection
Description: Cumulative bit hours as a ratio to the bit catalog average hours (on bottom rotating time) (per depth)
Short Name: Bit_Hrs Data Name: Bit_Ftg
Calculation: =On Bottom Hours/Statistical Bit Hours
Calculation Method: CalculateBit_Hrs
High: >=2
Medium: >=1.5
Low: <1.5
Unit: Ratio
Task: BitsSelection
Description: Cumulative bit Krevs as a ratio to the bit catalog average Krevs (RPM*hours) (per depth)
Short Name: Bit_Krev
Data Name:
Calculation: =Cumulative Krevs Bit average Krevs
Calculation Method: CalculateBit_Krev
High: >=2
Medium: >=1.5
Low: <1.5
Unit: Ratio
Task: BitsSelection
Description: Bit ROP as a ratio to the bit catalog average ROP (per bit run)
Short Name: Bit_ROP
Data Name:
Calculation: =ROP/Statistical Bit ROP
Calculation Method: CalculateBit_ROP
High: >=1.5
Medium: >=1.25
Low: <1.25
Unit: Ratio
Task: BitsSelection
Description: UCS relative to Bit UCS and Max Bit UCS (per depth)
Short Name: Bit_UCS
Data Name:
Calculation: =UCS
Calculation Method: CalculateBit_UCS
High: UCS>=Max Bit UCS>=Bit UCS
Medium: Max Bit UCS>=UCS>=Bit UCS
Low: Max Bit UCS>=Bit UCS>=UCS
Unit: Ratio
Task: DrillstringDesign
Description: Drillstring allowable Margin of Overpull (per bit run)
Short Name: DS_MOP
Data Name:
Calculation: =MOP
Calculation Method: CalculateDS MOP
High: <=50
Medium: <=100
Low: >100
Unit: klbs
Task: DrillstringDesign
"Description: Potential parting of the drillstrings where required tension approaches mechanical tension limits of drill pipe, heavy weight, drill pipe, drill collars, or connections (per bit run)"
Short Name: DS_Part
Data Name:
Calculation: =Required Tension (including MOP)/Tension limit of drilling component (DP)

Calculation Method: CalculateDS_Part
High: >=0.9
Medium: >=0.8
Low: >0.8
Unit: ratio
Task: DrillstringDesign
Description: Kick Tolerance (per hole section)
Short Name: Kick_Tol
Data Name: Bit_UCS
"Calculation: NA (already calculated), Exploration/Development"
Calculation Method: CalculateKick_Tol
PreCondition: Exporation
High: <=50
Medium: <=100
Low: >100
Unit: bbl
Task: DrillstringDesign
Description: Kick Tolerance (per hole section)
Short Name: Kick_Tol
Data Name: Bit_UCS
"Calculation: NA (already calculated), Exploration/Development"
Calculation Method: CalculateKick_Tol
PreCondition: Development
High: <=25
Medium: <=50
Low: >50
Unit: bbl
Task: Hydraulics
Description: Flow rate for hole cleaning (per depth)
Short Name: Q_Crit
"Data Name: Flow Rate, Critical Flow Rate"
Calculation: =Flow Rate/Critical Flow Rate
Calculation Method: CalculateQ_Crit
High: <=1.0
Medium: <=1.1
Low: >1.1
Unit: Ratio
Task: Hydraulics
Description: Flow rate relative to pump capabilities(per depth)
Short Name: Q_Max
Data Name: Bit_UCS
Calculation: =Q/Qmax
Calculation Method: CalculateQ_Max
High: >=1.0
Medium: >=0.9
Low: <0.9
Unit: Ratio
Task: Hydraulics
"Description: TFA size relative to minimum TFA (per bit run), 0.2301=3 of 10/32 inch, 0.3313=3 of 12/32 inch"
Short Name: TFA_Low
Data Name: Bit_UCS
Calculation: TFA
Calculation Method: CalculateTFA_Low
High: <=0.2301
Medium: <=0.3313
Low: >0.3313
Unit: inch
Task: Hydraulics
Description: Circulating pressure relative to rig and pump maximum pressure (per depth)
Short Name: P_Max
Data Name: Bit UCS
Calculation: P_Max Calculation Method: CalculateP_Max
High: >=1.0
Medium: >=0.9
Low: <0.9
Unit: Ratio
Task: Hydraulics
Description: Loss potential where ECD is too high relative to Fracture Gradient (per depth)
Short Name: ECD_Frac
Data Name: Bit_UCS
Calculation: UpperBound—ECD
Calculation Method: CalculateECD_Frac
High: <=0.0
Medium: <=0.2
Low: >0.2
Unit: ppg
Task: Hydraulics
Description: Loss potential where ECD is too high relative to Pore Pressure (per depth)
Short Name: ECD_Loss
Data Name: Bit_UCS
Calculation: =ECD−Pore Pressure
Calculation Method: CalculateECD_Loss
"PreCondition: Mud Type (HP-WBM, ND-WBM, D-WBM)"
High: >=2500
Medium: >=2000
Low: <2000
Unit: psi
Task: Hydraulics
Description: Loss potential where ECD is too high relative to Pore Pressure (per depth)
Short Name: ECD_Loss
Data Name: Bit_UCS
Calculation: =ECD−Pore Pressure
Calculation Method: CalculateECD_Loss
"PreCondition: Mud Type (OBM, MOBM, SOBM)"
High: >=2000
Medium: >=1500
Low: <1500
Unit: psi Risk Assessment Algorithms 24

Recall that the 'Risk Assessment Logical Expressions' 22 will: (1) receive the 'Input Data 20a' including a 'plurality of Input Data calculation results' that has been generated by the 'Input Data 20a'; (2) determine whether each of the 'plurality of Input Data calculation results' represent a high risk, a medium risk, or a low risk; and (3) generate a plurality of Risk Values/plurality of Individual Risks in response thereto, where each of the plurality of Risk Values/plurality of Individual Risks represents a 'an Input Data calculation result' that has been 'ranked' as having either a 'high risk' severity, or a 'medium risk' severity, or a 'low risk' severity. For example, recall the following task:
Task: Hydraulics
Description: Loss potential where ECD is too high relative to Pore Pressure (per depth)
Short Name: ECD_Loss
Data Name: Bit_UCS
Calculation: =ECD−Pore Pressure
Calculation Method: CalculateECD_Loss
"PreCondition: Mud Type (OBM, MOBM, SOBM)"
High: >=2000
Medium: >=1500
Low: <1500
Unit: psi When the Calculation 'ECD-Pore Pressure' associated with the above referenced Hydraulics task is >=2000, a 'high' rank is assigned to that calculation; but if the Calculation 'ECD-Pore Pressure' is >=1500, a 'medium' rank is assigned to that calculation, but if the Calculation 'ECD-Pore Pressure' is <1500, a 'low' rank is assigned to that calculation.

Therefore, the 'Risk Assessment Logical Expressions' 22 will rank each of the 'Input Data calculation results' as either a 'high risk' or a 'medium risk' or a 'low risk' thereby generating a 'plurality of ranked Risk Values', also known as a 'plurality of ranked Individual Risks'. In response to the 'plurality of ranked Individual Risks' received from the Logical Expressions 22, the 'Risk Assessment Logical Algorithms' 24 will then assign a 'value' and a 'color' to each of the plurality of ranked Individual Risks received from the Logical Expressions 22, where the 'value' and the 'color' depends upon the particular ranking (i.e., the 'high risk' rank, or the 'medium risk' rank, or the 'low risk' rank) that is associated with each of the plurality of ranked Individual Risks. The 'value' and the 'color' is assigned, by the 'Risk Assessment Algorithms' 24, to each of the plurality of Individual Risks received from the Logical Expressions 22 in the following manner:

Risk Calculation #1—Individual Risk Calculation:

Referring to the 'Risk Assessment Output Data' 18b1 set forth above, there are fifty-four (54) 'Individual Risks' currently specified. For an 'Individual Risk':
a High risk=90,
a Medium risk=70, and
a Low risk=10
High risk color code=Red
Medium risk color code=Yellow
Low risk color code=Green If the 'Risk Assessment Logical Expressions' 22 assigns a 'high risk' rank to a particular 'Input Data calculation result', the 'Risk Assessment Algorithms' 24 will then assign a value '90' to that 'Input Data calculation result' and a color 'red' to that 'Input Data calculation result'.

If the 'Risk Assessment Logical Expressions' 22 assigns a 'medium risk' rank to a particular 'Input Data calculation result', the 'Risk Assessment Algorithms' 24 will then assign a value '70' to that 'Input Data calculation result' and a color 'yellow' to that 'Input Data calculation result'.

If the 'Risk Assessment Logical Expressions' 22 assigns a 'low risk' rank to a particular 'Input Data calculation result', the 'Risk Assessment Algorithms' 24 will then assign a value '10' to that 'Input Data calculation result' and a color 'green' to that 'Input Data calculation result'.

Therefore, in response to the 'Ranked Individual Risks' from the Logical Expressions 22, the Risk Assessment Algorithms 24 will assign to each of the 'Ranked Individual Risks' a value of 90 and a color 'red' for a high risk, a value of 70 and a color 'yellow' for the medium risk, and a value of 10 and a color 'green' for the low risk. However, in addition, in response to the 'Ranked Individual Risks' from the Logical Expressions 22, the Risk Assessment Algorithms 24 will also generate a plurality of ranked 'Risk Categories' and a plurality of ranked 'Subcategory Risks'

Referring to the 'Risk Assessment Output Data' 18b1 set forth above, the 'Risk Assessment Output Data' 18b1 includes: (1) eight 'Risk Categories', (2) four 'Subcategory Risks', and (3) fifty-four (54) 'Individual Risks' [that is, 54 individual risks plus 2 'gains' plus 2 'losses' plus 2 'struck ' plus 2 'mechanical' plus 1 'total'=63 risks].

The eight 'Risk Categories' include the following: (1) an Individual Risk, (2) an Average Individual Risk, (3) a Risk Subcategory (or Subcategory Risk), (4) an Average Subcategory Risk, (5) a Risk Total (or Total Risk), (6) an Average Total Risk, (7) a potential Risk for each design task, and (8) an Actual Risk for each design task.

Recalling that the 'Risk Assessment Algorithms' 24 have already established and generated the above referenced 'Risk Category (1)' [i.e., the plurality of ranked Individual Risks'] by assigning a value of 90 and a color 'red' to a high risk 'Input Data calculation result', a value of 70 and a color 'yellow' to a medium risk 'Input Data calculation result', and a value of 10 and a color 'green' to a low risk 'Input Data calculation result', the 'Risk Assessment Algorithms' 24 will now calculate and establish and generate the above referenced 'Risk Categories (2) through (8)' in response to the plurality of Risk Values/plurality of Individual Risks received from the 'Risk Assessment Logical Expressions' 22 in the following manner:

Risk Calculation #2—Average Individual Risk:

The average of all of the 'Risk Values' is calculated as follows:

$$\text{Average individual risk} = \frac{\sum_{i}^{n} Riskvalue_i}{n}$$

In order to determine the 'Average Individual Risk', sum the above referenced 'Risk Values' and then divide by the number of such 'Risk Values', where i=number of sample points. The value for the 'Average Individual Risk' is displayed at the bottom of the colored individual risk track.

Risk Calculation #3—Risk Subcategory

Referring to the 'Risk Assessment Output Data' 18b1 set forth above, the following 'Subcategory Risks' are defined: (a) gains, (b) losses, (c) stuck and (d) mechanical, where a 'Subcategory Risk' (or 'Risk Subcategory') is defined as follows:

$$\text{Risk Subcategory} = \frac{\sum_{j}^{n} (Riskvalue_j \times severity_j \times N_j)}{\sum_{j} (severtiy_j \times N_j)}$$

j=number of individual risks,
0≦Severity≦5, and
$N_j$=either 1 or 0 depending on whether the Risk Value j contributes to the sub category
$Severity_j$=from the risk matrix catalog.
Red risk display for Risk Subcategory≧40
Yellow risk display for 20≦Risk Subcategory<40
Green risk display for Risk Subcategory<20

Risk Calculation #4—Average Subcategory Risk:

$$\text{Average subcategory risk} = \frac{\sum_{i}^{n} (Risk\ Subcategory_i \times risk\ multiplier_i)}{\sum_{1}^{n} risk\ multiplier_i}$$

n=number of sample points.

The value for the average subcategory risk is displayed at the bottom of the colored subcategory risk track.
Risk Multiplier=3 for Risk Subcategory≧40,
Risk Multiplier=2 for 20≦Risk Subcategory≦40
Risk Multiplier=1 for Risk Subcategory<20

Risk Calculation #5—Total Risk

The total risk calculation is based on the following categories: (a) gains, (b) losses, (c) stuck, and (d) mechanical.

$$\text{Risk Total} = \frac{\sum_{1}^{4} Risk\ subcategory_k}{4}$$

where k=number of subcategories
Red risk display for Risk total≧40
Yellow risk display for 20≦Risk Total<40
Green risk display for Risk Total<20

Risk Calculation #6—Average Total Risk $$\text{Average total risk} = \frac{\sum_{i}^{n} (Risk\ Subcategory_i \times risk\ multiplier_i)}{\sum_{1}^{n} risk\ multiplier_i}$$

n=number of sample points.
Risk Multiplier=3 for Risk Subcategory≧40,
Risk Multiplier=2 for 20≦Risk Subcategory<40
Risk Multiplier=1 for Risk Subcategory<20

The value for the average total risk is displayed at the bottom of the colored total risk track.

Risk Calculation #7—Risks Per Design Task:

The following 14 design tasks have been defined: Scenario, Trajectory, Mechanical Earth Model, Rig, Wellbore stability, Mud weight and casing points, Wellbore Sizes, Casing, Cement, Mud, Bit, Drillstring, Hydraulics, and Time design. There are currently 54 individual risks specified.

Risk Calculation #7A—Potential Maximum Risk Per Design Task $$\text{Potential } Risk_k = \frac{\sum_{j=1}^{55} (90 \times Severity_{k,j} \times N_{k,j})}{\sum_{j=1}^{55} (Severity_{k,j} \times N_{k,j})}$$

k=index of design tasks, there are 14 design tasks,
$N_j$=either 0 or 1 depending on whether the Risk Value$_j$ contributes to the design task.
0≦Severity≦5

Risk Calculation #7B—Actual Risk Per Design Task $$\text{Actual } Risk_k = \frac{\sum_{j=1}^{55} (\text{Average Individual } Risk_j \times Severity_{,j} \times N_{k,j})}{\sum_{j=1}^{55} (Severity_j \times N_{k,j})}$$

k=index of design tasks, there are 14 design tasks
$N_{k,j} \in [0, \ldots, M]$
$0 \leq Severity_j \leq 5$ The 'Severity' in the above equations are defined as follows:

| Risk | Severity |
|---|---|
| H2S_CO2 | 2.67 |
| Hydrates | 3.33 |
| Well_WD | 3.67 |
| DLS | 3 |
| TORT | 3 |
| Well_MD | 4.33 |
| INC | 3 |
| Hor_Disp | 4.67 |
| DDI | 4.33 |
| PP_High | 4.33 |
| PP_Low | 2.67 |
| RockHard | 2 |
| RockSoft | 1.33 |
| TempHigh | 3 |
| Rig_WD | 5 |
| Rig_MD | 5 |
| SS_BOP | 3.67 |
| MW_Kick | 4 |
| MW_Loss | 3 |
| MW_Frac | 3.33 |
| MWW | 3.33 |
| WBS | 3 |
| WBSW | 3.33 |
| HSLength | 3 |
| Hole_Big | 2 |
| Hole_Sm | 2.67 |
| Hole_Csg | 2.67 |
| Csg_Csg | 2.33 |
| Csg_Bit | 1.67 |
| Csg_DF | 4 |
| Csg_Wt | 3 |
| Csg_MOP | 2.67 |
| Csg_Wear | 1.33 |
| Csg_Count | 4.33 |
| TOC_Low | 1.67 |
| Cmt_Kick | 3.33 |
| Cmt_Loss | 2.33 |
| Cmt_Frac | 3.33 |
| Bit_Wk | 2.33 |
| Bit_WkXS | 2.33 |
| Bit_Ftg | 2.33 |
| Bit_Hrs | 2 |
| Bit_Krev | 2 |
| Bit_ROP | 2 |
| Bit_UCS | 3 |
| DS_MOP | 3.67 |
| DS_Part | 3 |
| Kick_Tol | 4.33 |
| Q_Crit | 2.67 |
| Q_Max | 3.33 |
| Cutting | 3.33 |
| P_Max | 4 |
| TFA_Low | 1.33 |
| ECD_Frac | 4 |
| ECD_Loss | 3.33 |

Figure 11:
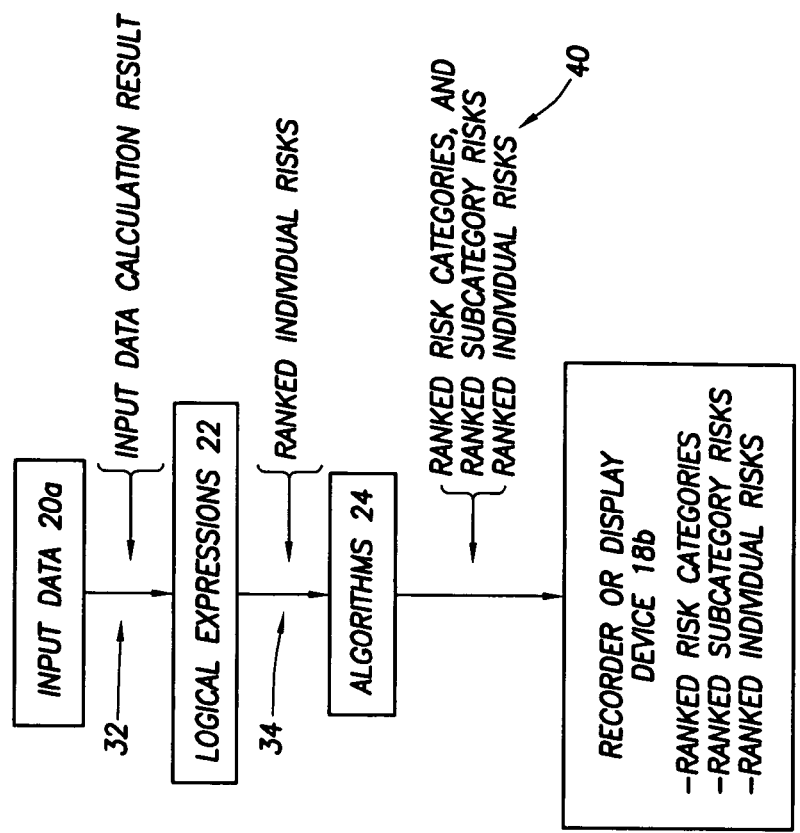
FIG. 11 illustrates a block diagram which is used during a functional description of the operation of the present invention.

Refer now to FIG. 11 which will be used during the following functional description of the operation of the present invention.

A functional description of the operation of the 'Automatic Well Planning Risk Assessment Software' 18c1 will be set forth in the following paragraphs with reference to FIGS. 1 through 11 of the drawings.

The Input Data 20a shown in FIG. 9A will be introduced as 'input data' to the Computer System 18 of FIG. 9A. The Processor 18a will execute the Automatic Well Planning Risk Assessment Software 18c1, while using the Input Data 20a, and, responsive thereto, the Processor 18a will generate the Risk Assessment Output Data 18b1, the Risk Assessment Output Data 18b1 being recorded or displayed on the Recorder or Display Device 18b in the manner illustrated in FIG. 9B. The Risk Assessment Output Data 18b1 includes the 'Risk Categories', the 'Subcategory Risks', and the 'Individual Risks'. When the Automatic Well Planning Risk Assessment Software 18c1 is executed by the Processor 18a of FIG. 9A, referring to FIGS. 10 and 11, the Input Data 20a (and the Risk Assessment Constants 26 and the Risk Assessment Catalogs 28) are collectively provided as 'input data' to the Risk Assessment Logical Expressions 22. Recall that the Input Data 20a includes a 'plurality of Input Data Calculation results'. As a result, as denoted by element numeral 32 in FIG. 11, the 'plurality of Input Data Calculation results' associated with the Input Data 20a will be provided directly to the Logical Expressions block 22 in FIG. 11. During that execution of the Logical Expressions 22 by the Processor 18a, each of the 'plurality of Input Data Calculation results' from the Input Data 20a will be compared with each of the 'logical expressions' in the Risk Assessment Logical Expressions block 22 in FIG. 11. When a match is found between an 'Input Data Calculation result' from the Input Data 20a and an 'expression' in the Logical Expressions block 22, a 'Risk Value' or 'Individual Risk' 34 will be generated (by the Processor 18a) from the Logical Expressions block 22 in FIG. 11. As a result, since a 'plurality of Input Data Calculation results' 32 from the Input Data 20a have been compared with a 'plurality of expressions' in the Logical Expressions' block 22 in FIG. 11, the Logical Expressions block 22 will generate a plurality of Risk Values/plurality of Individual Risks 34 in FIG. 11, where each of the plurality of Risk Values/plurality of Individual Risks on line 34 in FIG. 11 that are generated by the Logical Expressions block 22 will represent an 'Input Data Calculation result' from the Input Data 20a that has been ranked as either a 'High Risk', or a 'Medium Risk', or a 'Low Risk' by the Logical Expressions block 22. Therefore, a 'Risk Value' or 'Individual Risk' is defined as an 'Input Data Calculation result' from the Input Data 20a that has been matched with one of the 'expressions' in the Logical Expressions 22 and ranked, by the Logical Expressions block 22, as either a 'High Risk', or a 'Medium Risk', or a 'Low Risk'. For example, consider the following 'expression' in the Logical Expressions' 22:

Task: MudWindow
Description: Hole section length (per hole section)
Short Name: HSLength
Data Name:
Calculation: =HoleEnd−HoleStart
Calculation Method: CalculateHSLength
High: >=8000
Medium: >=7001
Low: <7001

The 'Hole End−HoleStart' calculation is an 'Input Data Calculation result' from the Input Data 20a. The Processor 18a will find a match between the 'Hole End−HoleStart Input Data Calculation result' originating from the Input Data 20a and the above identified 'expression' in the Logical Expressions 22. As a result, the Logical Expressions block 22 will 'rank' the 'Hole End−HoleStart Input Data Calculation result' as either a 'High Risk', or a 'Medium Risk', or a 'Low Risk' depending upon the value of the 'Hole End−HoleStart Input Data Calculation result'.

When the 'Risk Assessment Logical Expressions' 22 ranks the 'Input Data calculation result' as either a 'high risk' or a 'medium risk' or a 'low risk' thereby generating a plurality of ranked Risk Values/plurality of ranked Individual Risks, the 'Risk Assessment Logical Algorithms' 24 will then assign a 'value' and a 'color' to that ranked 'Risk Value' or ranked 'Individual Risk', where the 'value' and the 'color' depends upon the particular ranking (i.e., the 'high risk' rank, or the 'medium risk' rank, or the 'low risk' rank) that is associated with that 'Risk Value' or 'Individual Risk'. The 'value' and the 'color' is assigned, by the 'Risk Assessment Logical Algorithms' 24, to the ranked 'Risk Values' or ranked 'Individual Risks' in the following manner:
a High risk=90,
a Medium risk=70, and
a Low risk=10
High risk color code=Red
Medium risk color code=Yellow
Low risk color code=Green If the 'Risk Assessment Logical Expressions' 22 assigns a 'high risk' rank to the 'Input Data calculation result' thereby generating a ranked 'Individual Risk', the 'Risk Assessment Logical Algorithms' 24 assigns a value '90' to that ranked 'Risk Value' or ranked 'Individual Risk' and a color 'red' to that ranked 'Risk Value' or that ranked 'Individual Risk'. If the 'Risk Assessment Logical Expressions' 22 assigns a 'medium risk' rank to the 'Input Data calculation result' thereby generating a ranked 'Individual Risk', the 'Risk Assessment Logical Algorithms' 24 assigns a value '70' to that ranked 'Risk Value' or ranked 'Individual Risk' and a color 'yellow' to that ranked 'Risk Value' or that ranked 'Individual Risk'. If the 'Risk Assessment Logical Expressions' 22 assigns a 'low risk' rank to the 'Input Data calculation result' thereby generating a ranked 'Individual Risk', the 'Risk Assessment Logical Algorithms' 24 assigns a value '10' to that ranked 'Risk Value' or ranked 'Individual Risk' and a color 'green' to that ranked 'Risk Value' or that ranked 'Individual Risk'.

Therefore, in FIG. 11, a plurality of ranked Individual Risks (or ranked Risk Values) is generated, along line 34, by the Logical Expressions block 22, the plurality of ranked Individual Risks (which forms a part of the 'Risk Assessment Output Data' 18$b$1) being provided directly to the 'Risk Assessment Algorithms' block 24. The 'Risk Assessment Algorithms' block 24 will receive the plurality of ranked Individual Risks' from line 34 and, responsive thereto, the 'Risk Assessment Algorithms' 24 will: (1) generate the 'Ranked Individual Risks' including the 'values' and 'colors' associated therewith in the manner described above, and, in addition, (2) calculate and generate the 'Ranked Risk Categories' 40 and the 'Ranked Subcategory Risks' 40 associated with the 'Risk Assessment Output Data' 18$b$1. The 'Ranked Risk Categories' 40 and the 'Ranked Subcategory Risks' 40 and the 'Ranked Individual Risks' 40 can now be recorded or displayed on the Recorder or Display device 18$b$. Recall that the 'Ranked Risk Categories' 40 include: an Average Individual Risk, an Average Subcategory Risk, a Risk Total (or Total Risk), an Average Total Risk, a potential Risk for each design task, and an Actual Risk for each design task. Recall that the 'Ranked Subcategory Risks' 40 include: a Risk Subcategory (or Subcategory Risk).

As a result, recalling that the 'Risk Assessment Output Data' 18$b$1 includes 'one or more Risk Categories' and 'one or more Subcategory Risks' and 'one or more Individual Risks', the 'Risk Assessment Output Data' 18$b$1, which includes the Risk Categories 40 and the Subcategory Risks 40 and the Individual Risks 40, can now be recorded or displayed on the Recorder or Display Device 18$b$ of the Computer System 18 shown in FIG. 9A.

As noted earlier, the 'Risk Assessment Algorithms' 24 will receive the 'Ranked Individual Risks' from the Logical Expressions 22 along line 34 in FIG. 11; and, responsive thereto, the 'Risk Assessment Algorithms' 24 will (1) assign the 'values' and the 'colors' to the 'Ranked Individual Risks' in the manner described above, and, in addition, (2) calculate and generate the 'one or more Risk Categories' 40 and the 'one or more Subcategory Risks' 40 by using the following equations (set forth above).

The average Individual Risk is calculated from the 'Risk Values' as follows:

$$\text{Average individual risk} = \frac{\sum_{i}^{n} Riskvalue_i}{n}$$

The Subcategory Risk, or Risk Subcategory, is calculated from the 'Risk Values' and the 'Severity', as defined above, as follows:

$$\text{Risk Subcategory} = \frac{\sum_{j}^{n}(Riskvalue_j \times severity_j \times N_j)}{\sum_{j}(severity_j \times N_j)}$$

The Average Subcategory Risk is calculated from the Risk Subcategory in the following manner, as follows:

$$\text{Average subcategory risk} = \frac{\sum_{i}^{n}(\text{Risk } Subcategory_i \times \text{risk } multiplier_i)}{\sum_{1}^{n} \text{risk } multiplier_i}$$

The Risk Total is calculated from the Risk Subcategory in the following manner, as follows:

$$\text{Risk Total} = \frac{\sum_{1}^{4} \text{Risk } subcategory_k}{4}$$

The Average Total Risk is calculated from the Risk Subcategory in the following manner, as follows:

$$\text{Average total risk} = \frac{\sum_{i}^{n}(\text{Risk } subcategory_i \times \text{risk } multiplier_i)}{\sum_{1}^{n} \text{risk } multiplier_i}$$

The Potential Risk is calculated from the Severity, as defined above, as follow:

$$\text{Potential } Risk_k = \frac{\sum_{j=1}^{55}(90 \times Severity_{k,j} \times N_{k,j})}{\sum_{j=1}^{55}(Severity_{k,j} \times N_{k,j})}$$

The Actual Risk is calculated from the Average Individual Risk and the Severity (defined above) as follows:

$$\text{Actual } Risk_k = \frac{\sum_{j=1}^{55}(\text{Average Individual } Risk_j \times Severity_{,j} \times N_{k,j})}{\sum_{j=1}^{55}(Severity_j \times N_{k,j})}$$

Recall that the Logical Expressions block 22 will generate a 'plurality of Risk Values/Ranked Individual Risks' along line 34 in FIG. 11, where each of the 'plurality of Risk Values/Ranked Individual Risks' generated along line 34 represents a received 'Input Data Calculation result' from the Input Data 20a that has been 'ranked' as either a 'High Risk', or a 'Medium Risk', or a 'Low Risk' by the Logical Expressions 22. A 'High Risk' will be assigned a 'Red' color, and a 'Medium Risk' will be assigned a 'Yellow' color, and a 'Low Risk' will be assigned a 'Green' color. Therefore, noting the word 'rank' in the following, the Logical Expressions block 22 will generate (along line 34 in FIG. 11) a 'plurality of ranked Risk Values/ranked Individual Risks'.

In addition, in FIG. 11, recall that the 'Risk Assessment Algorithms' block 24 will receive (from line 34) the 'plurality of ranked Risk Values/ranked Individual Risks' from the Logical Expressions block 22. In response thereto, noting the word 'rank' in the following, the 'Risk Assessment Algorithms' block 24 will generate: (1) the 'one or more Individual Risks having 'values' and 'colors' assigned thereto, (2) the 'one or more ranked Risk Categories' 40, and (3) the 'one or more ranked Subcategory Risks' 40. Since the 'Risk Categories' and the 'Subcategory Risks' are each 'ranked', a 'High Risk' (associated with a Risk Category 40 or a Subcategory Risk 40) will be assigned a 'Red' color, and a 'Medium Risk' will be assigned a 'Yellow' color, and a 'Low Risk' will be assigned a 'Green' color. In view of the above 'rankings' and the colors associated therewith, the 'Risk Assessment Output Data' 18b1, including the 'ranked' Risk Categories 40 and the 'ranked' Subcategory Risks 40 and the 'ranked' Individual Risks 38, will be recorded or displayed on the Recorder or Display Device 18b of the Computer System 18 shown in FIG. 9A in the manner illustrated in FIG. 9B.

Automatic Well Planning Software System—Risk Assessment Sub-Task 16a—Visualization In accordance with one aspect of the present invention, the above described risk categories and subcategory risks and individual risks are visualized in two-dimensions (2D) [or three-dimensions (3D)] along a depth in a wellbore by displaying a total 'ranked risk category', a 'ranked subcategory risk', and a 'ranked individual risk'. The 2D view of the risks is displayed in two ways: the first way is by risk parameter, risk category, and risk summary vs. depth; and the second way is total risk vs. workflow task identifying the relative risk contribution of each technical design task in the workflow.

As a result of the nature by which the risks are calculated, an array of risk values are produced that can be visualized as a log. Logs are such a standard way of visualizing data in the oil and gas industry that it is a natural visualization technique for risk as well. These logs can be plotted in 2D or 3D. 2D logs have any number of methods of display allowing for infinite flexibility, however 3D offers something unique. Displaying the risk data in 3D in the "lathe" view with or without color scaling is also very useful for creating visual risk volumes along the trajectory.

These risk visualization techniques of the present invention will be used to visualize risks in the 3D earth model and identify coincidence of risk levels and geological features. This enables users to draw correlations from the positional coincidence of risk and geophysical attributes, geological features, reservoir simulation results (like streamlines), mechanical stresses, and positional uncertainty of trajectory. Based on any discovery of correlation or other relationship, users can assess the benefits and drawbacks of modifying the position or design of the well to reduce the cost and/or risks associated with the well.

Figure 12:
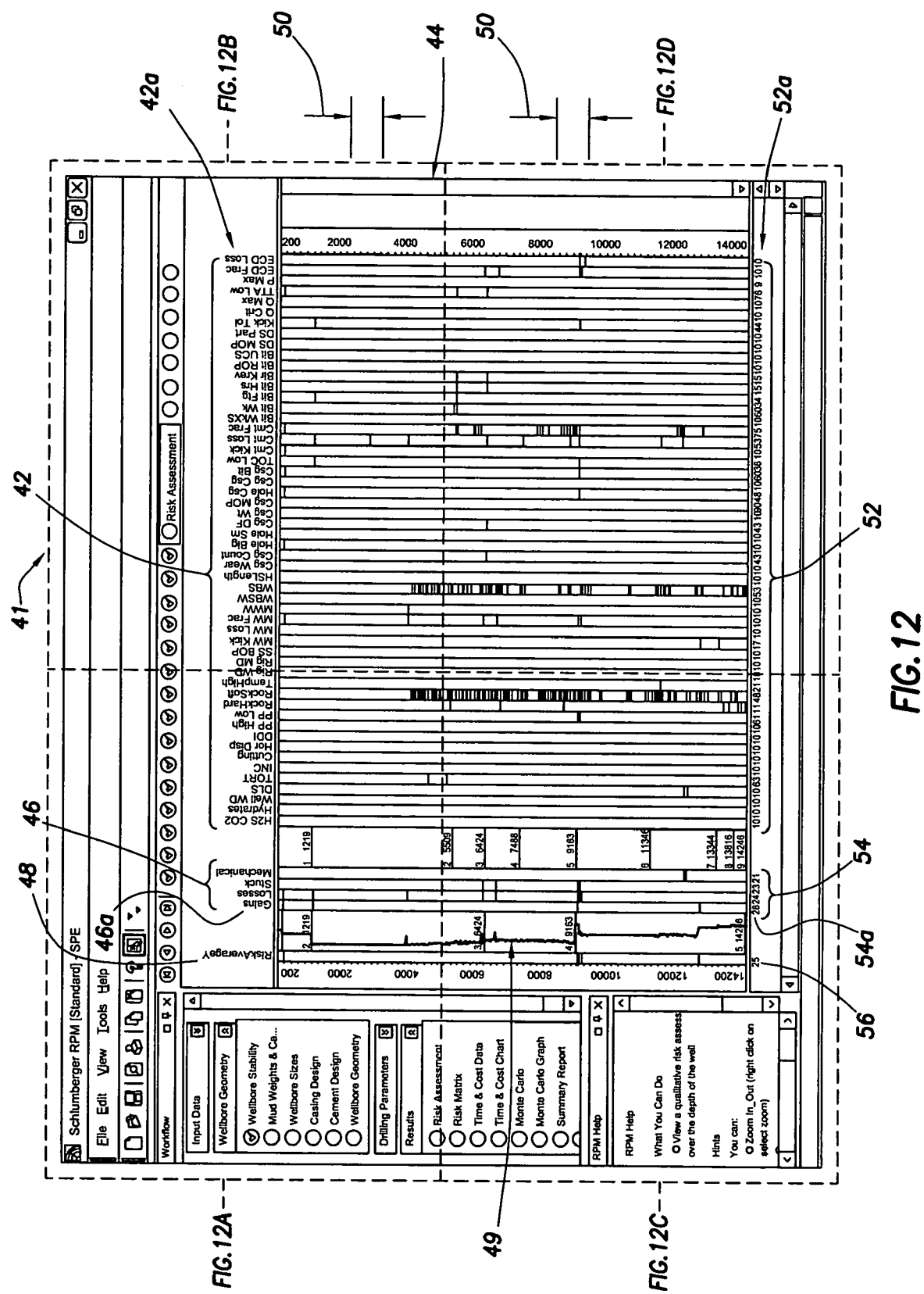
FIG. 12 including
Figure 12A:
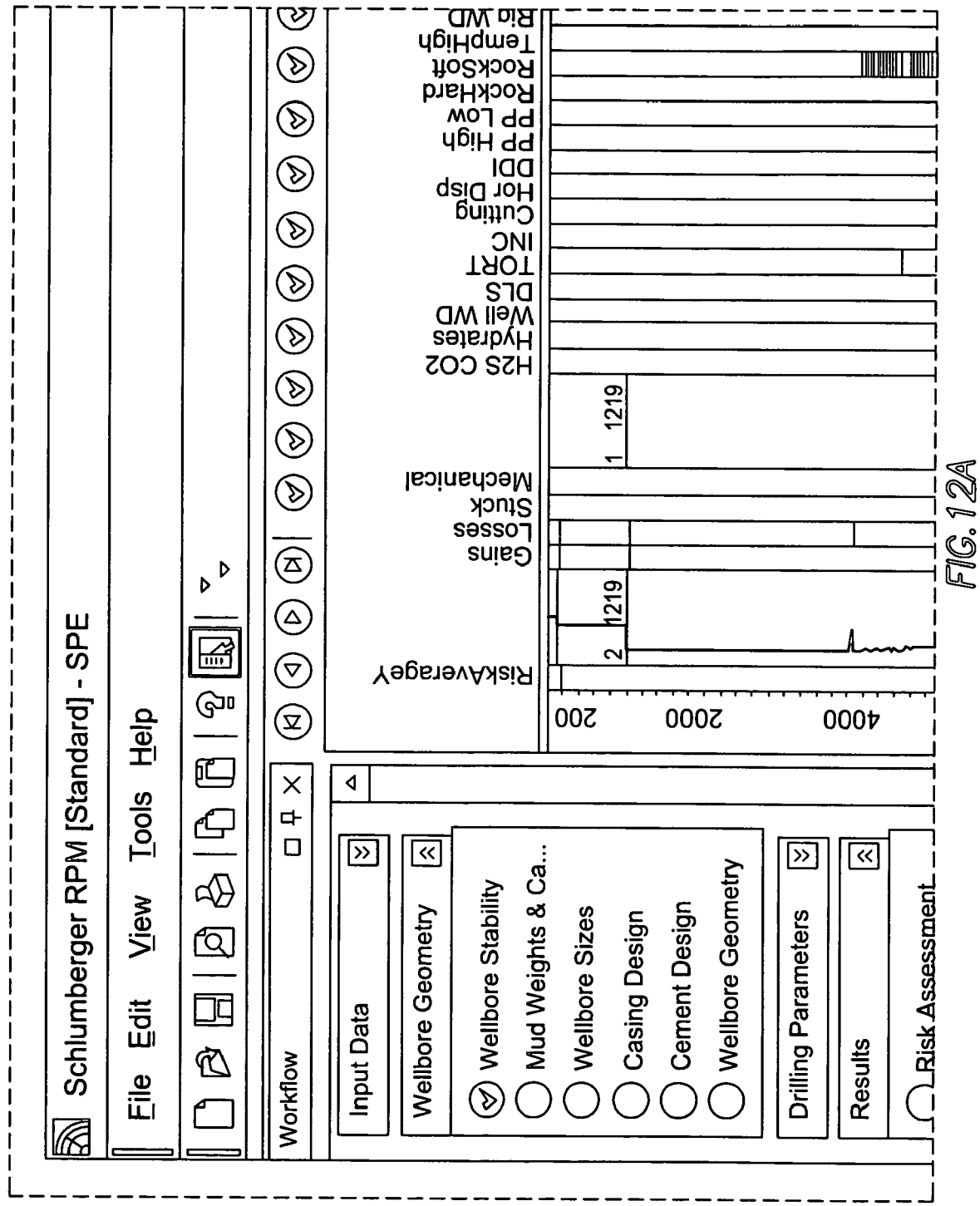
FIGS. 12A, 12B, 12C, and 12D illustrates one example of the risk assessment output data 18b1 being recorded or displayed on the recorder or display device 18b in FIG. 9B in accordance with one aspect of the present invention, FIG. 12 illustrating a screen shot of a two-dimensional risk representation as a function of depth in a wellbore.
Figure 12B:
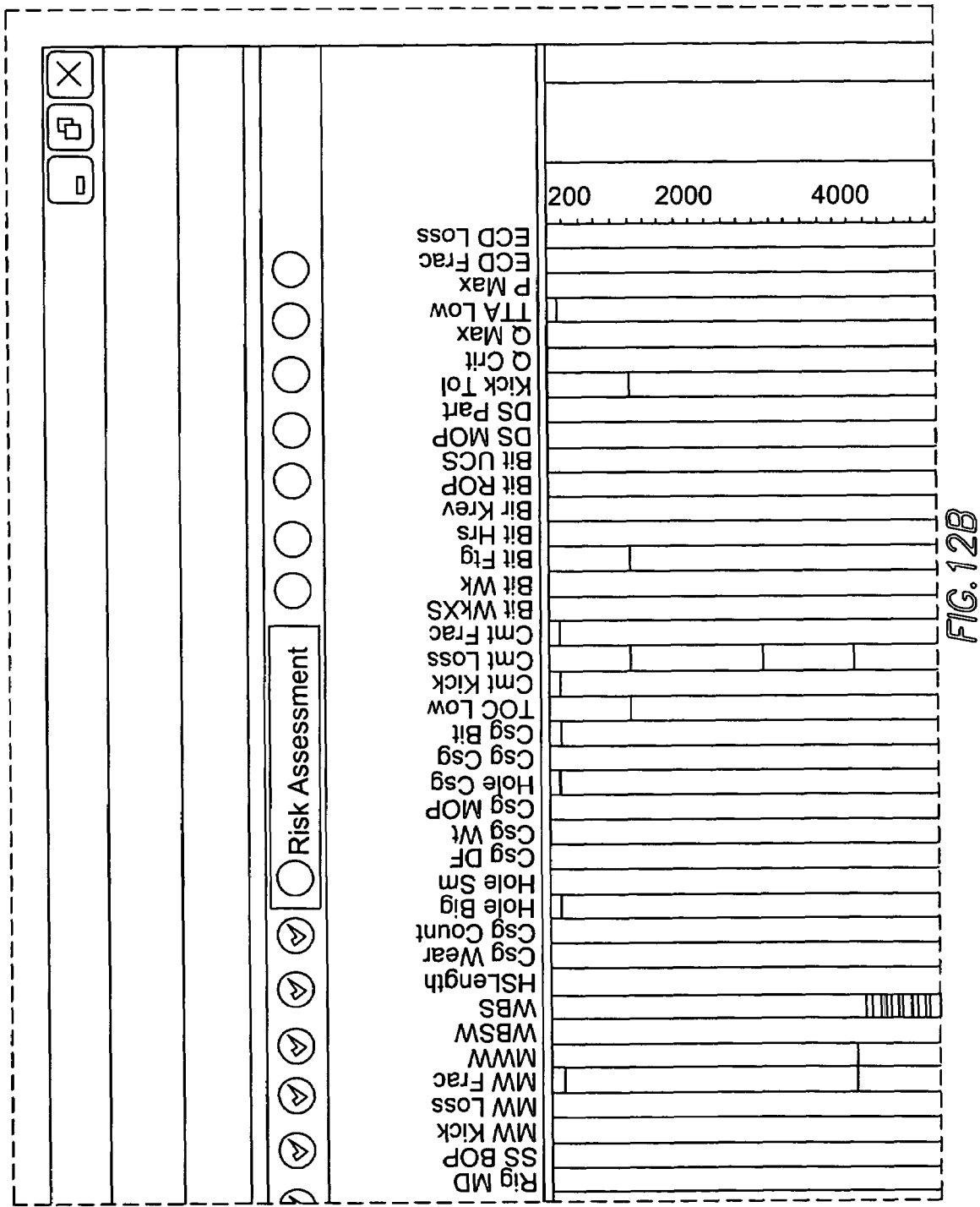
Figure 12C:
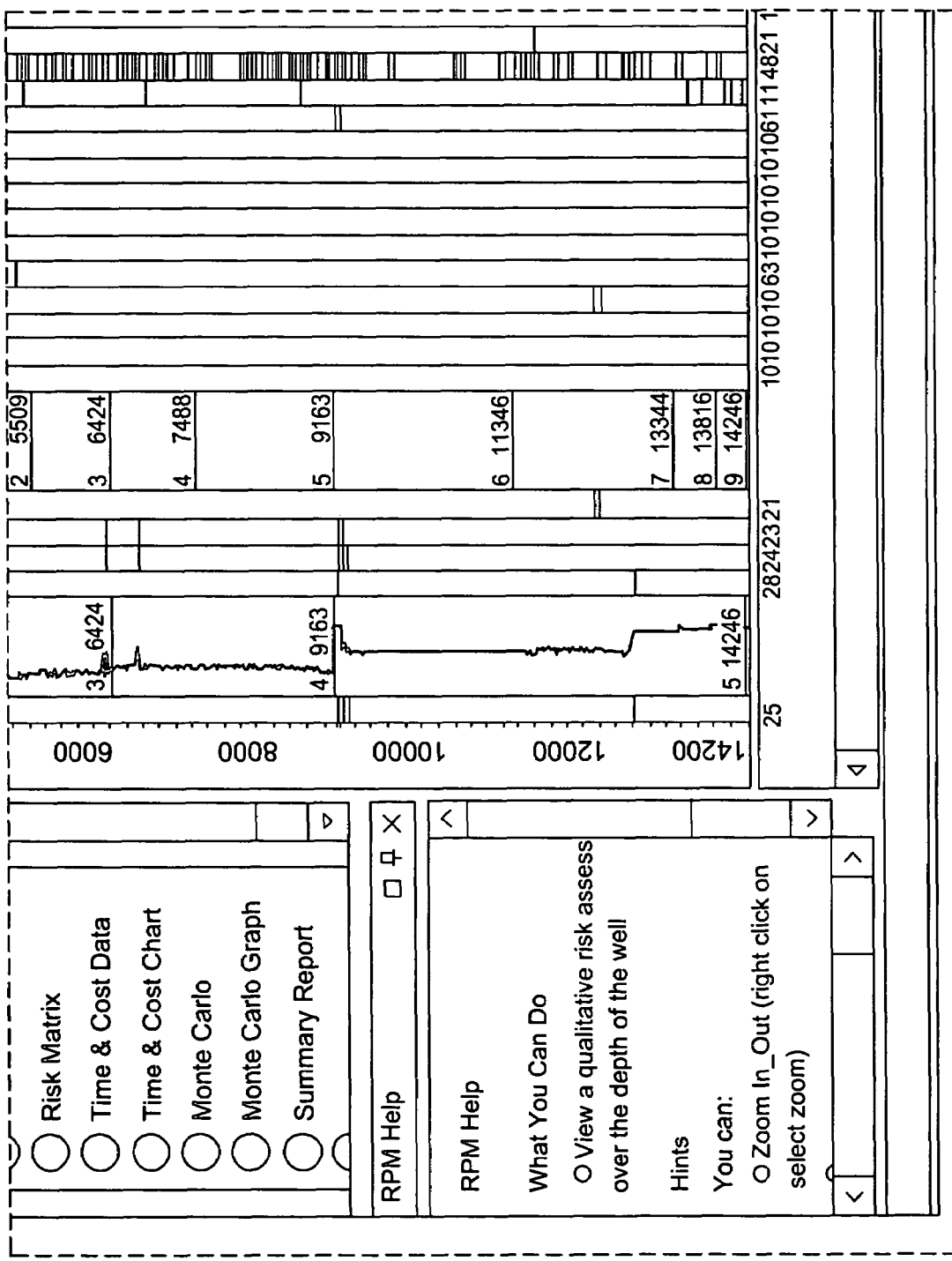
Figure 12D:
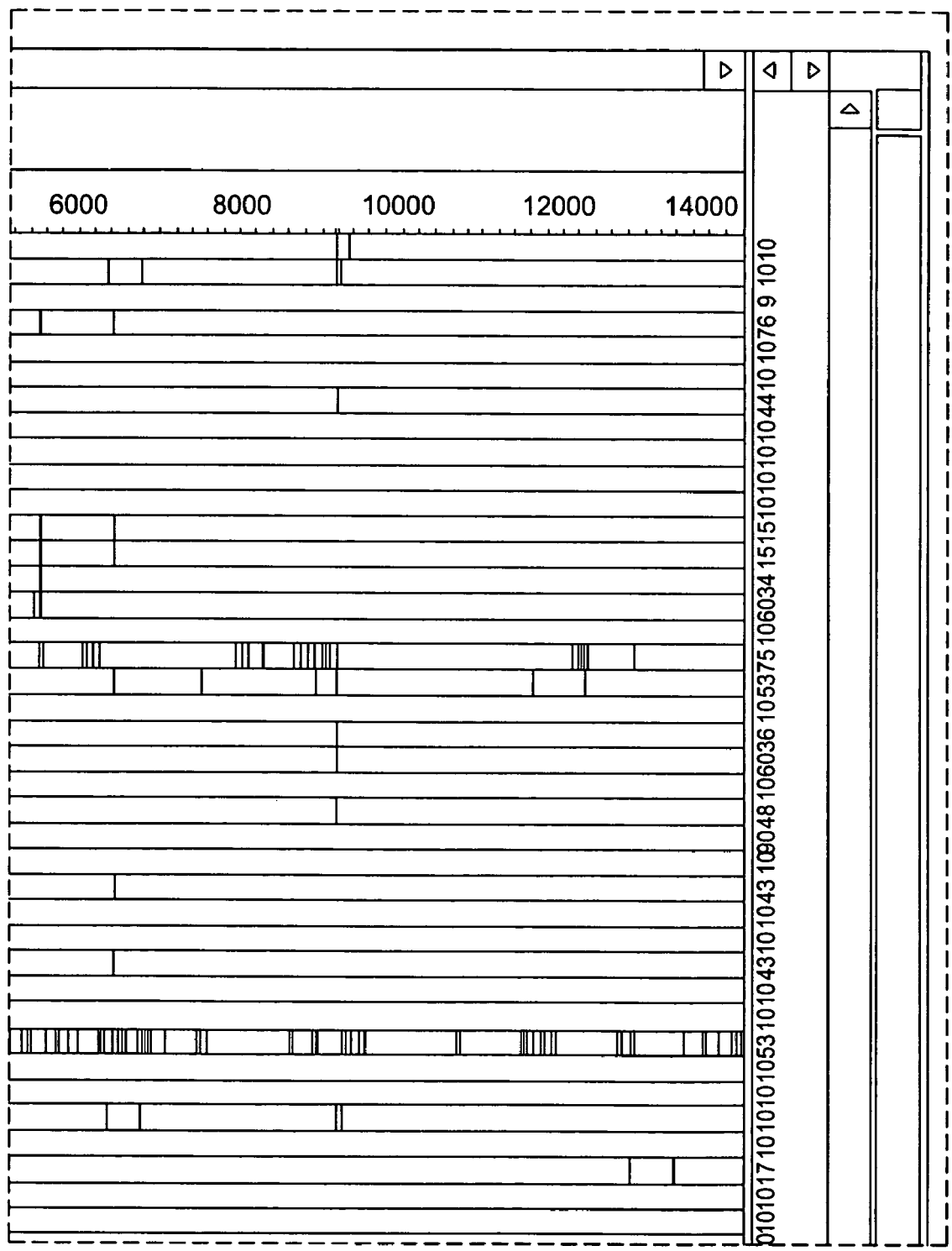
Figure 13A:
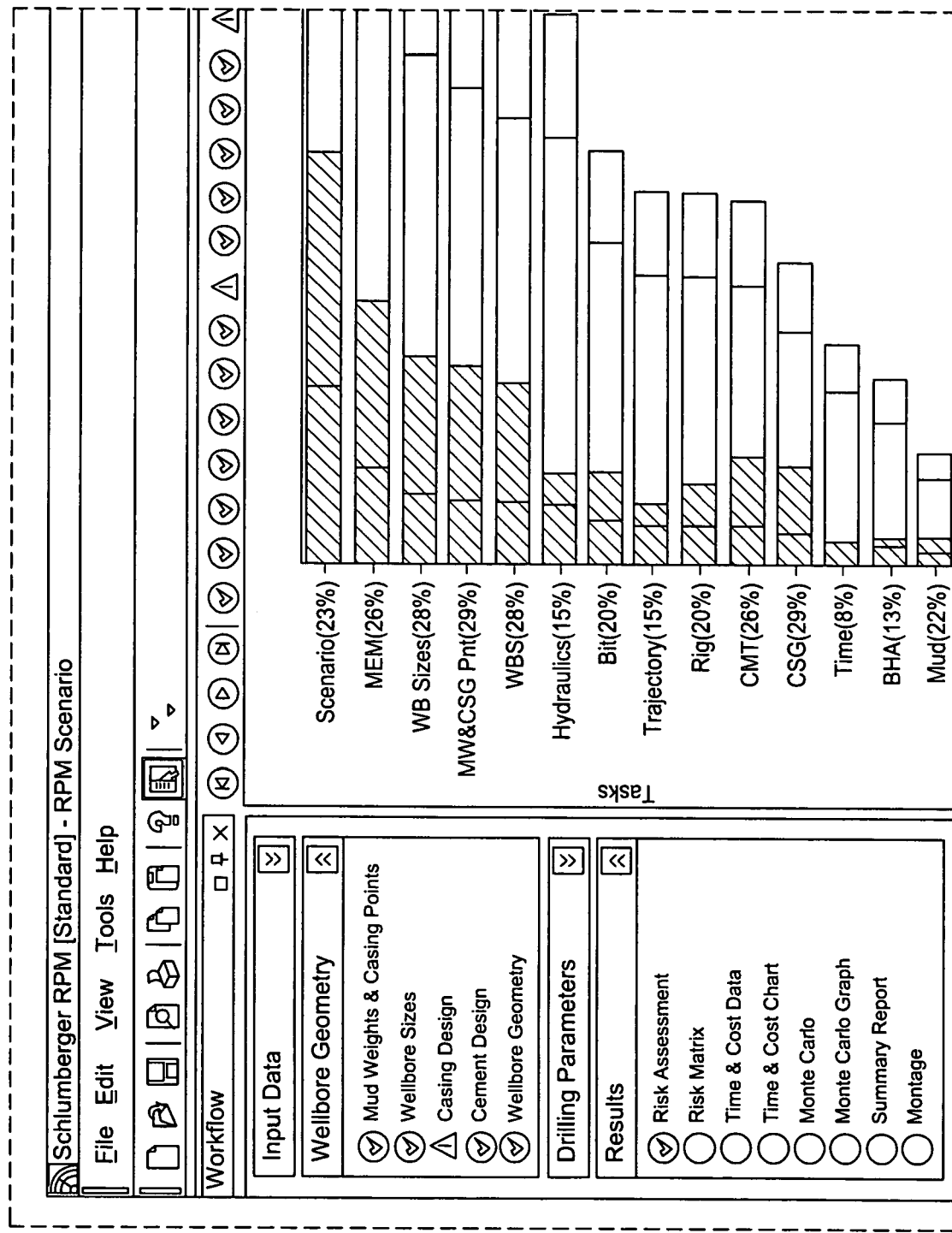
FIGS. 13A, 13B, 13C, and 13D illustrates another example of the risk assessment output data 18b1 being recorded or displayed on the recorder or display device 18b in FIG. 9B in accordance with another aspect of the present invention, FIG. 13 illustrating a screen shot of a two dimensional risk representation as a function of a particular design task.
Figure 13B:
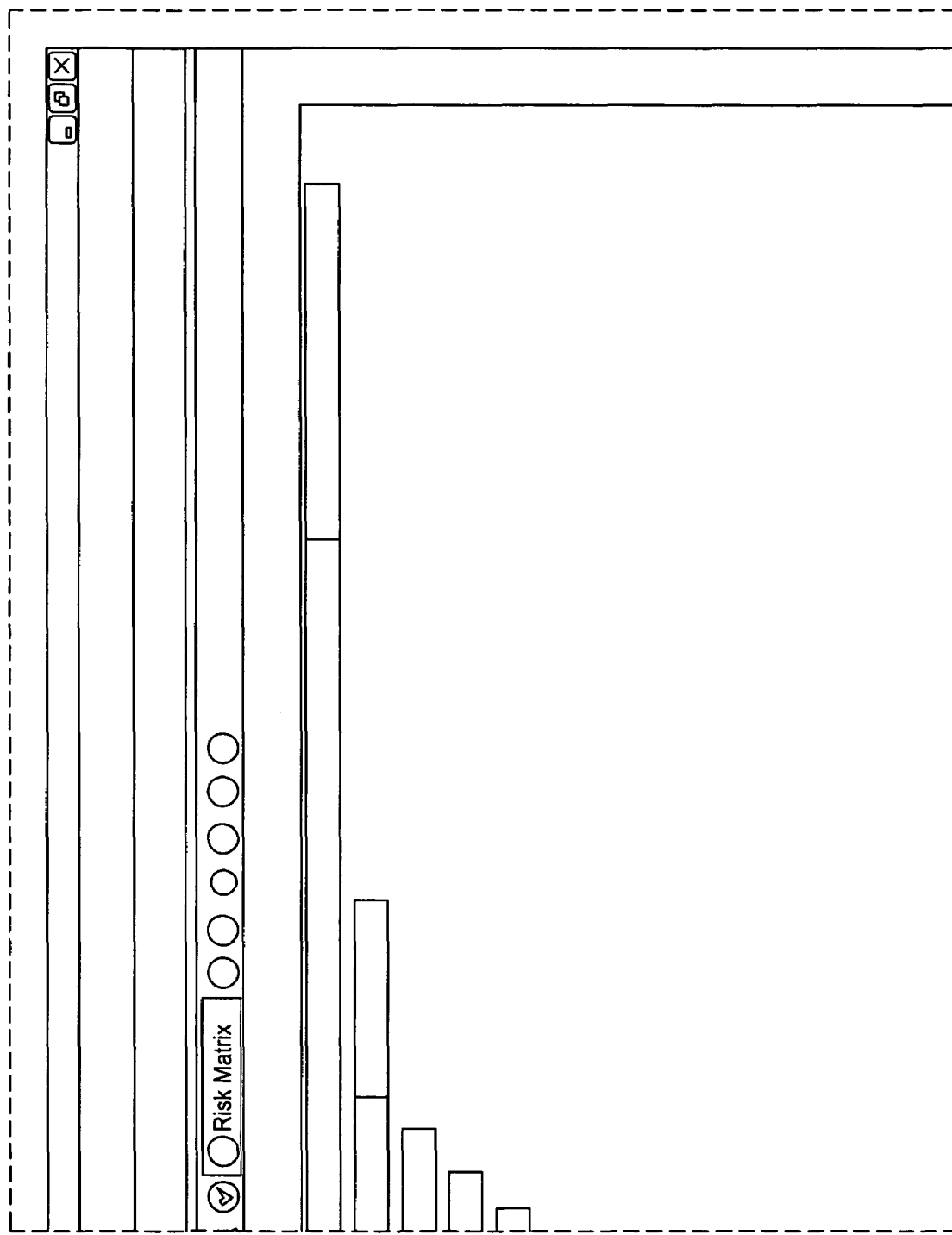
Figure 13C:
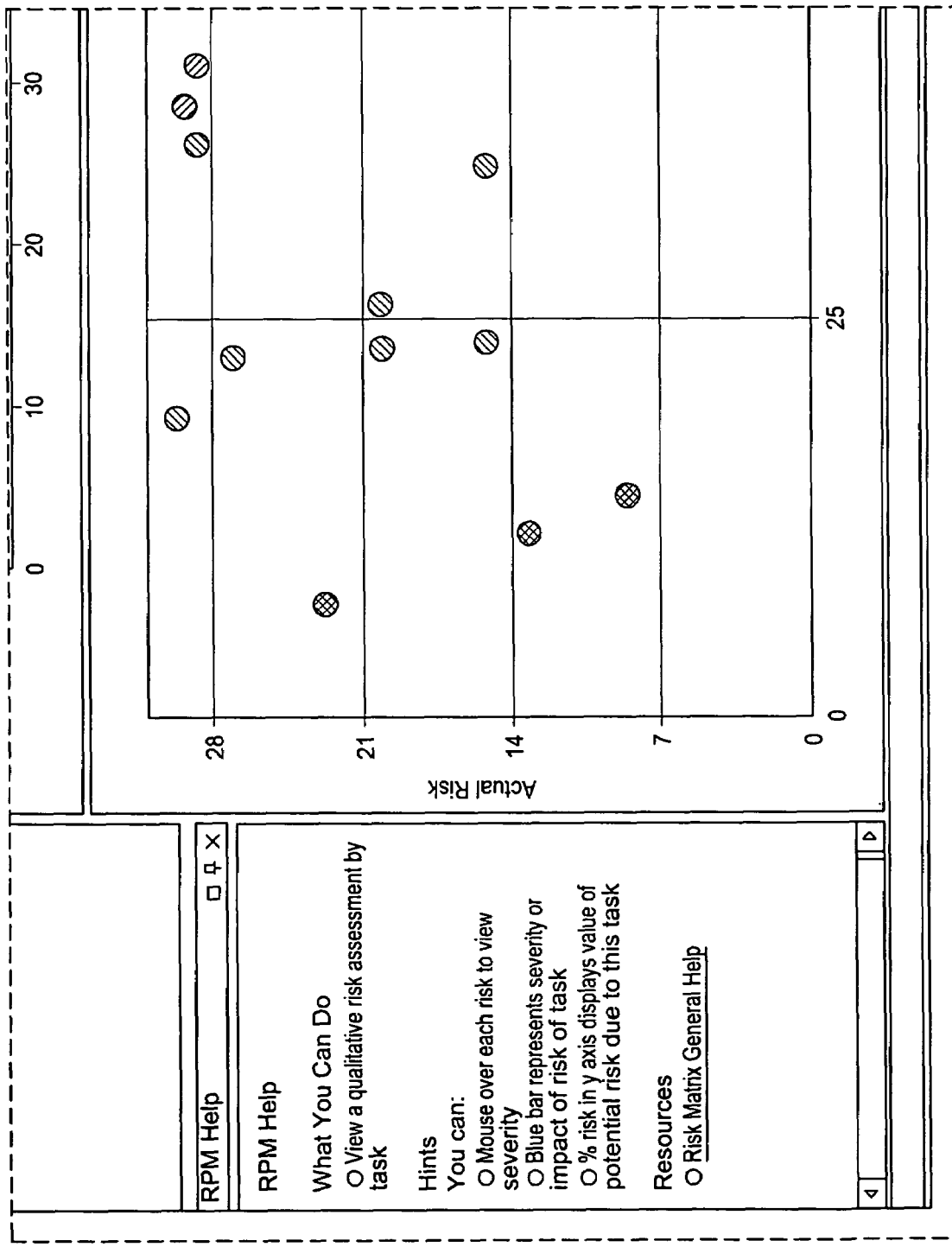
Figure 13D:
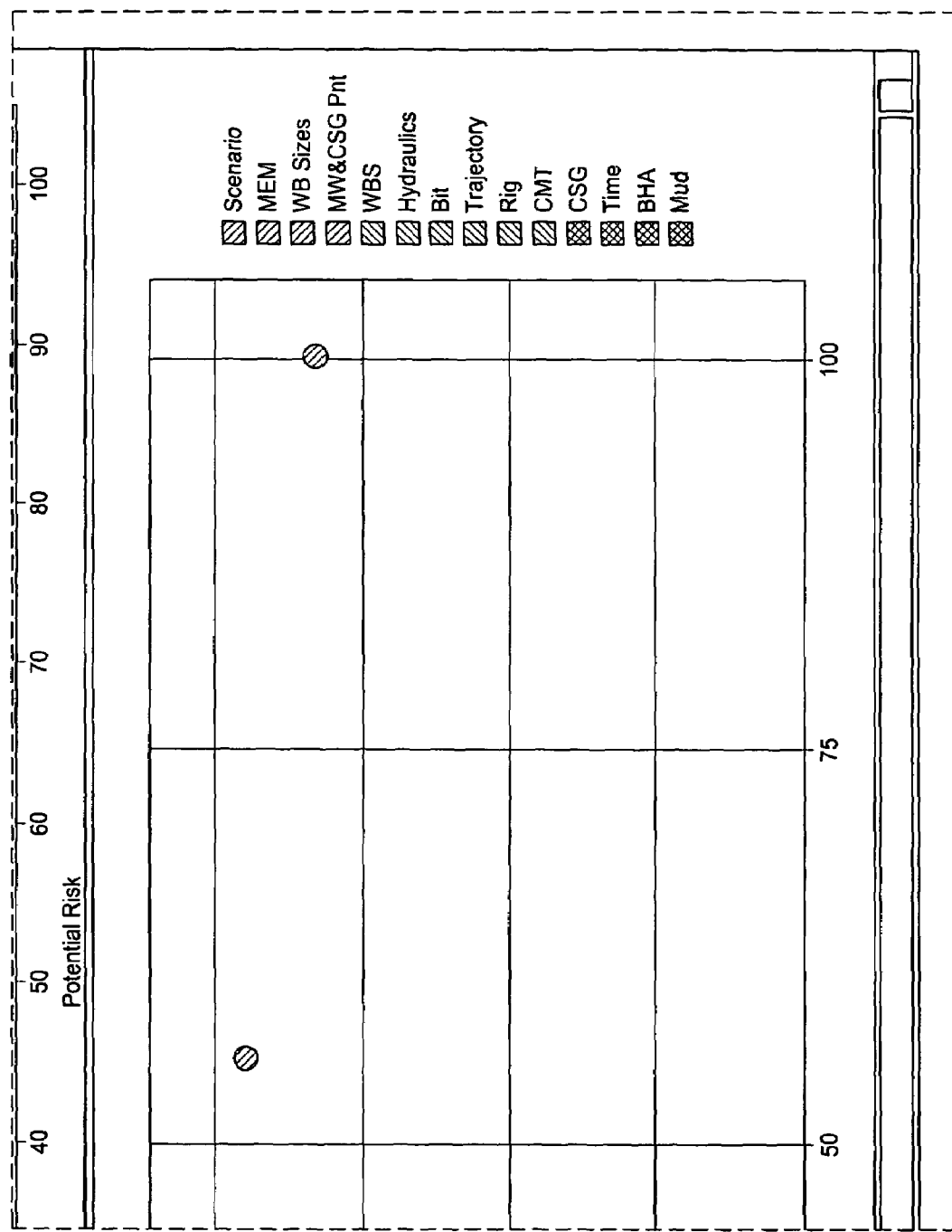

Referring to FIG. 12, one example of the risk assessment output data 18b1, that is recorded or displayed on the recorder or display device 18b of FIG. 9B, is illustrated, FIG. 12 illustrating a screen shot of a two-dimensional risk representation as a function of depth in a wellbore. FIG. 12 represents a screenshot of the current two-dimensional risk representation as a function of depth. From left to right the following risk tracks are displayed: Total risk in color track 48, Total risk in log track 49, Subcategory Risks 46 including a Gains risk in color track, a Losses risk in color track, a Stuck Pipe risk in color track, and a Mechanical risk in color track, and Individual risks 42 in color track (there are 54 Individual Risks). The risks are graphically presented using the colors red, yellow and green that correspond with a high risk, a medium risk, and a low risk, respectively. The individual risks 42 are quantified with a numerical value at the bottom of each color track. The subcategories (gains, losses, stuck and mechanical) are presented using the same color scheme including the numeric In FIG. 12, when the risk assessment output data 18b1 is displayed on the Recorder or Display device 18b of FIG. 9A, a 'first type of display' 41 illustrated in FIG. 12 includes: the fifty-four (54) 'Individual Risks' 42 plotted as a function of depth 44 in a wellbore, the four (4) Subcategory Risks (or 'Risk Subcategory') 46 plotted as a function of depth 44 in the wellbore, the Total Risk (or 'Risk Total') 48 plotted as a function of depth 44 in the wellbore, and a log 49 which is a 'log representation' of the Total Risk 48, the 'log representation' being 'Total Risk 48 amplitude as a function of depth' in the wellbore. Recall that the 54 'ranked Individual Risks' 42 in FIG. 12 are generated by the Logical Expressions 22 in FIG. 11 and are received (from line 34) by the Risk Assessment Algorithms 24 in FIG. 11, and that the 54 'ranked Individual Risks' 42 (at each sample interval along the depth dimension 44 in the wellbore) are each given a 'value' and a 'color' by the Algorithms 24 depending upon the 'rank' of the risk (i.e., high, medium or low). Recall that the Subcategory Risks 46 (at each sample interval along the depth dimension 44 in the wellbore) are each calculated by the following equation:

$$\text{Risk Subcategory} = \frac{\sum_{j}^{n}(Riskvalue_j \times severity_j \times N_j)}{\sum_{j}(severity_j \times N_j)},$$

where the 'Risk value' is the value of the Individual Risk and the severity is provided above. Recall that the Total Risk 48 (at each sample interval along the depth dimension 44 in the wellbore) is calculated by the following equation:

$$\text{Risk Total} = \frac{\sum_{1}^{4} \text{Risk } subcategory_k}{4}.$$

In FIG. 12, the 'depth in the wellbore' dimension 44 (or 'depth dimension' 44) in FIG. 12 includes a plurality of sample intervals 50 which extend along the depth dimension 44 of the 'first type of display' of FIG. 12. At each sample interval 50 of the plurality of sample intervals 50 which extend along the depth dimension 44 of the 'first type of display' in FIG. 12, each of the fifty-four (54) 'Individual Risks' 42 at that sample interval have already been 'ranked' (by the Logical Expressions 22) as having either a 'high risk' or a 'medium risk' or a 'low risk', and, in addition, each of the four (4) Subcategory Risks 46 have also been 'ranked' (by the Algorithms 24) as having either a 'high risk' or a 'medium risk' or a 'low risk', and, in addition, the Total Risk 48 has also been 'ranked' (by the Algorithms 24) as having either a 'high risk' or a 'medium risk' or a 'low risk'. If a 'high risk' is the rank of either the Individual Risks 42 or the Subcategory Risks 46 or the Total Risk 48 at a particular sample interval 50, a red color is assigned to the risk at that sample interval; and if a 'medium risk' is the rank of either the Individual Risks 42 or the Subcategory Risks 46 or the Total Risk 48 at a particular sample interval 50, a yellow color is assigned to the risk at that sample interval; and if a 'low risk' is the rank of either the Individual Risks 42 or the Subcategory Risks 46 or the Total Risk 48 at a particular sample interval 50, a green color is assigned to the risk at that sample interval. Therefore, at each sample interval 50, a plurality of colors may be seen on the 'first type of display' in FIG. 12 associated with the Total Risk 48 and the four Subcategory Risks 46 and the fifty-four Individual Risks 42. At each sample interval 50, if the risk is ranked as a 'high risk', a red color is assigned to that risk and a value of 90 is assigned to that risk; and if the risk is ranked as a 'medium risk', a yellow color is assigned to that risk and a value of 70 is assigned to that risk; and if the risk is ranked as a 'low risk', a green color is assigned to that risk and a value of 10 is assigned to that risk.

In FIG. 12, the Subcategory Risks 46 include: gains, losses, stuck, and mechanical. A 'gain' subcategory risk 46 means that a positive flow of wellbore fluid exists at that sample interval 50 in the wellbore (i.e., the wellbore fluid is flowing uphole to a surface of the wellbore). A 'loss' subcategory risk 46 means that a negative flow of wellbore fluid exists at that sample interval 50 in the wellbore (i.e., the wellbore fluid is flowing from the wellbore and into the Earth formation—not uphole to the surface). A 'stuck' subcategory risk 46 means that, at that sample interval 50, the tubing equipment or drill pipe is 'stuck' in the wellbore. A 'mechanical' subcategory risk 46 means that, at that sample interval 50, a mechanical problem exists with respect to the tubing equipment or drill pipe in the wellbore. At a particular sample interval 50 along the depth dimension 44 of the 'first type of display' shown in FIG. 12, at least some of the 54 Individual Risks 42 may include: (1) a 'gain' type of subcategory risk 46 (wellbore fluid is flowing uphole at that point), (2) a 'loss' type of subcategory risk 46 (wellbore fluid is flowing into the formation at that point), (3) a 'stuck' type of subcategory risk 46 (a piece of equipment downhole is 'stuck' in the wellbore at that point), and (4) a 'mechanical' type of subcategory risk 46 (a piece of equipment downhole has a mechanical problem at that point). The Individual Risks 42 which are 'gains' at 'that sample interval' 50 are grouped together and are reflected under the 'gains' subcategory risk 46 column in FIG. 12; and the Individual Risks 42 which are 'losses' at that sample interval 50 are grouped together and are reflected under the 'losses' subcategory risk 46 column in FIG. 12; and the Individual Risks 42 which represent 'stuck equipment' at that sample interval 50 are grouped together and are reflected under the 'stuck' subcategory risk 46 column in FIG. 12, and the Individual Risks 42 which represent 'mechanical problems' at that sample interval 50 are grouped together and reflected under the 'mechanical' subcategory risk 46 column in FIG. 12. A 'Risk Total' 48 at 'that sample interval' 50 is calculated from: (1) the 'gains' subcategory risks 46 at 'that sample interval' 50, (2) and the 'losses' subcategory risks 46 at 'that sample interval' 50, (3) and the 'stuck' subcategory risks 46 at 'that sample interval' 50, (4) and the 'mechanical' subcategory risks 46 at 'that sample interval' 50, the 'Risk total' 48 being displayed at 'that sample interval' 50 under column 48 in FIG. 12. In FIG. 12, a plurality of 'Individual Risks' 42 are associated, respectively, with a plurality of columns in the 'first type of display' shown in FIG. 12; and, in addition, a plurality of 'Average Individual Risks' 52 are associated, respectively, with the plurality of columns in the 'first type of display' and the plurality of 'Individual Risks' 42 in FIG. 12. For example, an 'Individual Risk' 42a in FIG. 12 is displayed above a particular column of the 'first type of display' in FIG. 12, and an 'Average Individual Risk' 52a is displayed below that particular column associated with that 'Individual Risk' 42a. Recall that the 'Average Individual Risk' 52a is calculated by using the following equation:

$$\text{Average individual risk} = \frac{\sum_{i}^{n} Riskvalue_i}{n}.$$

In FIG. 12, a plurality of 'Subcategory Risks' 46 (i.e., gains, losses, stuck, and mechanical) are associated, respectively, with a plurality of columns in the 'first type of display' shown in FIG. 12; and, in addition, a plurality of 'Average Subcategory Risks' 54 are associated, respectively, with the plurality of columns in the 'first type of display' and the plurality of 'Subcategory Risks' 46 in FIG. 12. For example, a 'gains Subcategory Risk' 46a in FIG. 12 is displayed above a particular column of the 'first type of display' in FIG. 12, and an 'Average Subcategory Risk' 54a is displayed below that particular column associated with that 'gains Subcategory Risk' 46a. Recall that the 'Average Subcategory Risk' 54a is calculated by using the following equation:

$$\text{Average subcategory risk} = \frac{\sum_{i}^{n} (\text{Risk } Subcategory_i \times \text{risk } multiplier_i)}{\sum_{i}^{n} \text{risk } multiplier_i}$$

In FIG. 12, a 'Total Risk' 48 is associated with a first column in the 'first type of display' shown in FIG. 12; and, in addition, an 'Average Total Risk' 56 is associated with that first column in the 'first type of display' and the 'Total Risk' 48 in FIG. 12. For example, a 'Total Risk' 48 in FIG. 12 is displayed above the first column of the 'first type of display' in FIG. 12, and an 'Average Total Risk' 56 is displayed below that first column associated with that 'Total Risk' 48. Recall that the 'Average Total Risk' 56 is calculated by using the following equation:

$$\text{Average total risk} = \frac{\sum_{i}^{n} (\text{Risk } Subcategory_i \times \text{risk } multiplier_i)}{\sum_{i}^{n} \text{risk } multiplier_i}$$

In FIG. 12, referring to Individual Risk 42a and Average Individual Risk 52a, the column in FIG. 12 associated with the Individual Risk 42a and the Average Individual Risk 52a includes a 'plurality of colors' that are associated, respectively, with the plurality of sample intervals 50 which extend along the depth dimension 44 of the 'first type of display' in FIG. 12. The aforementioned 'plurality of colors' includes a corresponding 'plurality of values', there being a 'value' associated with each 'color'. The 'colors' will be either red, or yellow, or green, and the 'value' includes: a value of 90 representing a 'high risk' which is associated with a red color, a value of 70 representing a 'medium risk' which is associated with a yellow color, and a value of 10 representing a low risk which is associated with a green color.

Referring to FIG. 13, another example of the risk assessment output data 18b1, that is recorded or displayed on the recorder or display device 18b of FIG. 9B, is illustrated, FIG. 13 illustrating a screen shot of a two dimensional risk representation as a function of a particular design task. FIG. 13 represents a screenshot of the current two-dimensional risk representation as a function of the particular design task. From top to bottom the following risks or 'design tasks' are displayed: Scenario, Trajectory, Mechanical Earth Model, Rig, Wellbore stability, Mud weight and casing points, Wellbore Sizes, Casing, Cement, Mud, Bit, Drillstring, Hydraulics, and Time design. FIG. 13 illustrates a display of the 'Risk for each Design Task'. FIG. 13 includes two parts: (1) a 'first part', and (2) a 'second part'. The 'first part' of FIG. 13 presents a bar graph of the potential risk (in a white color) and the actual risk as calculated by the Automatic Well Planning Risk Assessment Software 18c1 (in a dark color). The Automatic Well Planning Risk Assessment Software 18c1 also calculates the ratio of the actual versus the potential risk as a percentage. The 'second part' of FIG. 13 presents the actual and potential risk in a cross plot. This display is similar to the Boston Consultancy Group plot. The potential risk is presented on the horizontal axis while the actual risk is presented on the vertical axis. Graphically, one can distinguish different quadrants. The quadrants in the left top presents a high actual risk with a low potential risk. This plotting allows a quick graphic interpretation of the risks. In addition, the design tasks with the highest actual risks are color coded with "warm" colors, while the low actual risk design tasks have "colder" colors.

In FIG. 13, when the risk assessment output data 18b1 is displayed on the Recorder or Display device 18b of FIG. 9A, a 'second type of display' 58 illustrated in FIG. 13 includes: a first part 58a and a second part 58b.

In FIG. 13, the first part 58a of the 'second type of display' 58 of FIG. 13 is a bar-graph of Potential Risk relative to Actual Risk wherein a plurality of design tasks 60 appear on a vertical axis and a Potential Risk 62 appears on a horizontal axis. The design tasks 60 have been discussed above, in this specification, and include the following 14 design tasks: Scenario, Mechanical Earth Model (MEM), Wellbore Sizes (WB Sizes), Mud weight and casing points (MW & CSG Pnt), Wellbore Stability (WBS), Hydraulics, Bit, Trajectory, Rig, Cement (CMT), Casing (CSG), Time, Bottom Hole Assembly (BHA), and Mud. The Potential Risk 62 represents a scale of Potential Risk extending from zero (0) to one-hundred (100). A 'design task', such as 'Scenario', is a grouping of Individual Risks 42. For example, the 'Scenario' design task 60a represents a 'first grouping of Individual Risks' 42 and the 'Mechanical Earth Model (MEM)' design task 60b represents a 'second grouping of Individual Risks 42. Taking the 'Scenario' design task 60a as an example, the white portion 60a1 represents the 'Potential Risk' and the darkened portion 60a2 represents the 'Actual Risk'. Taking the 'Mechanical Earth Model (MEM)' design task 60b as another example, the white portion 60b1 represents the 'Potential Risk' and the darkened portion 60b2 represents the 'Actual Risk'. Therefore, in connection with each of the fourteen (14) above referenced design tasks 60 in FIG. 13, the white portion of each bar-graph in the first section 58a represents the 'Potential Risk' and the darkened portion of each bar-graph represents the 'Actual Risk'.

The Potential Risk 60a1 and the Actual Risk 60a2 can be defined as follows: the 'Potential Risk' represents the risk taken in connection with the 'most difficult well having the most difficult trajectory', and the 'Actual Risk' is the risk taken in connection with another 'wellbore being drilled'. The Potential Risk can be measured by the following 'potential risk values': maximum depth of the well, dogleg severity, Tortuosity (Tort), inclination, horizontal displacement, and Directional Drilling Index (DDI). If, for a 'particular well', all of the above mentioned 'potential risk values' have reached their maximum values, a maximum 'potential risk' has been achieved in connection with that 'particular well', and, as a result, that 'particular well' represents the 'most difficult well having the most difficult trajectory'. On the other hand, 'any other wellbore being drilled' would be measured with reference to that 'particular well' because that 'particular well' represents the maximum 'Potential Risk'. Having defined the 'Potential Risk', the risk being taken in connection with 'any other wellbore being drilled' would be an 'Actual Risk'. The 'Actual Risk' taken in connection with 'any other wellbore being drilled' is usually less than the 'Potential Risk' in connection with the 'particular well' because the above referenced 'potential risk values' are always less for 'any other wellbore being drilled' relative to the 'potential risk values' for the 'particular well' which represents the maximum 'Potential Risk'.

In FIG. 13, the second part 58b of the 'second type of display' 58 of FIG. 13 is a 'Boston Consultancy' plot 58b. In FIG. 13, the 'Boston Consultancy' plot 58b includes a vertical axis and a horizontal axis. The Actual Risk appears on the vertical axis and the Potential Risk appears on the horizontal axis. The fourteen (14) design tasks 60 identified above (i.e., Scenario, Mechanical Earth Model (MEM), Wellbore Sizes (WB Sizes), Mud weight and casing points (MW & CSG Pnt), Wellbore Stability (WBS), Hydraulics, Bit, Trajectory, Rig, Cement (CMT), Casing (CSG), Time, Bottom Hole Assembly (BHA), and Mud) appear on the right side of the 'Boston Consultancy' plot 58b of FIG. 13, each design task 60 having a 'dot' 62 which uniquely identifies that particular design task 60. The Boston Consultancy plot 58b of FIG. 13 is divided into a plurality of blocks 64 which represent a particular Potential Risk and a particular Actual Risk. A plurality of 'dots' 66 appear in the blocks 64 of the 'Boston Consultancy' plot 58b, each of the 'dots' 66 in the blocks 64 of the plot 58b being one of the 'dots' 62 which represent a particular design task 60. In operation, referring to the 'Boston Consultancy' plot 58b in FIG. 13, a first 'dot' 68 in one of the blocks 64 of the plot 58b has a relatively low Potential Risk and a relatively low Actual Risk. Therefore, a first design task associated with 'dot' 68 on plot 58b has a relatively low Potential Risk and a relatively low Actual Risk. However, a second 'dot' 70 in another one of the blocks 64 of the plot 58b has a relatively high Potential Risk and a relatively high Actual Risk. Therefore, a second design task associated with 'dot' 70 on plot 58b has a relatively high Potential Risk and a relatively high Actual Risk.

Referring to FIG. 14, another example of the risk assessment output data 18b1, that is recorded or displayed on the recorder or display device 18b of FIG. 9B, is illustrated, FIG. 14 illustrating an example of a data output of a risk assessment quantification per risk category as a function of depth in the wellbore. FIG. 14 represents an example of the ascii data output of the risk quantification per risk category as a function of depth. These arrays of risk values can be displayed as logs in standard oilfield visualization applications.

In FIG. 14, when the risk assessment output data 18b1 is displayed on the Recorder or Display device 18b of FIG. 9A, a 'third type of display' 72 illustrated in FIG. 14 includes the same columns which appear in FIG. 12, namely, the Individual Risks 42, the Subcategory Risks 46, and the Total Risk 48, each of which is measured at each sample interval 50 as a function depth 44 (where 'MD' is 'measured depth') in a wellbore. In order to simplify the discussion of the 'third type of display' 72 in FIG. 14, the Individual Risks 42 in FIG. 14 include only a portion (i.e., 9) of all of the 54 Individual Risks 42 which appear in FIG. 12; however, the 'third type of display' 72 will include all of the fifty-four (54) Individual Risks 42 which also appear as Individual Risks 42 in FIG. 12. In FIG. 14, at a particular sample interval 50 (which could be, for example, one foot to 3 meters in length) at a particular measured depth (MD) of 391.21, for example, the total risk has a 'value' of 36.81; the 'gains' subcategory risk' 46 has a 'value' of 35.48; , , , ; the H2S CO2 Individual Risk 42 has a 'value' of 10; . . . ; and the Directional Drilling Index (DDI) Individual Risk 42 has a 'value' of 10.

Recall that these 'values' were taken from the following:
a High risk=90,
a Medium risk=70, and
a Low risk=10
High risk color code=Red
Medium risk color code=Yellow
Low risk color code=Green In FIG. 11, recall that the 'Input Data calculation results' on line 32 were each matched with one of the Logical Expressions 22 and, as a result, that 'Input Data calculation result' was 'ranked' as either a 'high risk' or a 'medium risk' or a 'low risk', thereby generating 'Ranked Individual Risks' which are generated on line 34 in FIG. 11. If a 'Ranked Individual Risk' has a 'high risk' ranking, a value of '90' is assigned to that 'Ranked Individual Risk' and a color of 'Red' is also assigned to that 'Ranked Individual Risk'. If a 'Ranked Individual Risk' has a 'medium risk' ranking, a value of '70' is assigned to that 'Ranked Individual Risk' and a color of 'Yellow' is also assigned to that 'Ranked Individual Risk'. If a 'Ranked Individual Risk' has a 'low risk' ranking, a value of '10' is assigned to that 'Ranked Individual Risk' and a color of 'Green' is also assigned to that 'Ranked Individual Risk'. In FIG. 11, the Risk Assessment Algorithms 24 will then receive the 'Ranked Individual Risks' and calculate and generate 'Ranked Subcategory Risks' (e.g., 'gains', 'losses', 'stuck', and 'mechanical' 46 in FIGS. 12 and 14) and 'Ranked Risk Categories' (e.g., Average Individual Risk, Total Risk, and Average Total Risk, Potential Risk, and Actual Risk). The 'Ranked Individual Risks' and the 'Ranked Subcategory Risks' and the 'Ranked Risk Categories' are displayed on the Recorder or Display device 18*b* in FIG. 9A.

In FIG. 14, therefore, one of the above referenced 'values' (i.e., one of the values of '10' or '70' or '90') are assigned to each of the 'Ranked Individual Risks' 42 at each 'measured depth (MD)' 44 in a wellbore; however, in FIG. 12, one of the 'colors' (i.e., 'red' or 'yellow' or 'green') are assigned to each of the 'Ranked Individual Risks' 42 at each 'measured depth (MD)' 44 in the wellbore. In FIG. 14, however, some of the Individual Risks 42 at each 'measured depth (MD)' 44 represent a 'gain' (wellbore fluid is flowing uphole); and some of the Individual Risks 42 at each 'measured depth' 44 represent a 'loss' (wellbore fluid is flowing into the formation); and some of the Individual Risks 42 at each 'measured depth' 44 represent a 'stuck' problem (the tubing equipment at that MD 44 is 'stuck' in the wellbore); and some of the Individual Risks 42 at each 'measured depth' 44 represent a 'mechanical' problem (the equipment disposed downhole at that MD 44 has a 'mechanical' problem). Therefore, at that MD 44, all of the 'gains' Individual Risks 42 are collectively represented and displayed under the 'gains' Subcategory Risk 46 column; and, at that MD 44, all of the 'losses' Individual Risks 42 are collectively represented and displayed under the 'losses' Subcategory Risk 46 column; and, at that MD 44, all of the 'stuck' Individual Risks 42 are collectively represented and displayed under the 'stuck' Subcategory Risk 46 column; and, at that MD 44, all of the 'mechanical' Individual Risks 42 are collectively represented and displayed under the 'mechanical' Subcategory Risk 46 column. In FIG. 14, the 'gains' Subcategory Risks at that MD 44 are also assigned a 'value'; and the 'losses' Subcategory Risks at that MD 44 are also assigned a 'value'; and the 'stuck' Subcategory Risks at that MD 44 are also assigned a 'value'; and the 'mechanical' Subcategory Risks at that MD 44 are also assigned a 'value'; however, in FIG. 12, the 'gains' Subcategory Risks at that MD 44 are also assigned a 'color' (i.e., 'red' or 'yellow' or 'green') corresponding to the 'value'; and the 'losses' Subcategory Risks at that MD 44 are also assigned a 'color' corresponding to the 'value'; and the 'stuck' Subcategory Risks at that MD 44 are also assigned a 'color' corresponding to the 'value'; and the 'mechanical' Subcategory Risks at that MD 44 are also assigned a 'color' corresponding to the 'value'. Recall that each of the 'gains' and 'losses' and 'stuck' and 'mechanical' Subcategory Risks are calculated from the Individual Risks by using the following equation:

$$\text{Risk Subcategory} = \frac{\sum_{j}^{n}(Riskvalue_j \times severity_j \times N_j)}{\sum_{j}(severity_j \times N_j)},$$

where the 'Risk Value' is the 'Input Data calculation result' which generated the 'Ranked Individual Risk'.

In FIG. 14, at that MD 44, the 'gains' and 'losses' and 'stuck' and 'mechanical' Subcategory Risks 46 are used to calculate the 'Total Risk' 48, which, in FIG. 14, is labeled a 'Risk Index' 48. In FIG. 14, at that MD 44, the 'Total Risk' 48 has a 'value'; however, in FIG. 12, at that MD 44, the 'Total Risk' 48 has a 'color' (i.e., 'red' or 'yellow' or 'green') which corresponds to the 'value'. In FIG. 14, the Total Risk 48/Risk Index 48 is calculated from the Subcategory Risks 46 by using the following equation, as set forth above:

$$\text{Risk Total} = \frac{\sum_{1}^{4} Risk\ subcategory_k}{4}.$$

In FIG. 14, the 'values', which are assigned to each of the Individual Risks 42 and to each of the Subcategory Risks 46 and to the Total Risk 48 at each 'measured depth (MD)' 44 in a wellbore, represent either a 'high risk' or a 'medium risk' or a 'low risk' depending upon the magnitude of the 'value'; however, in FIG. 12, the 'colors', which are assigned to each of the Individual Risks 42 and to each of the Subcategory Risks 46 and to the Total Risk 48 at each 'measured depth (MD)' 44 in the wellbore, represent either a 'high risk' or a 'medium risk' or a 'low risk' depending upon the 'color' (i.e., depending upon whether the 'color' is the 'red' color, or the 'yellow' color, or the 'green' color).

Figure 15:
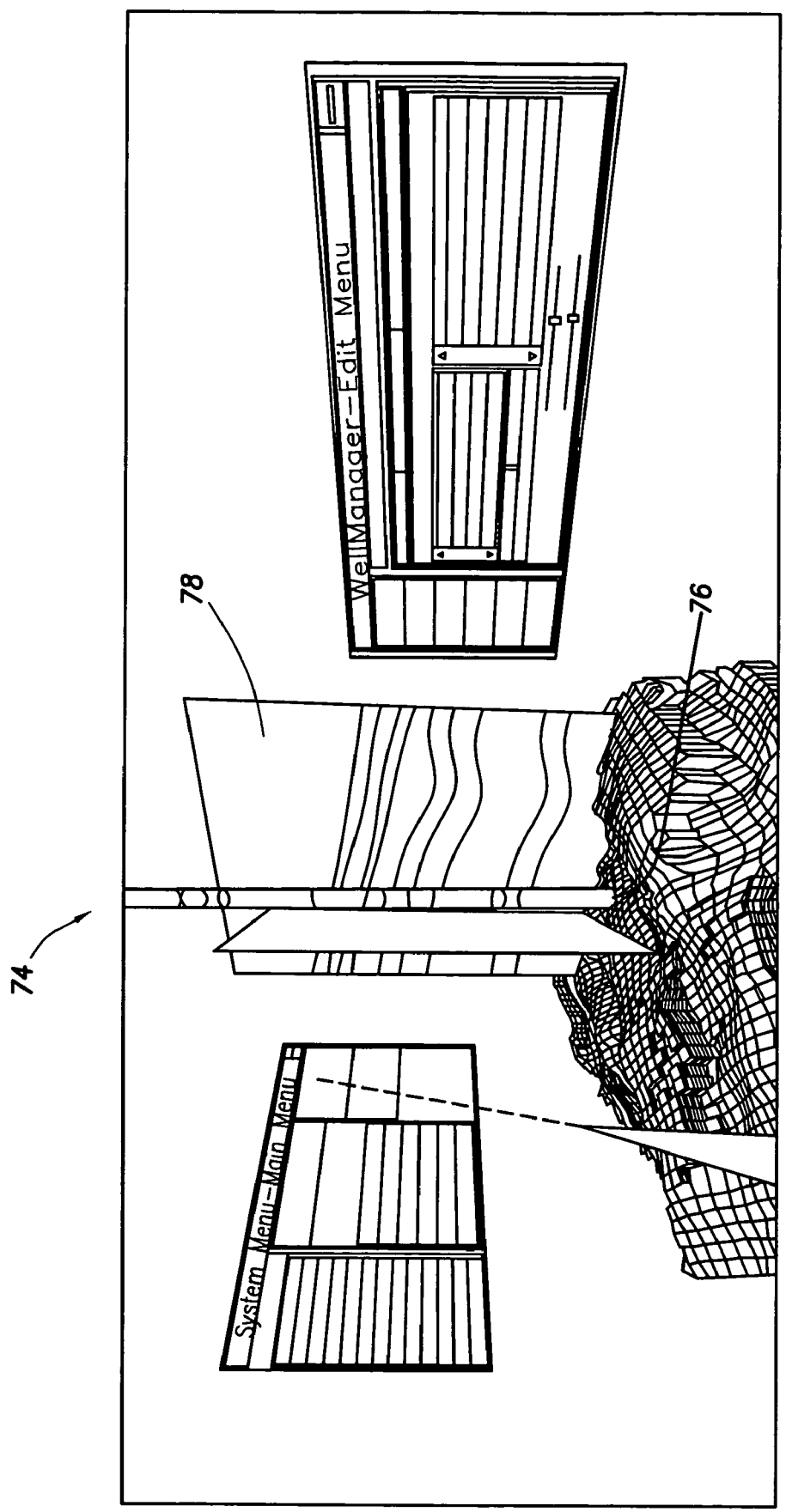
FIG. 15 illustrates another example of the risk assessment output data 18b1 being recorded or displayed on the recorder or display device 18b in FIG. 9B in accordance with another aspect of the present invention, FIG. 15 illustrating an example of the risk categories displayed in three dimensions in a visualization environment.
Figure 16:
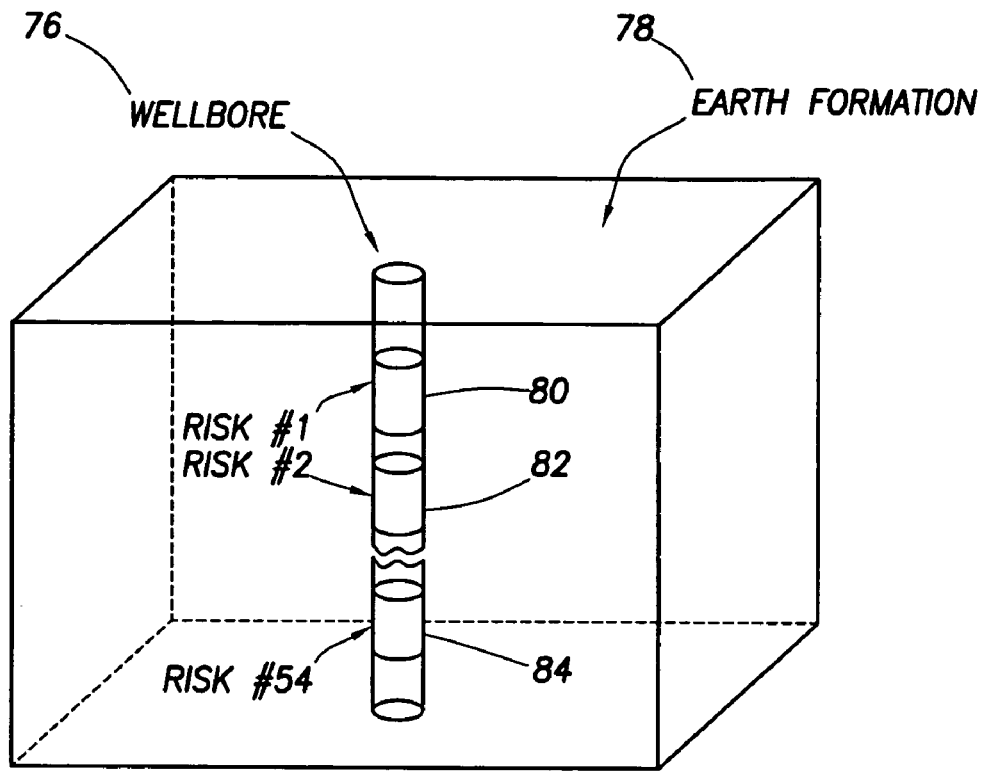
FIGS. 16 and 17 represent another construction of the example of the risk categories displayed in three dimensions in a visualization environment which is illustrated in FIG. 15.
Figure 17:
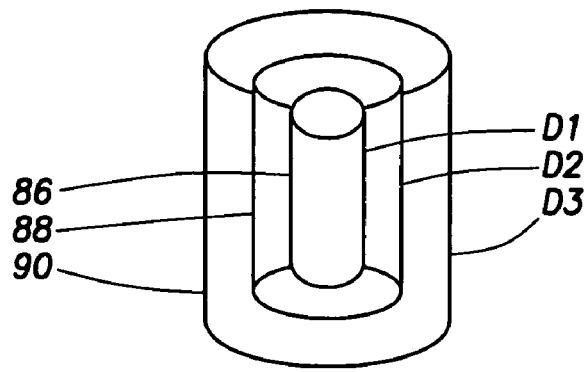

Referring to FIGS. 15, 16, and 17, another example of the risk assessment output data 18*b*1, that is recorded or displayed on the recorder or display device 18*b* of FIG. 9B, is illustrated, FIG. 15 illustrating an example of the risk categories displayed in three dimensions in a visualization environment. FIG. 15 represents an example of the risk categories displayed in 3D in a visualization environment called 'Inside Reality'. Cylinders with different colors along the trajectory present different risk categories, while the cylinder diameter presents the severity of the risk. This presentation provides means to quickly correlate drilling risks with the geology.

In FIGS. 15, 16, and 17, referring initially to FIG. 15, when the risk assessment output data 18b1 is displayed on the Recorder or Display device 18b of FIG. 9A, a 'fourth type of display' 74 illustrated in FIG. 15 includes a three-dimensional illustration of a wellbore 76 penetrating an Earth formation 78. The wellbore 76 is illustrated again in FIG. 16. In FIG. 16, the wellbore 76 includes a plurality of cylinders 80, 82, . . . , and 84. The cylinder 80 represents 'risk #1' of the 54 Individual Risks 42 shown in FIGS. 12 and 14, cylinder 82 represents 'risk #2' of the 54 Individual Risks 42, . . . , and cylinder 84 represents 'risk # 54' of the 54 Individual Risks 42 shown in FIGS. 12 and 14. The severity (i.e., a 'high risk' severity or a 'medium risk' severity or a 'low risk' severity) of each of the Individual Risks 42 associated with each of the cylinders 80, 82, . . . , and 84 is illustrated by either the 'color' of the cylinder or the 'size' of the cylinder. For example, in the event that the severity of each of the Individual Risks 42 associated with each of the cylinders 80, 82, . . . , and 84 is illustrated by 'color', if cylinder 80 is 'red' in color, the Individual Risk associated with that cylinder 80 has a 'high risk' severity. If cylinder 82 is 'yellow' in color, the Individual Risk associated with that cylinder 82 has a 'medium risk' severity. If cylinder 84 is 'green' in color, the Individual Risk associated with that cylinder 84 has a 'low risk' severity. In FIG. 17, each of the cylinders 80, 82, . . . , 84 in FIG. 16 can have different diameters. For example, in FIG. 17, the cylinders 86, 88, and 90 can have a first inner diameter D1, a second intermediate diameter D2, and a third outer diameter D3. In FIG. 16, in the event that the severity (i.e., a 'high risk' severity, a 'medium risk' severity, or a 'low risk' severity ) of each of the Individual Risks 42 associated with each of the cylinders 80, 82, . . . , and 84 is illustrated by 'size', if cylinder 80 in FIG. 16 has a diameter D1, a 'low risk' severity would be associated with the Individual Risk 42 corresponding to that cylinder 80. If cylinder 82 in FIG. 16 has a diameter D2, a 'medium risk' severity would be associated with the Individual Risk 42 corresponding to that cylinder 82. If cylinder 84 in FIG. 16 has a diameter D3, a 'high risk' severity would be associated with the Individual Risk 42 corresponding to that cylinder 84.

A functional specification associated with the Automatic Well Planning Risk Assessment Software 18c1 stored in the memory or program storage device 18c of FIG. 9A is set forth in the following paragraphs.

Generate Risks

Characteristic Information

Goal In Context: This use case describes the risk assessment process, methodology, and calculations as well as how to display by depth and by task.

Scope: Automatically generate qualitative risks from specified risk calculations and designs vs. business rules. Risks will be assessed by depth or hole section/bit run for each business rule and results displayed in 2 ways, by depth and task. Risks will be assigned values and combined into indices that will be used to compare scenarios against each other.

Level: Task

Pre-Condition: The user has completed prior use cases and has data for all tasks available for producing the risks.

Success End Condition: The system confirms to the user that the risks have been successfully generated.

Failed End Condition: The system indicated to the user that the risk assessment is not generated successfully.

Primary Actor: The User

Trigger Event: The user completed the Cost Estimate

Main Success Scenario

| Step | Actor Action | System Response |
|---|---|---|
| 1 | | The system performs all of the risk calculations and comparing to risk thresholds and highlight all depths individually or by interval (well, hole section, or bit section) as applicable. |
| 2 | | Risks will be displayed 2 ways, organized by depth (RiskMap) and by task (TaskRisk). Depth based (refer to RiskMap example) - by scenario, by group (gains, losses, stuck, mechanical), by risk track, by tasks, by individual risks, composite risk log/color scale. Task based (refer to TaskRisk example) - per scenario, all risks based on a given task are grouped together and plotted as task groups. \*\*Casing points and Bit end depths should both be user optional displays over the risks. |
| 3 | | Compute risk indices for both methods of display and for all groupings using weighted average of risk × length with values of risk as per the following . . . High risk = 90%, red color Med risk = 70%, yellow or amber color Low risk = 10%, no color |
| 4 | User reviews risk displays and risk indices and selects risk track. | System shows user a pop-up display (like tool-tip) of the threshold violations and tasks controlling the selected risk. |

-continued

| Step | Actor Action | System Response |
|---|---|---|
| 5 | User navigates to controlling task and modifies results to modify risk assessment and navigates back to the risk task. | System updates risk calculations and displays (if necessary). |
| 6 | The user accepts the answers and navigates to the reports task. | The use case ends successfully. |

Scenario Extensions

| Step | Condition | Action Description |
|---|---|---|
| 1a | The system fails to get threshold values. | The system informs the user of the failure and its reasons. The user makes the appropriate correction. The system re-joins Step 1. |
| 1b | The system fails to get threshold values. | The system informs the user of the failure and its reasons. The user makes no correction. The user stops the process. The use case ends unsuccessfully. |
| 3a | The system is unable to calculate risk indices. | The system informs the user of the failure and its reasons. The user makes necessary corrections. The system rejoins Step 3. |

Scenario Variations

| Step | Variable | Possible Variations |
|---|---|---|
| 1a | The system produces displays risks per task while working in the task for on the fly risk assessment and risk mitigation work by the user. This is in addition to the normal risk assessment task. | While user is working in a specific task - any risks that are calculated from results of that task are displayed in the task UI (view). This would be an optional setting to aid users in identifying risks as they work rather than exclusively at the end of the workflow. |
| 4a | User reviews risk displays and risk indices and wants to compare risks of 2 or more scenarios. | System will allow overlaying or other visual and numerical comparison methods for risk displays and risk values for 2 or more scenarios. |
| 5a | User double clicks risk track or interval. | System navigates the user back to the task that is controlling the selected risk. The user modifies the task results to modify the risk assessment and navigates back to the risk task. System rejoins at step 5. |
| 5b | User double clicks risk track or interval. | System navigates the user back to the task that is controlling the selected risk and displays a graphics track containing all risks derived from this specific tasks result within the task view. The user modifies the task results to modify the risk assessment and navigates back to the risk task. System rejoins at step 5. |

Business Rules

All Risk Thresholds should be editable by the user in the configuration file although long term we may need to lock these values down separately from the rest of the configuration values.

Scenario Information

H2S and CO2 Present for Scenario Indicated by User (Per Well)
Short Name: H2S_CO2
Category: Mechanical
Calculation: H2S and CO2 check boxes checked yes . . .
    High: Both selected
    Medium: Either one selected
    Low: Neither selected Hydrate Development (Per Well)
Short Name: Hydrates
Category: Mechanical, Stuck Calculation: Water depth
    High: ≧3000'
    Medium: ≧2000'
    Low: <2000'

Water Depth (Per Well)
Short Name: Well_WD
Category: Mechanical
Calculation: Water depth
    High: ≧5000'
    Medium: ≧1000'
    Low: <1000'

Trajectory

Total Well Depth (Per Well)
Short Name: Well_MD
Category: Mechanical
Calculation: Total Measured depth
    High: ≧20000'
    Medium: ≧12000'
    Low: <12000'

Trajectory shape J or S Curve (Per Well)
Short Name: JS_Curve
Category: Mechanical
Calculation: Total Measured depth
    High: ≧
    Medium: ≧
    Low: <

Dogleg Severity (Per Depth)
Short Name: DLS
Category: Stuck, Mechanical
Calculation: NA
    High: ≧6°/100'
    Medium: ≧24°/100'
    Low: <4°/100'

Tortuosity (Per Depth)
Short Name: TORT
Category: Stuck, Mechanical
Calculation:

$$TORT = \sum_i DLS_i$$

High: ≧90°
    Medium: ≧60°
    Low: <60°

Inclination (Per Depth)
Short Name: INC
Category: Mechanical, Stuck
Calculation: NA
    High: ≧65°
    Medium: ≧40°
    Low: <40°

Well Inclinations with Difficult Cuttings Transport Conditions (Per Depth)
Short Name: Cuttings
Category: Mechanical, Stuck
Calculation: NA
    High: 45°≧Inc≧65°
    Medium: >65°
    Low: <45°

Horizontal to Vertical Ratio (Per Depth)
Short Name: Hor_Disp
Category: Stuck, Mechanical
Calculation: =Horizontal Displacement÷True Vertical Depth
    High: ≧1.0
    Medium: ≧0.5
    Low: <0.5

Directional Drillability Index (Per Depth)
Short Name: DDI
Category: Stuck, Mechanical
Calculation: Calculate the DDI using the "Resample data"
Note: The DDI is calculated for the entire well. Therefore, the DDI is not displayed as a risk track, but displayed in the risk summary overview.

$$DDI = \text{LOG}_{10}\left[\frac{MD \times AHD \times TORTUOSITY}{TVD}\right]$$

MD, TVD in meters (or feet???)
Tortuosity:

$$TOR = \sum_i DLS_i$$

AHD=Along hole displacement. In Swordfish, the AHD will be calculated using the Pythagorean principle (using the resample data)

$$AHD = \sum_{n=i}\left[\sqrt{(X_{n+1} - X_n)^2 + (Y_{n+1} - Y_n)^2}\right]$$

High: DDI>6.8
    Medium DDI<6.8 and >6
    Low: DDI<6

Earth Properties

High or Supernormal Pore Pressure (Per Depth)
Short Name: PP_High
Category: Gains
Calculation: =PP
    High: ≧16 ppg
    Medium: ≧12 ppg
    Low: <12 ppg Depleted or Subnormal Pore Pressure (Per Depth)
Short Name: PP_Low
Category: Losses, Stuck
Calculation: =PP
    High: ≦8.33 ppg
    Medium: ≦8.65 ppg
    Low: >8.65 ppg Superhard rock (per depth)
Short Name: RockHard
Category: Mechanical
Calculation: =UCS
    High: ≧25 kpsi
    Medium: ≧16 kpsi
    Low: <16 kpsi Gumbo (per depth)
Short Name: RockSoft
Category: Stuck, Mechanical
Calculation: =UCS High: ≤2 kpsi
Medium: ≤4 kpsi
Low: >4 kpsi Geothermal Temperature
High Geothermal Temperature (per depth)
Short Name: TempHigh
Category: Mechanical
Calculation: =Temperature
   High: ≥280° F.
   Medium: ≥220° F.
   Low: <220° F.
Low Geothermal Temperature (Per Depth)
Short Name: TempLow
Category: Mechanical, Losses
Calculation: =Temperature
   High: ≤50° F.
   Medium: ≤60° F.
   Low: >60° F.

Rig Selection

Water Depth as a Ratio to the Maximum Water Depth Rating of the Rig (Per Depth)
Short Name: Rig_WD
Category: Mechanical
Calculation: =WVD÷Rig WM rating
   High: ≥0.75
   Medium: ≥0.5
   Low: <0.5

Total Measured Depth as a Ratio to the Maximum Depth Rating of the Rig (Per Depth)
Short Name: Rig_MD
Category: Mechanical
Calculation: =MD÷Rig MD rating
   High: ≥0.75
   Medium: ≥0.5
   Low: <0.5

Subsea BOP or Wellhead (Per Well)
Short Name: SS_BOP
Category: Mechanical
Calculation: =Water Depth
   High: WD≥3000'
   Medium: WD≥1000'
   Low: WD<1000'

Mud Weight Window
Kick potential where Mud Weight is too low relative to Pore Pressure (per depth)
Short Name: MW_Kick
Category: Gains
Calculation: =Mud Weight−Pore Pressure
   High: ≤0.3 ppg
   Medium: ≤0.5 ppg
   Low: >0.5 ppg Loss Potential where Hydrostatic Pressure is too High Relative to Pore Pressure (Per Depth)
Short Name: MW_Loss
Category: Losses, Stuck
Calculation: =Hydrostatic Pressure−Pore Pressure
Water based muds (HP-WBM, ND-WBM, D-WBM)
   High: ≥2500 psi
   Medium: ≥2000 psi
   Low: <2000 psi
Oil based muds (OBM, MOBM, SOBM)
   High: ≥2000 psi
   Medium: ≥1500 psi
   Low: <1500 psi Loss Potential where Mud Weight is too High Relative to Fracture Gradient (Per Depth)
Short Name: MW_Frac
Category: Losses, Stuck
Calculation: =Upper Bound−Mud Weight
   High: ≤0.2 ppg
   Medium: ≤0.5 ppg
   Low: >0.5 ppg Narrow Mud Weight Window (Per Depth)
Short Name: MWW
Category: Gains, Losses, Stuck
Calculation: =Upper Bound−Pore Pressure
   High: ≤0.5 ppg
   Medium: ≤1.0 ppg
   Low: >1.0 ppg Wellbore Stability (Per Depth)
Short Name: WBS
Category: Stuck
Calculation: PP, LB, MW
   High: LB≥MW≥PP
   Medium MW≥LB≥PP
   Low: MW≥PP≥LB Narrow Wellbore Stability Window (Per Depth)
Short Name: WBSW
Category: Stuck
Calculation: =Upper Bound−Lower Bound
   OBM/WBM values
   High: ≤0.3/0.4 ppg
   Medium: ≤0.6/0.8 ppg
   Low: >0.6/0.8 ppg Ballooning (Per Hole Section)
Short Name: Balloon
Category: Losses, Gains
Calculation: Mud Weight, Tensile Failure, Fracture Gradient (i.e. Min Principal Stress)
   High: Tensile Failure≤Mud Weight≤Fracture Gradient
   Medium: Mud Weight≤Tensile Failure≤Fracture Gradient
   Low: Mud Weight≤Fracture Gradient≤Tensile Failure Hole Section Length (Per Hole Section)
Short Name: HSLength
Category: Stuck, Mechanical
Calculation: NA
   High: ≥8000 ft
   Medium: ≥7001 ft
   Low: <7001 ft Dogleg Severity at Casing Points for Casing Wear (Per Hole Section)
Short Name: Csg_Wear
Category: Mechanical
Calculation: =DLS
   High: ≥4°/100'
   Medium: ≥3°/100'
   Low: <3°/100'

Number of Casing Strings (Per Hole Section)
Short Name: CsgCount
Category: Mechanical Calculation:

$$\sum_{i}^{n} CsgStrings$$

High: ≧6
Medium: ≧4
Low: <4

Wellbore Sizes

Large Hole Sizes (Per Hole Section)
Short Name: Hole_Big
Category: Kick, Stuck, Mechanical
Calculation: =Hole diameter
  High: ≧24"
  Medium: ≧18.625"
  Low: <18.625"

Small Hole Sizes (Per Hole Section)
Short Name: Hole_Sm
Category: Losses, Stuck
Calculation: =Hole diameter (Onshore/Offshore)
  High: ≦4.75"/6.5"
  Medium: ≦6.5"/7.875"
  Low: >6.5"/7.875"

Clearance Between Hole Size and Casing Max OD (Per Hole Section)
Short Name: Hole_Csg
Category: Losses, Stuck
Calculation: =Area of hole size÷Area of casing size (max OD)
  High: ≦1.1
  Medium: ≦1.25
  Low: >1.25

Clearance Between Casing Inside Diameter and Subsequent Casing Max OD (Per Hole Section)
Short Name: Csg_Csg
Category: Losses, Stuck
Calculation: =Area of casing ID÷Area of casing max OD
  High: ≦1.05
  Medium: ≦1.1
  Low: >1.1

Clearance Between Casing Inside Diameter and Subsequent Bit Size (Per Bit Run)
Short Name: Csg_Bit
Category: Losses, Stuck
Calculation: =Area of nominal casing size (ID)÷Area of nominal bit size (OD) next hole section
  High: ≦1.05
  Medium: ≦1.1
  Low: >1.1

Casing Design

Casing Design Factors for Burst, Collapse, & Tension (Per Hole Section)
Short Name: Csg_DF
Category: Mechanical
Calculation: DFb,c,t=Minimum (DFb, DFc, DFt)
  DFb=Calculated Burst Design Factor÷Required Burst Design Factor
  DFc=Calculated Collapse Design Factor÷Required Collapse Design Factor
  DFt=Calculated Tension Design Factor÷Required Tension Design Factor
  High: DFb,c,t≦1.0
  Medium: DFb,c,t≦1.1
  Low: DFb,c,t>1.1

Casing String Weight Relative to Rig Lifting Capabilities (Per Casing String)
Short Name: Csg_Wt
Category: Mechanical
Calculation: =Casing string weight (bouyed)/Minimum (Derrick, Drawworks, Motion Compensator)
  High: ≧0.95
  Medium: <0.95
  Low: <0.8

Casing String Allowable Margin of Overpull (Per Casing String)
Short Name: Csg_MOP
Category: Mechanical, Stuck
Calculation: =Casing string tensile rating−Casing string weight (bouyed)
  High: ≦50 klbs
  Medium: ≦100 klbs
  Low: >100 klbs Cement Design Cement Height Relative to Design Guidelines for Each String Type (Per Hole Section)
Short Name: TOC_Low
Category: Mechanical
Calculation: =Cement height/String type cementing height rule
  High: ≦0.75
  Medium: ≦1.0
  Low: >1.0

Cement Density Lower than Standard Slurry: Hydrostatic Pressure/Losses Risk:
Short Name:
Category:
Calculation:
  High: ≦
  Medium: ≦
  Low: >

Kick Potential where Hydrostatic Pressure is too Low Relative to Pore Pressure (Per Depth)
Short Name: Cmt_Kick
Category: Gains
Calculation: =Cementing Hydrostatic Pressure−Pore Pressure
  High: ≦0.3 ppg
  Medium: ≦0.5 ppg
  Low: >0.5 ppg Loss Potential where Hydrostatic Pressure is too High Relative to Pore Pressure (Per Depth)
Short Name: Cmt_Loss
Category: Losses
Calculation: =Cementing Hydrostatic Pressure−Pore Pressure
  High: ≧2500 psi
  Medium: ≧2000 psi
  Low: <2000 psi Loss Potential where Hydrostatic Pressure is too High Relative to Fracture Gradient (Per Depth)
Short Name: Cmt_Frac
Category: Losses
Calculation: =Upper Bound−Cementing Hydrostatic Pressure High: ≦0.2 ppg
Medium: ≦0.5 ppg
Low: >0.5 ppg Bit Selection Excess Bit Work as a Ratio to the Cumulative KPSIFT (UCS×Length) (Per Depth)
Short Name: Bit_WkXS
Category: Mechanical
Calculation: =Excess KPSIFT÷Cumulative KPSIFT
  High: ≧0.2
  Medium: ≧0.1
  Low: <0.1

Cumulative Bit Work as a Ratio to the Bit Catalog Average KPSIFT (UCS×Length) (Per Depth)
Short Name: Bit_Wk
Category: Mechanical
Calculation: =Cumulative KPSIFT÷Bit average KPSIFT
  High: ≧1.5
  Medium: ≧1.25
  Low: <1.25

Cumulative Bit Footage as a Ratio to the Bit Catalog Average Footage (Drilled Length) (Per Depth)
Short Name: Bit_Ftg
Category: Mechanical
Calculation: =Cumulative length÷Bit average length
  High: ≧2
  Medium: ≧1.5
  Low: <1.5

Cumulative Bit Hours as a Ratio to the Bit Catalog Average Hours (on Bottom Rotating Time) (Per Depth)
Short Name: Bit_Hrs
Category: Mechanical
Calculation: =Cumulative hours÷Bit average hours
  High: ≧2
  Medium: ≧1.5
  Low: <1.5

Cumulative Bit Krevs as a Ratio to the Bit Catalog Average Krevs (RPM*hours) (Per Depth)
Short Name: Bit_Krev
Category: Mechanical
Calculation: =Cumulative Krevs÷Bit average Krevs
  High: ≧2
  Medium: ≧1.5
  Low: <1.5

Bit ROP as a Ratio to the Bit Catalog Average ROP (Per Bit Run)
Short Name: Bit_ROP
Category: Mechanical
Calculation: =Planned ROP÷Bit catalog average ROP
  High: ≧1.5
  Medium: ≧1.25
  Low: <1.25

UCS Relative to Bit UCS and Max Bit UCS (Per Depth)
Short Name: Bit_UCS
Category: Mechanical
Calculation: NA
  High: UCS≧Max Bit UCS≧Bit UCS
  Medium: Max Bit UCS≧UCS≧Bit UCS
  Low: Max Bit UCS≧Bit UCS≧UCS Drillstring Design BHA Tensile Risk (Per Bit Run)
Short Name:
Category:
Calculation:
  High: ≦
  Medium: ≦
  Low: >

Drillstring Weight (Per Bit Run)
Short Name:
Category: Mechanical
Calculation:

Drillstring Allowable Margin of Overpull (Per Bit Run)
Short Name: DS_MOP
Category: Mechanical, Stuck
Calculation: =MOP
  High: ≦50 klbs
  Medium: ≦100 klbs
  Low: >100 klbs Drillstring Buckling—Neutral Point (NP) Position in Drillstring (Per Bit Run)
Short Name: DSBuckle
Category: Mechanical, Stuck
Calculation:
  High: NP in drill pipe
  Medium: NP in heavy weight drill pipe
  Low: NP in drill collars Kick Tolerance (Per Hole Section)
Short Name: Kick_Tol
Category: Losses, Stuck, Gains
Calculation: NA (already calculated), Exploration/Development
  High: ≦50/25 bbl
  Medium: ≦100/50 bbl
  Low: >100/50 bbl Potential Twistoff where Required Drilling Torque Approaches Mechanical Torsional Limits of Drill PPipe, Heavy Weight Drill Pipe, Drill Collars, or Connections (Per Bit Run)
Short Name: DS_Twist
Category: Mechanical
Calculation: =Required Torque÷Torsional limit of drillstring component (DC, HWDP, or DP) or connection
  High: ≧0.9
  Medium: ≧0.8
  Low: <0.8

Potential Parting of the Drillstrings where Required Tension Approaches Mechanical Tension Limits of Drill Pipe, Heavy Weight Drill Pipe, Drill Collars, or Connections (Per Bit Run)
Short Name: DS_Part
Category: Mechanical
Calculation: =Required Tension (including MOP)÷Tension limit of drillstring component (DC, HWDP, or DP) or connection
  High: ≧0.9
  Medium: ≧0.8
  Low: <0.8

Hydraulics

Flow Rate for Hole Cleaning (Per Depth)
Short Name: Q_Crit
Category: Stuck, Losses
Calculation: =Q/Qcr
  High: ≦1.0
  Medium: ≦1.1
  Low: >1.1

Flow Rate Relative to Pump Capabilities (Per Depth)
Short Name: Q_Max
Category: Mechanical
Calculation: =Q/Qmax:Flowrate/Maximum Liner Flowrate
  High: ≧1.0
  Medium: ≧0.9
  Low: <0.9

TFA Size Relative to Minimum TFA (Per Bit Run)
Short Name: TFA_Low
Category: Mechanical
Calculation: TFA
  High: ≦0.2301 (3@$^{10}/_{32}$")
  Medium: ≦0.3313 (3@$^{12}/_{32}$")
  Low: >0.3313 (3@$^{12}/_{32}$")

Circulating Pressure Relative to Rig and Pump Maximum Pressure (Per Depth)
Short Name: P_Max
Category: Mechanical
Calculation: =Ratio: Pressure Circulating/Maximum Liner Pressure
  High: ≧1.0
  Medium: ≧0.9
  Low: <0.9

Loss Potential where ECD is too High Relative to Fracture Gradient (Per Depth)
Short Name: ECD_Frac
Category: Losses, Stuck
Calculation: =Upper Bound−ECD
  High: ≦0.0 ppg
  Medium: ≦0.2 ppg
  Low: >0.2 ppg Loss Potential where ECD is too High Relative to Pore Pressure (Per Depth)
Short Name: ECD_Loss
Category: Losses, Stuck
Calculation: =ECD−Pore Pressure
  Water based muds (HP-WBM, ND-WBM, D-WBM)
  High: ≧2500 psi
  Medium: ≧2000 psi
  Low: <2000 psi
  Oil based muds (OBM, MOBM, SOBM)
  High: ≧2000 psi
  Medium: ≧1500 psi
  Low: <1500 psi Risks (Unorganized)
  Kick Tolerance below design thresholds
  Wellbore stability risk assessed same way as used by fluid selection algorithm—% of hole section where LL>PP translated?—Stuck
  Mud weight overbalance risk (MW−PP)−Gains, Losses, Differential Sticking
  Mud weight underbalance risk (FG−MW)−Losses, differential sticking
  Drillstring tensile risk as a function of MOP (Margin of Overpull or Max OverPull)
  Drillstring torsional risk based on torque and drag results (after T&D implemented)
  Trajectory risk from drillability index
  Clearance risks—casing/casing, casing/hole, bit/casing—Mechanical, losses, gains, stuck Cement Hydrostatic Overbalance Risk Depth Related Risks
Maximum Overbalance
  Ratio of Maximum Mud Weight to the Pore Pressure (Per Hole Section)
  High>2500 psi
  Medium=[1500–2500] ppg
  Low<1500 psi
Minimum Overbalance
  High <1 ppg
  Medium=[2-3] ppg
  Low>3 ppg
Hole Cleaning
  Ratio of Circulation Rate to the Critical Flow Rate (At Zero ROP)
  Low>1.2
  Medium=[1.0–1.2]
  High<1.0
  RiskMap Mockup (Risk vs. Depth)

Risk Weighting

Each risk has a weighting or severity factor ranging from 1 to 5, listed in the second column. Then the risk occurrence is indicated for each category in the matrix below. One (1) indicates the risk is included in the category, and zero (0) means exclusion. The risk is calculated by:

$$\text{Risk category weighting } (1-5) \times \text{Risk}(10\%-70\%-90\%) \times \text{Interval} \times \text{Risk occurrence}.$$

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of determining and displaying a risk assessment, comprising the steps of:
   receiving a plurality of input data calculation results associated with a wellbore;
   comparing each calculation result of said plurality of input data calculation results with each logical expression of a plurality of logical expressions to rank said calculation result; and
   calculating a plurality of ranked individual risks extending along a depth of said wellbore in response to the ranking step, each of said plurality of ranked individual risks representing an input data calculation result that has been ranked by said logical expression as having a risk severity selected from a group consisting of a high risk severity, a medium risk severity, and a low risk severity;
   generating risk information in response to said plurality of ranked individual risks;
   displaying said risk information, the displaying step including displaying said risk information on a risk information display, said risk information display including a simultaneous display of said plurality of ranked individual risks calculated along said depth of said wellbore;
   modifying a well design for said wellbore using said plurality of ranked individual risks; and
   performing a drilling operation at the wellsite based on the well design.

2. The method of claim 1, wherein each of said plurality of ranked individual risks calculated along said depth of said wellbore and simultaneously displayed on said risk information display includes said risk severity and a color representing each said severity.

3. The method of claim 1, wherein each of said plurality of ranked individual risks calculated along said depth of said wellbore and simultaneously displayed on said risk information display includes said risk severity and a numerical value representing each said severity.

4. The method of claim 1, wherein said risk information displayed on said risk information display comprises one or more ranked subcategory risks.

5. The method of claim 4, wherein said risk information displayed on said risk information display includes said one or more ranked subcategory risks as a function of depth in said wellbore.

6. The method of claim 5, wherein each of said one or more ranked subcategory risks displayed on said risk information display as a function of depth in said wellbore includes a severity, said severity including said high risk severity or said medium risk severity or said low risk severity, said severity being represented on said risk information display as a color.

7. The method of claim 5, wherein each of said one or more ranked subcategory risks displayed on said risk information display as a function of depth in said wellbore includes a severity, said severity including said high risk severity or said medium risk severity or said low risk severity, said severity being represented on said risk information display as a numerical value.

8. The method of claim 5, wherein said subcategory risks is selected from a group consisting of: gains risks, losses risks, stuck pipe risks, and mechanical risks.

9. The method of claim 1, wherein said risk information displayed on said risk information display comprises one or more risk categories.

10. The method of claim 9, wherein said one or more risk categories includes a total risk, said risk information display including said total risk displayed on said risk information display as a function of depth in said wellbore.

11. The method of claim 9, wherein said risk categories are selected from a group consisting of: an average individual risk, a subcategory risk, an average subcategory risk, a total risk, an average total risk, a potential risk for each design task, and an actual risk for each design task.

12. The method of claim 11, wherein said risk information displayed on said risk information display includes said total risk as a function of depth in said wellbore.

13. The method of claim 12, wherein each said total risk displayed on said risk information display includes a severity, said severity including said high risk severity or said medium risk severity or said low risk severity, each said severity being represented on said risk information display as a color.

14. The method of claim 12, wherein each said total risk displayed on said risk information display includes a severity, said severity including said high risk severity or said medium risk severity or said low risk severity, each said severity being represented on said risk information display as a numerical value.

15. The method of claim 1, wherein said individual risk values are selected from a group consisting of: H2S and CO2, Hydrates, Well water depth, Tortuosity, Dogleg severity, Directional Drilling Index, Inclination, Horizontal displacement, Casing Wear, High pore pressure, Low pore pressure, Hard rock, Soft Rock, High temperature, Water-depth to rig rating, Well depth to rig rating, mud weight to kick, mud weight to losses, mud weight to fracture, mud weight window, Wellbore stability window, wellbore stability, Hole section length, Casing design factor, Hole to casing clearance, casing to casing clearance, casing to bit clearance, casing linear weight, Casing maximum overpull, Low top of cement, Cement to kick, cement to losses, cement to fracture, Bit excess work, Bit work, Bit footage, bit hours, Bit revolutions, Bit Rate of Penetration, Drilistring maximum overputt, Bit compressive strength, Kick tolerance, Critical flow rate, Maximum flow rate, Small nozzle area, Standpipe pressure, ECD to fracture, ECD to losses, Gains, Gains Average, Losses, Losses average, Stuck, Stuck average, Mechanical, Mechanical average, Risk Average, Subsea BOP, Large Hole, Small Hole, Number of casing strings, Drillstring parting, and Cuttings.

16. The method of claim 1, further comprising the step of:
grouping said plurality of ranked individual risks to generate a plurality of design tasks, wherein said risk information display further includes a display of each of said plurality of design tasks.

17. The method of claim 16, wherein each of said plurality of design tasks include an actual risk and a potential risk, and wherein said display of each of said plurality of design tasks on said risk information display includes a display of said actual risk associated with each of said plurality of design tasks and a display of said potential risk associated with each of said plurality of design tasks.

18. The method of claim 17, wherein said display of each of said plurality of design tasks on said risk information display further includes a plot comprising said actual risk on one axis and said potential risk on another axis and a display of each said design task on said plot.

19. A method of determining and displaying a risk assessment, comprising the steps of:
receiving a plurality of input data calculation results associated with a wellbore;
comparing each calculation result of said plurality of input data calculation results with each logical expression of a plurality of logical expressions to rank each said calculation result; and
calculating a plurality of ranked individual risks extending along a length of said wellbore in response to the ranking step, each of said plurality of ranked individual risks representing an input data calculation result that has been ranked by said logical expression as having a risk severity selected from a group consisting of a high risk severity, a medium risk severity, and a low risk severity;
generating risk information in response to said plurality of ranked individual risks;
displaying said risk information, the displaying step including displaying a risk information display, said risk information display including a simultaneous display of said plurality of said ranked individual risks extending along said length of said wellbore;
modifying a well design for said wellbore using said plurality of ranked individual risks; and
performing a drilling operation at the wellsite based on the well design.

20. The method of claim 19, wherein said display of said plurality of ranked individual risks extending along said length of said wellbore includes a three-dimensional display of a corresponding plurality of cylinders extending along said length of said wellbore, each of said cylinders representing one of said plurality of ranked individual risks.

21. The method of claim 20, wherein each of said cylinders which represent one of said ranked individual risks has a color, said color representing a severity of said one of said ranked individual risks.

22. The method of claim 20, wherein each of said cylinders which represent one of said ranked individual risks has a size, said size representing a severity of said one of said ranked individual risks.

23. A program storage device readable by a machine tangibly embodying a program of instructions executable by the machine to perform method steps for determining and displaying a risk assessment, said method steps comprising:

receiving a plurality of input data calculation results associated with a wellbore;

comparing each calculation result of said plurality of input data calculation results with each logical expression of a plurality of logical expressions to rank said calculation result; and calculating a plurality of ranked individual risks extending along a depth of said wellbore in response to the ranking step, each of said plurality of ranked individual risks representing an input data calculation result that has been ranked by said logical expression as having a risk severity selected from a group consisting of a high risk severity, a medium risk severity, and a low risk severity;

generating risk information in response to said plurality of ranked individual risks;

displaying said risk information, the displaying step including displaying said risk information on a risk information display, said risk information display including a simultaneous display of said plurality of ranked individual risks calculated along said depth of said wellbore.

24. The program storage device of claim 23, wherein each of said plurality of ranked individual risks calculated along said depth of said wellbore and simultaneously displayed on said risk information display includes said risk severity and a color representing each said severity.

25. The program storage device of claim 23, wherein each of said plurality of ranked individual risks calculated along said depth of said wellbore and simultaneously displayed on said risk information display includes said risk severity and a numerical value representing each said severity.

26. The program storage device of claim 23, wherein said risk information displayed on said risk information display comprises one or more ranked subcategory risks.

27. The program storage device of claim 26, wherein said risk information displayed on said risk information display includes said one or more ranked subcategory risks as a function of depth in said wellbore.

28. The program storage device of claim 27, wherein each of said one or more ranked subcategory risks displayed on said risk information display as a function of depth in said wellbore includes a severity, said severity including said high risk severity or said medium risk severity or said low risk severity, said severity being represented on said risk information display as a color.

29. The program storage device of claim 27, wherein each of said one or more ranked subcategory risks displayed on said risk information display as a function of depth in said wellbore includes a severity, said severity including said high risk severity or said medium risk severity or said low risk severity, said severity being represented on said risk information display as a numerical value.

30. The program storage device of claim 27, wherein said subcategory risks is selected from a group consisting of: gains risks, losses risks, stuck pipe risks, and mechanical risks.

31. The program storage device of claim 23, wherein said risk information displayed on said risk information display comprises one or more risk categories.

32. The program storage device of claim 31, wherein said one or more risk categories includes a total risk, said risk information display including said total risk displayed on said risk information display as a function of depth in said wellbore.

33. The program storage device of claim 31, wherein said risk categories are selected from a group consisting of: an average individual risk, a subcategory risk, an average subcategory risk, a total risk, an average total risk, a potential risk for each design task, and an actual risk for each design task.

34. The program storage device of claim 33, wherein said risk information displayed on said risk information display includes said total risk as a function of depth in said wellbore.

35. The program storage device of claim 34, wherein each said total risk displayed on said risk information display includes a severity, said severity including said high risk severity or said medium risk severity or said low risk severity, each said severity being represented on said risk information display as a color.

36. The program storage device of claim 34, wherein each said total risk displayed on said risk information display includes a severity, said severity including said high risk severity or said medium risk severity or said low risk severity, each said severity being represented on said risk information display as a numerical value.

37. The program storage device of claim 23, wherein said individual risk values are selected from a group consisting of: $H_2S$ and $CO_2$, Hydrates, Well water depth, Tortuosity, Dog-leg severity, Directional Drilling Index, Inclination, Horizontal displacement, Casing Wear, High pore pressure, Low pore pressure, Hard rock, Soft Rock, High temperature, Water-depth to rig rating, Well depth to rig rating, mud weight to kick, mud weight to losses, mud weight to fracture, mud weight window, Wellbore stability window, wellbore stability, Hole section length, Casing design factor, Hole to casing clearance, casing to casing clearance, casing to bit clearance, casing linear weight, Casing maximum overpull, Low top of cement, Cement to kick, cement to losses, cement to fracture, Bit excess work, Bit work, Bit footage, bit hours, Bit revolutions, Bit Rate of Penetration, Drillstring maximum overputt, Bit compressive strength, Kick tolerance, Critical flow rate, Maximum flow rate, Small nozzle area, Standpipe pressure, ECD to fracture, ECD to losses, Gains, Gains Average, Losses, Losses average, Stuck, Stuck average, Mechanical, Mechanical average, Risk Average, Subsea BOP, Large Hole, Small Hole, Number of casing strings, Drillstring parting, and Cuttings.

38. The program storage device of claim 23, said method steps further comprising:

grouping said plurality of ranked individual risks to generate a plurality of design tasks, wherein said risk information display further includes a display of each of said plurality of design tasks.

39. The program storage device of claim 38, wherein each of said plurality of design tasks include an actual risk and a potential risk, and wherein the display of each of said plurality of design tasks on said risk information display includes a display of said actual risk associated with each of said plurality of design tasks and a display of said potential risk associated with each of said plurality of design tasks.

40. The program storage device of claim 39 wherein said display of each of said plurality of design tasks on said risk information display further includes a plot comprising said actual risk on one axis and said potential risk on another axis and a display of each said design task on said plot.

41. A program storage device readable by a machine tangibly embodying a program of instructions executable by the machine to perform method steps for determining and displaying a risk assessment, said method steps comprising:

receiving a plurality of input data calculation results associated with a wellbore;

comparing each calculation result of said plurality of input data calculation results with each logical expression of a plurality of logical expressions to rank each said calculation result; and calculating a plurality of ranked individual risks extending along a length of said wellbore in response to the ranking step, each of said plurality of ranked individual risks representing an input data calculation result that has been ranked by said logical expression as having a risk severity selected from a group consisting of a high risk severity, a medium risk severity, and a low risk severity;

generating risk information in response to said plurality of ranked individual risks;

displaying said risk information, the displaying step including displaying a risk information display, said risk information display including a simultaneous display of said plurality of said ranked individual risks extending along said length of said wellbore.

42. The program storage device of claim 41, wherein said display of said plurality of ranked individual risks extending along said length of said wellbore includes a three-dimensional display of a corresponding plurality of cylinders extending along said length of said wellbore, each of said cylinders representing one of said plurality of ranked individual risks.

43. The program storage device of claim 42, wherein each of said cylinders which represent one of said ranked individual risks has a color, said color representing a severity of said one of said ranked individual risks.

44. The program storage device of claim 42, wherein each of said cylinders which represent one of said ranked individual risks has a size, said size representing a severity of said one of said ranked individual risks.

* * * * *